(12) United States Patent
Mehta et al.

(10) Patent No.: US 12,047,116 B2
(45) Date of Patent: Jul. 23, 2024

(54) AUTONOMOUS, ZERO TOUCH PROVISIONING OF OPTICAL CHANNELS IN OPTICAL LINE SYSTEMS

(71) Applicant: Ciena Corporation, Hanover, MD (US)

(72) Inventors: Priyanth Mehta, Ottawa (CA); Yang Ding, Montreal (CA); Andrew Kam, Stittsville (CA); Nathan Lam, Kanata (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 18/325,607

(22) Filed: May 30, 2023

(65) Prior Publication Data

US 2023/0308177 A1    Sep. 28, 2023

Related U.S. Application Data

(63) Continuation of application No. 17/224,173, filed on Apr. 7, 2021, now Pat. No. 11,695,474.

(51) Int. Cl.
*H04B 10/079* (2013.01)
*H04B 10/25* (2013.01)

(52) U.S. Cl.
CPC . *H04B 10/07953* (2013.01); *H04B 10/07955* (2013.01); *H04B 10/25* (2013.01)

(58) Field of Classification Search
CPC ........ H04B 10/07953; H04B 10/07955; H04B 10/25; H04B 10/07951; H04B 10/07957; H04B 10/0797; H04B 10/0799; H04B 10/0795; H04B 10/40; H04B 10/079; H04B 10/077; H04B 10/075; H04B 10/073
See application file for complete search history.

(56) References Cited

U.S. PATENT DOCUMENTS

| | | |
|---|---|---|
| 6,618,193 B1 | 9/2003 | Boertjes |
| 8,364,036 B2 | 1/2013 | Boertjes et al. |
| 8,509,618 B2 | 8/2013 | Boertjes et al. |

(Continued)

FOREIGN PATENT DOCUMENTS

| | | |
|---|---|---|
| EP | 2 993 806 A1 | 3/2016 |
| WO | 2002/082706 A2 | 10/2002 |

(Continued)

*Primary Examiner* — Hibret A Woldekidan
(74) *Attorney, Agent, or Firm* — Baratta Law PLLC; Lawrence A. Baratta, Jr.

(57) ABSTRACT

Systems and methods are provided for enhancing techniques for provisioning optical channels to allow optical networks to operate in an optimal fashion. A method, according to one implementation, includes receiving measured optical performance parameters of a plurality of optical channels transmitted over an optical spectrum between two network elements in an optical line system; determining a performance profile of the optical spectrum based on the measured optical performance parameters; translating the performance profile into configuration information for the two network elements; and causing provisioning of the two network elements based on the configuration information. The measured optical performance parameters are for one or more unassigned optical channels on the optical spectrum, with the measured optical performance parameters being made on one or more optical modems.

18 Claims, 44 Drawing Sheets

(56) References Cited

U.S. PATENT DOCUMENTS

| | | |
|---|---|---|
| 8,509,621 B2 | 8/2013 | Boertjes et al. |
| 8,554,074 B2 | 10/2013 | Boertjes et al. |
| 8,750,706 B2 | 6/2014 | Boertjes et al. |
| 8,958,696 B2 | 2/2015 | Boertjes et al. |
| 9,077,474 B2 | 7/2015 | Boertjes et al. |
| 9,577,763 B2 | 2/2017 | Al Sayeed et al. |
| 9,628,189 B2 | 4/2017 | Châtelain et al. |
| 9,634,791 B2 | 4/2017 | Boertjes et al. |
| 9,729,265 B2 | 8/2017 | Hurley et al. |
| 9,806,803 B2 | 10/2017 | Bownass et al. |
| 9,831,947 B2 | 11/2017 | Boertjes |
| 9,831,977 B2 | 11/2017 | Boertjes et al. |
| 9,973,295 B2 | 5/2018 | Al Sayeed et al. |
| 10,236,981 B2 | 3/2019 | Harley et al. |
| 10,237,011 B2 | 3/2019 | Al Sayeed et al. |
| 10,277,311 B2 | 4/2019 | Archambault et al. |
| 10,361,957 B1 | 7/2019 | MacKay et al. |
| 10,404,365 B2 | 9/2019 | Frankel et al. |
| 10,455,300 B2 | 10/2019 | Swinkels et al. |
| 10,461,880 B2 | 10/2019 | Boertjes et al. |
| 10,536,235 B2 | 1/2020 | Al Sayeed et al. |
| 10,587,339 B1 | 3/2020 | Al Sayeed et al. |
| 10,680,739 B2 | 6/2020 | Swinkels et al. |
| 10,715,888 B2 | 7/2020 | Swinkels et al. |
| 10,784,980 B2 | 9/2020 | Roberts et al. |
| 10,784,981 B2 | 9/2020 | Boertjes et al. |
| 2003/0042402 A1 | 3/2003 | Boertjes et al. |
| 2004/0151426 A1 | 8/2004 | Boertjes et al. |
| 2007/0212064 A1 | 9/2007 | Boertjes et al. |
| 2015/0229404 A1 | 8/2015 | Boertjes |
| 2015/0229528 A1 | 8/2015 | Swinkels et al. |
| 2016/0080084 A1 | 3/2016 | Boertjes et al. |
| 2018/0239522 A1 | 8/2018 | Campbell et al. |
| 2018/0359029 A1 | 12/2018 | Shiner et al. |
| 2019/0342262 A1* | 11/2019 | Peng .................. H04L 61/5076 |
| 2020/0036468 A1* | 1/2020 | Roberts ............. H04Q 11/0066 |
| 2020/0076499 A1 | 3/2020 | Al Sayeed et al. |
| 2020/0348181 A1 | 11/2020 | Pei et al. |

FOREIGN PATENT DOCUMENTS

| | | |
|---|---|---|
| WO | 2010/012100 A1 | 2/2010 |
| WO | 2018/215850 A1 | 11/2018 |
| WO | 2020/198574 A1 | 10/2020 |

\* cited by examiner

| Responsibilities | Shelf (SPLI) | Shelf (primary) | Shelf (optical pass-through) |
|---|---|---|---|
| SNC/SNCG Management | | Required | |
| Inventory Operation | Required | Required | Required |
| ADJTX / Line Rate Changes | Required | | |
| Additional Mux/Demuxes | Optional | Optional | |
| Channel, WSS Frequency Changes | | Required | Required |
| OPM Performance Monitoring | | Required | |
| Surface-mounted Devices | Optional | | |
| Domain Optical Controller | | Required | |

FIG. 17A

| Responsibilities | Shelf (primary) |
|---|---|
| SNC/SNCG Management | Required |
| Inventory Operation | Required |
| ADJTX / Line Rate Changes | Required |
| Additional Mux/Demuxes | Optional |
| Channel, WSS Frequency Changes | Required |
| OPM Performance Monitoring | Required |
| Surface-mounted Devices | Optional |
| Domain Optical Controller | Required |

FIG. 17B

AUTONOMOUS, ZERO TOUCH PROVISIONING OF OPTICAL CHANNELS IN OPTICAL LINE SYSTEMS

CROSS-REFERENCE TO RELATED APPLICATION(S)

The present disclosure is a continuation of U.S. patent application Ser. No. 17/224,173, filed Apr. 7, 2021, the contents of which are incorporated by reference in their entirety.

FIELD OF THE DISCLOSURE

The present disclosure generally relates to optical networking. More particularly, the present disclosure relates to systems and methods for autonomous commissioning or provisioning of optical channels in previously unassigned channels in optical line systems.

BACKGROUND OF THE DISCLOSURE

As described herein and known in the art, an optical network includes one or more transmitters which transmit optical channels over an optical fiber and are received at one or more receivers. This enables data transmission over a distance, and there can be various intermediate components in the optical network, which can be referred to as an optical line system, including, e.g., optical amplifiers, Variable Optical Attenuators (VOAs), gain flattening filters, multiplexers/demultiplexers, etc. There is visibility of the optical channels at various points along the optical fiber in a typical integrated solution, e.g., via Optical Channel Monitors (OCMs), power monitors, etc. There are various examples where an optical network is not an integrated solution, e.g., transmitters and receivers are connected into the optical line system which is separate. Here, the transmitters and receivers are connected to a "black box" system where all visible channels are the transmitted channels at the transmitters and the received channels at the receivers. Examples of such systems include submarine systems (where the submarine optical line system is from one vendor and the optical transceivers or modems are from another vendor), disaggregated optical systems, e.g., in terrestrial deployments where similarly the optical line system is from a different vendor as the optical transceivers or modems, e.g., "alien wavelengths," and the like. As described herein, the terms "foreign optical line system" or "foreign line system" are used to denote a situation where the terminals (transmitters/receivers) are separate from the optical line system, and such term is meant to include submarine systems, disaggregated optical systems, or any other "black box" configuration.

A disadvantage of such systems is knowledge of intermediate system parameters for the optical line system is unknown or inaccessible to traffic carrying channels. Intermediate system parameters can include but are not limited to channel powers, Signal-to-Noise Ratio (SNR), Noise-to-Signal Ratio (NSR), Optical SNR (OSNR), frequency-dependent powers, gains, losses, and noise figures, etc. at any point within the system other than at the transmit and receive ends.

In addition to lacking knowledge of intermediate system parameters, there can be a lack of data communication between two terminals or nodes at ends of a foreign optical line system. Such limitation causes difficulty in turn-up or commissioning of an optical network. In a typical optical network, service channels such as Optical Service Channels (OSCs), are used extensively to relay information between nodes through in-band or out-of-band communication channels. The photonics control and Layer 0 Control Plane messaging relayed via service channels are paramount in minimizing operational complexity during the turn-up or commissioning of an optical network. However, many multi-span point-to-point and mesh networks operate in the absence of a service channel, i.e., foreign optical line systems. Optical performance parameters typically relayed via service channels are not readily available in a foreign line system, consequently requiring the system to be manually characterized prior to commissioning. Turn-up and commissioning of these systems can take multiple weeks due to the intensive manual characterization process associated with the terminal equipment. Translation of manually gathered data to Layer 0 Control Plane (LOCP) adds further complexity to channel planning, and provisioning of Tx Adjacencies (TX ADJ), Sub-Network Connections (SNC), SNC Groups (SNCG), etc. by a user or multiple users on each individual node.

Current approaches to turn-up and commissioning, such as Zero Touch Provisioning (ZTP) and various automated optical control schemes, require communications between data elements and more importantly channels to be pre-provisioned with a pre-known setting. This is not available in foreign line systems. These settings are static and determined during the planning phase of any line system turn-up. They rely on network planning tools and monitoring points within a line system to create and/or optimize the system.

Automation tools for submarine or foreign line systems have been developed to simplify turn-up. However, these tools are highly limited at determining transmission modes and channel layouts/configurations and do not provide the full set of parameters required for system commissioning. This drives a need for characterization, optimization, and validation with real modems deployed with specialized portable terminal equipment to help derive the baseline performance. Often, this activity takes place at an early stage of build out and basic communications between NEs are unavailable, which presents challenges for LOOP and Photonics control.

This activity is not only resource intensive but is typically a beginning of deployment activity that is not routinely re-visited due to cost, downtime, and logistics. Ideally, this would be revisited with introduction of new modem technologies or if a new baseline is required due to suspected network changes. Therefore, there is a need to overcome the above-noted issues in conventional turn-up or commissioning strategies for enabling automatic provisioning or commissioning of previously-unassigned channels in an optical spectrum in order to allow data communication between a near-end network element and other components connected to the unknown optical link system.

BRIEF SUMMARY OF THE DISCLOSURE

The present disclosure relates to systems and methods for autonomous provisioning of optical channels in submarine or foreign optical line systems. A near-end network element, according to one implementation, includes a plurality of modems arranged within a group or multiple groups. The modems are configured to communicate optical signals within an optical spectrum across an unknown optical link system to be commissioned and are configured to transmit the optical signals to an unknown far-end network element. The near-end network element further includes a processing device and a memory device configured to store computer logic having instructions that, when executed, enable the processing device to utilize the plurality of modems to measure optical performance parameters of a plurality of optical channels of the optical spectrum. Each optical channel is previously unassigned in the unknown optical link system. The instructions further enable the processing device to provision the plurality of optical channels based on the measured optical performance parameters to enable data communication between the near-end network element and the far-end network element. It should be noted that, before commissioning, the unknown optical link system does not allow data communication between the near-end network element and the far-end network element.

In some implementations, the above-described near-end network element (and related systems and methods) may be further configured, whereby the instructions enable the processing device to measure the optical performance parameters by measuring Effective Signal-to-Noise Ratio (ESNR) parameters versus frequency. Note, while described herein using ESNR, it is possible to leverage other parameters such as Optical Signal-to-Noise Ration (OSNR) and the like. The ESNR parameters may be measured when the optical signals are transmitted from the near-end network element to the far-end network element. The ESNR parameters may be measured in a spectral sweep characterization operation where ESNR is measured for each of a plurality of groups of optical channels in a sequential frequency-dependent manner. For example, the number of optical channels in each group may be based on the number of modems in each group. According to various implementations, the near-end network element may further include a User Interface (UI) configured to enable a user to enter characterization settings, wherein the ESNR may be measured for each group based on the characterization settings. The characterization settings, for example, may include one or more of a skip factor for defining a number of optical channels to skip, a reading number defining the number of simultaneous ESNR readings with respect to the frequencies in the optical spectrum, a provisioning order for defining a direction with respect to frequencies of the optical spectrum that each simultaneous ESNR reading proceeds, and a starting position defining a position within the optical spectrum where each of the number of simultaneous ESNR reading starts. In addition (or alternatively), the optical performance parameters may include coherent optical performance parameters, such as measurements of Transmitter (Tx) power versus frequency and/or measurements of flat channel launch powers.

According to additional implementations, the User Interface (UI) may further be configured to enable a user to enter initialization settings, wherein the initialization settings may include one or more of a communication boundary at an edge of the optical spectrum, a channel count, an initial line rate or Baud rate, a probe line rate, a base line rate, and an upshift line rate, and wherein the UI is implemented within one or more of a Layer 0 Control Plane (LOOP), a server, a Network Management System (NMS), a Domain Optical Controller (DOC), a node management system, a software-defined network controller, and a network orchestrator. Also, the unknown optical link system may include one or more intermediate optical devices and/or branching units. The instructions may further enable the processing device to perform an optimization process of changing an initial line rate based on a difference between the optical performance parameters measured at given line rates, wherein the optimization process may be based on an Effective Signal-to-Noise Ratio (ESNR) threshold set by a user.

The unknown optical link system, according to some implementations, may be a submarine fiber system or some other foreign line system configured in a point-to-point network before Optical Service Channels (OSCs) are assigned for data communication between the near-end network element and the far-end network element and before configuration information and spectrum usage information is coordinated between the near-end network element and the far-end network element. The near-end network element and far-end network element may be configured as or include Submarine Line Termination Equipment (SLTE). Each of the plurality of modems may initially be configured with a default provisioning state and the optical spectrum may initially be pre-loaded with Amplified Spontaneous Emission (ASE) channel holders.

In response to provisioning the plurality of optical channels, the instructions may further enable the processing device to commission the near-end network element and far-end network element. Also, the instructions may further enable the processing device to utilize the optical performance parameters to execute one or more actions including populating one or more provisioning templates, creating a photonic topology, formulating topology parameters, configuring a control plane system in the unknown optical link system, building a channel profile, performing a channel planning procedure to maximize system capacity, defining optimization criteria, re-optimizing a channel plan after a cable fault or repair, and performing spectral filtering, dead-band conditioning, and guard-band conditioning.

BRIEF DESCRIPTION OF THE DRAWINGS

The present disclosure is illustrated and described herein with reference to the various drawings, in which like reference numbers are used to denote like system components/method steps, as appropriate.

FIG. 17A is a table illustrating the responsibilities of each shelf of a multi-shelf instantiation for commissioning unassigned channels of an unknown optical link system, according to various embodiments of the present disclosure.

FIG. 17B is a table illustrating the responsibilities of a shelf of a single-shelf instantiation for commissioning unassigned channels, according to various embodiments of the present disclosure.

DETAILED DESCRIPTION OF THE DISCLOSURE

The present disclosure relates to systems and methods for autonomous provisioning of optical channels in submarine or foreign optical line systems. The present disclosure relates to systems and methods of provisioning two nodes on a fiber link (i.e., an initially unknown or un-commissioned fiber link) where there is no data communication between the nodes. However, as described in the present disclosure, although there is no "data" communication of Optical Service Channels (OSCs) or other service channels and no communication of configuration information or other types of bandwidth coordination between end-points. For example, the embodiments of the present disclosure may be used for commissioning or provisioning channels in a previously-unassigned system. The embodiments described herein may therefore be beneficial in an environment where an optical line system is unknown (or in the process of being developed), such as a submarine optical fiber system or a foreign line system.

Of course, it is typically difficult in this situation since the two sides cannot coordinate configuration, spectrum usage, etc. Conventional approaches can normally take weeks to commission or provision such as an optical link system and the processes are manually intensive. In one example, an end-to-end submarine system may include a node site on one end in the United States and another node site in the United Kingdom. When the submarine system is initially installed or deployed (or in other events when discovery may be needed), the end nodes are unable to directly communicate with each other, because the channels have yet to be provisioned in an agreed-upon manner. Thus, installers at each of the two end node sites must resort to manually entering data, which can be time-consuming and labor intensive.

There may be different ways to characterize a foreign line system. For example, some implementations may include getting intermediate system parameters, e.g., ESNR, OSNR, etc. This technique may include transmitting across the spectrum and measuring the other side to determine the intermediate system parameters. An example of system measurement and optimization of foreign line systems is described in commonly-assigned U.S. patent application Ser. No. 17/134,840, filed Dec. 28, 2020, and entitled "Power optimization of point-to-point optical systems without visibility of intermediate system parameters," the contents of which are incorporated by reference in their entirety.

However, according to embodiments of the present disclosure, the systems and methods may include automatically provisioning one or more channels over a foreign line system. This process may include the actions at one end node (e.g., network element) since the other end node may be an unknown device operating in a different jurisdiction (or country).

Optical System

Figure 1:
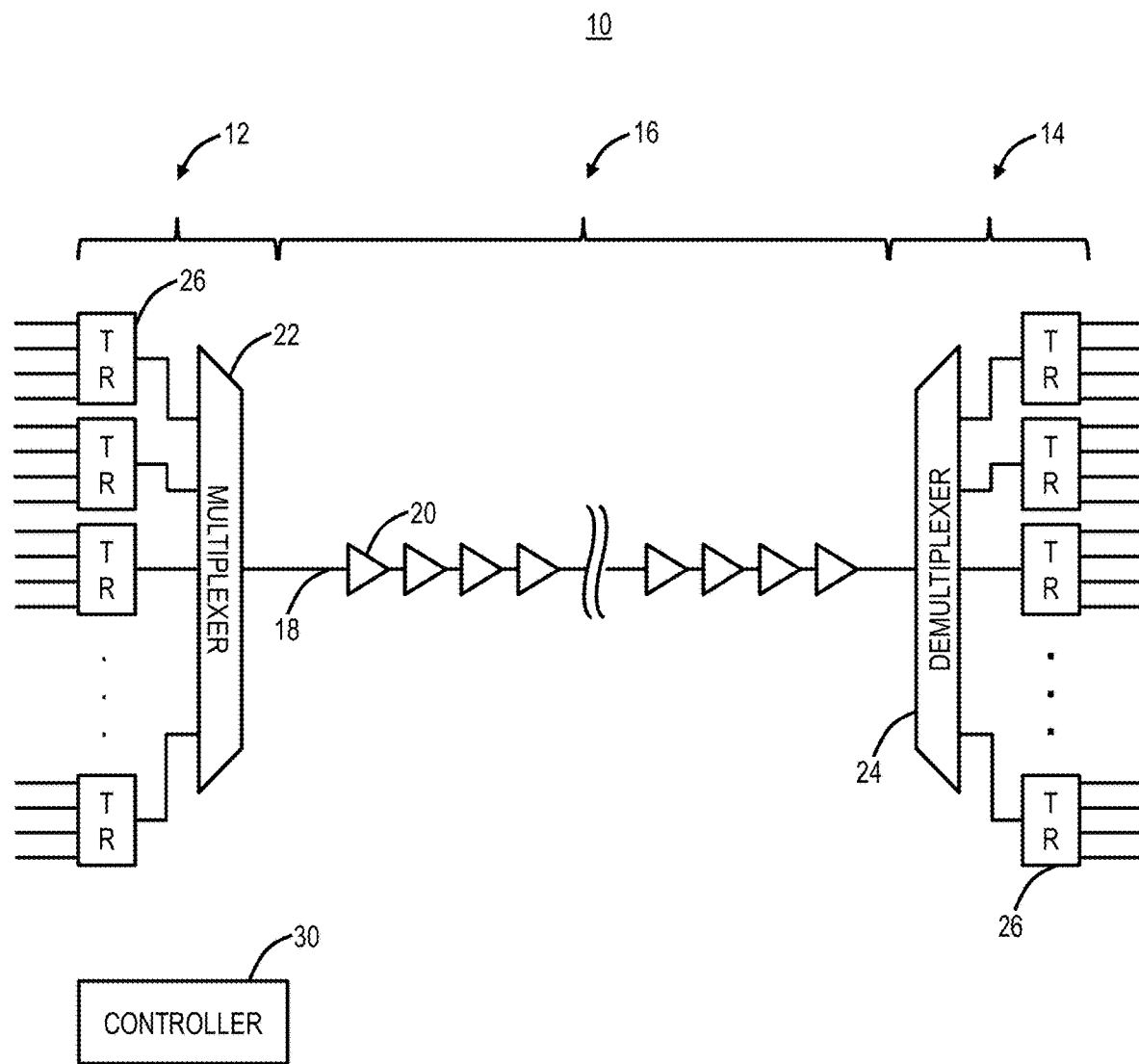
FIG. 1 is a schematic diagram illustrating an optical system, according to various embodiments of the present disclosure.

FIG. 1 is a network diagram of an example optical system 10. For illustration purposes, the example optical system 10 is shown with a single direction from a first node 12 to a second node 14. The example optical system 10 generally includes, from a topology perspective, the nodes 12, 14, an intermediate system 16, and an optical fiber 18 interconnecting the nodes 12, 14. Of course, a practical embodiment will include the opposite direction, but the techniques described herein focus on a single direction of propagation through optical fiber 18. The intermediate system 16 can include one or more intermediate optical amplifiers 20.

The nodes 12, 14 are terminals and can include optical multiplexers 22, demultiplexers 24, and transceivers/transponders/modems 26. The objective of the optical system 10 is to transmit data from the node 12, via the modems 26, to the node 14. In an embodiment, the optical system 10 is a foreign line system where the nodes 12, 14 have no knowledge or visibility of intermediate system parameters at various points along the intermediate system 16. In another embodiment, the optical system 10 is a submarine system where the nodes 12, 14 are terminal stations and the intermediate system 16 is a wet plant, each being from different vendors. A controller 30 can communicate with the nodes 12, 14, for obtaining data related to operation of the modems 26, such as setting the power at the transmit side at the node 12 and obtaining received power and other performance metrics, e.g. bit-error-ratio, signal-to-noise ratio, etc. at the receive side at the node 14.

The optical system 10 can also be referred to as a section or an Optical Multiplex Section (OMS). The present disclosure contemplates operation on the fiber 18 in a section, i.e., a point-to-point system, i.e., all channels transmitted at the ingress are received at the egress.

Figure 2:
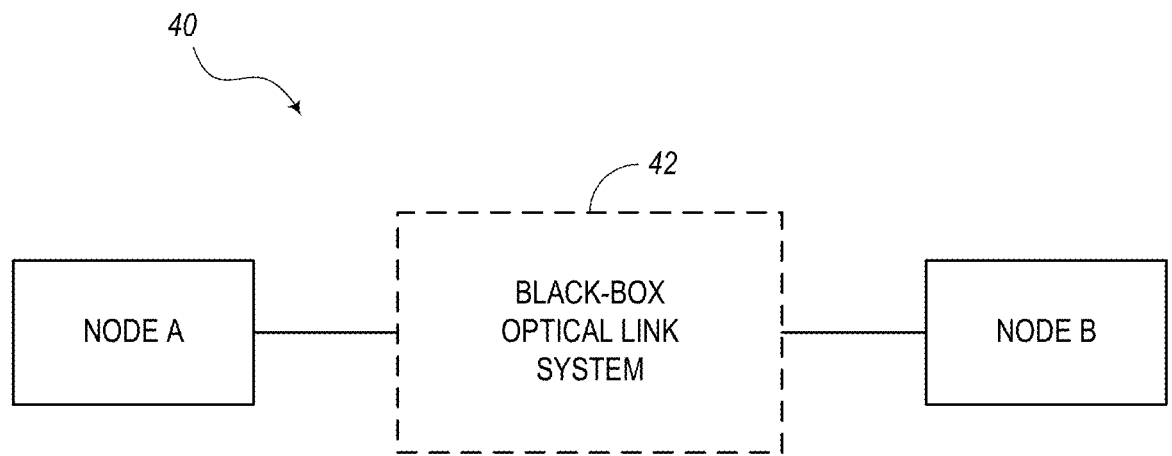
FIG. 2 is a block diagram illustrating an unknown optical link system connecting two nodes of an optical system, according to various embodiments of the present disclosure.

FIG. 2 is a block diagram illustrating an embodiment of an optical system 40 connecting at least two nodes (i.e., Node A and Node B). In this example, the optical system 40 includes a black-box optical link system 42, which is viewed as an unknown optical link system having fiber optic cables, amplifiers, Optical Add/Drop Multiplexers (OADMs), branching units, etc. One of the goals of the provisioning (or commissioning) procedures of the present disclosure includes determining features of the black-box optical link system 42 in order to optimize or maximize operational parameters of the optical system 40. For example, as described in the present disclosure, the actions of "maximizing," "optimizing," etc. should be understood as an attempt to produce a generally optimal operating condition or at least to improve various operating parameters to allow an optical system (e.g., optical system 40) to function in a reasonably efficient manner.

Figure 3:
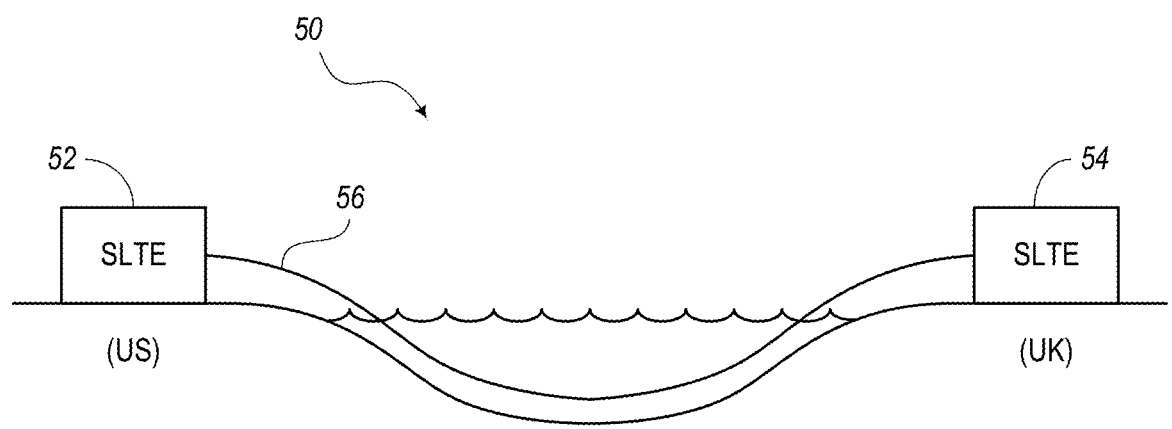
FIG. 3 is a diagram illustrating a submarine optical link system, according to various embodiments of the present disclosure.

FIG. 3 is a diagram illustrating an embodiment of a submarine optical link system 50. In this embodiment, the submarine optical link system 50 include a first Submarine Line Termination Equipment (SLTE) device 52 at one end and a second SLTE device 54 at the other end. The first and second SLTE devices 52, 54 may be configured to communicate with each other via a submarine fiber cable 56 that is installed under the sea 58. In one example, the first SLTE device 52 may be arranged in one country (e.g., the US) and the second SLTE device 54 may be arranged in another country (e.g., the UK). The first and second SLTE devices 52, 54 may be configured as a first end node and a second end node, respectively, whereby the submarine fiber cable 56 may include one or more optical amplifiers, branching units, etc.

Generic Computing System

Figure 4:
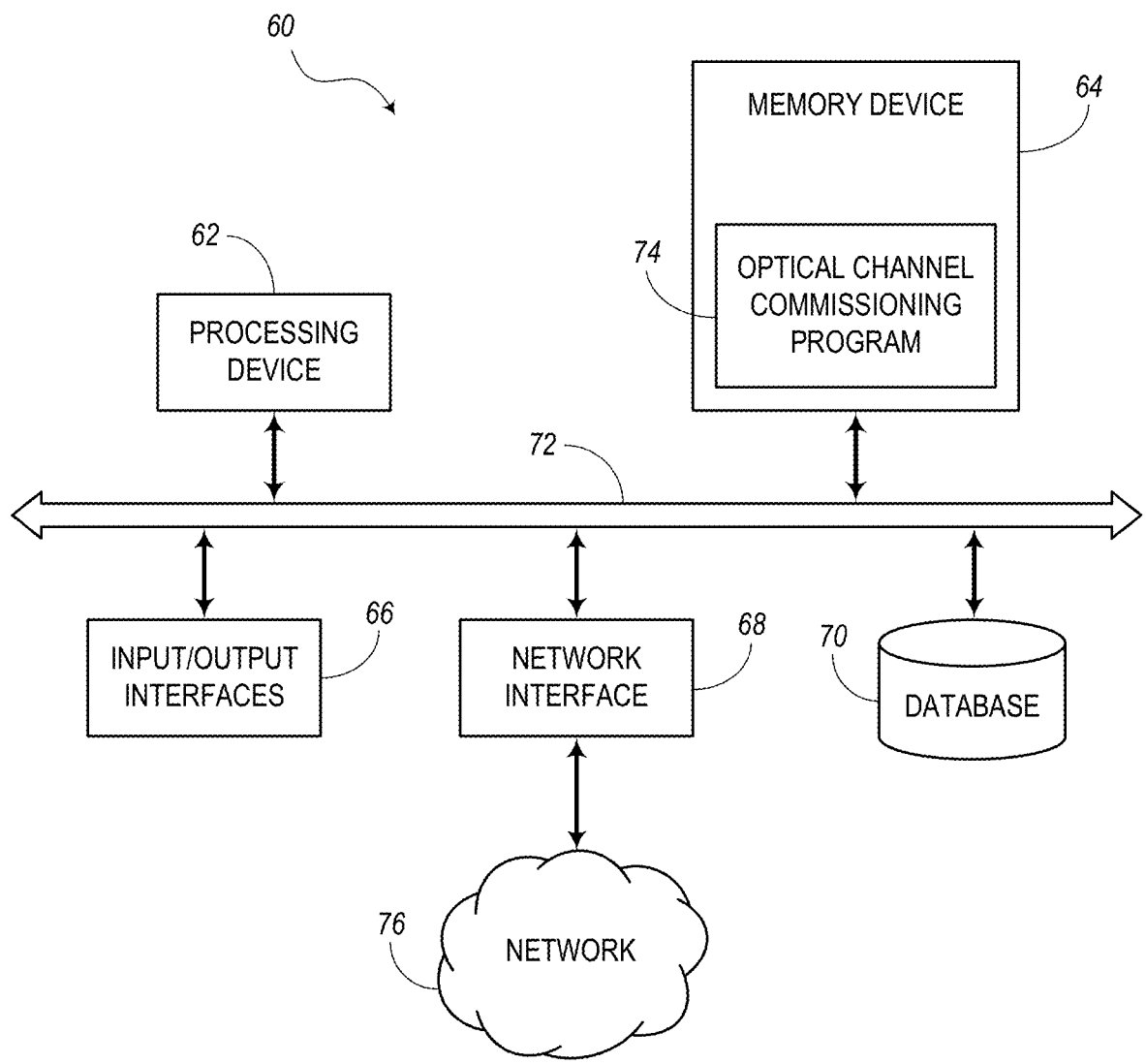
FIG. 4 is a block diagram illustrating a computer system for provisioning optical channels in an unknown optical link system, according to various embodiments of the present disclosure.

FIG. 4 is a block diagram illustrating an embodiment of a computer system 60 for provisioning (or commissioning) optical channels in an unknown optical link system. The computer system 60 may be configured as a Layer 0 Control Plane (LOOP) device or other control device for supervisory, management, and/or control purposes in a network. The computer system 60 may be associated with one end node (e.g., node 12 shown in FIG. 1, Node A shown in FIG. 2, the first SLTE device 52 shown in FIG. 3, etc.) located as "near-end" of the optical system. In this sense, the "near-end" may designate either of the two ends of the optical systems and is configured to perform various actions, as described in the present disclosure, for commissioning, provisioning, turning-up, etc. the unknown (or un-commissioned) optical link system connecting the near-end node with the far-end node. Of course, in these embodiments, the "far-end" node refers to the other (perhaps unknown) node at the other end of the optical system. The computer system 60 may be implemented within one or more of a Layer 0 Control Plane (LOOP), a server, a Network Management System (NMS), a Domain Optical Controller (DOC), a node management system, a software-defined network controller, and a network orchestrator.

In the embodiment of FIG. 4, the computer system 30 may be a digital computer that, in terms of hardware architecture, generally includes a processing device 62, a memory device 64, input/output (I/O) interfaces 66, a network interface 68, and a database 70. It should be appreciated by those of ordinary skill in the art that FIG. 4 depicts the computer system 30 in an oversimplified manner, and a practical embodiment may include additional components and suitably configured processing logic to support known or conventional operating features that are not described in detail herein. The components (62, 64, 66, 68, and 70) are communicatively coupled via a local interface 72. The local interface 72 may be, for example, but not limited to, one or more buses or other wired or wireless connections, as is known in the art. The local interface 72 may have additional elements, which are omitted for simplicity, such as controllers, buffers (caches), drivers, repeaters, and receivers, among many others, to enable communications. Further, the local interface 72 may include address, control, and/or data connections to enable appropriate communications among the aforementioned components.

The processing device 62 is a hardware device for executing software instructions. The processing device 62 may be any custom made or commercially available processor, a Central Processing Unit (CPU), an auxiliary processor among several processors associated with the controller 30, a semiconductor-based microprocessor (in the form of a microchip or chipset), or generally any device for executing software instructions. When the computer system 60 is in operation, the processing device 62 is configured to execute software stored within the memory device 64, to communicate data to and from the memory device 64, and to generally control operations of the computer system 60 pursuant to the software instructions. The I/O interfaces 66 may be used to receive user input from and/or for providing system output to one or more devices or components.

The network interface 68 may be used to enable the computer system 60 to communicate on a network 76, such as the Internet. The network interface 68 may include, for example, an Ethernet card or adapter or a Wireless Local Area Network (WLAN) card or adapter. The network interface 68 may include address, control, and/or data connections to enable appropriate communications on the network. A database 70 may be used to store data. The database 70 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the database 70 may incorporate electronic, magnetic, optical, and/or other types of storage media. In one example, the database 70 may be located internal to the computer system 60, such as, for example, an internal hard drive connected to the local interface 72 in the computer system 60. Additionally, in another embodiment, the database 70 may be located external to the computer system 60 such as, for example, an external hard drive connected to the I/O interfaces 66 (e.g., SCSI or USB connection or Ethernet). In a further embodiment, the database 70 may be connected to the controller 30 through a network, such as, for example, a network-attached file server.

The memory device 64 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory device 64 may incorporate electronic, magnetic, optical, and/or other types of storage media. Note that the memory device 64 may have a distributed architecture, where various components are situated remotely from one another but can be accessed by the processing device 62. The software in memory device 64 may include one or more software programs, each of which includes an ordered listing of executable instructions for implementing logical functions. The software in the memory device 64 includes a suitable Operating System (O/S) and one or more programs, such as an optical channel commissioning program 74. The 0/S essentially controls the execution of other computer programs, such as the optical channel commissioning program 74, and provides scheduling, input-output control, file and data management, memory management, and communication control and related services. The one or more programs may be configured to implement the various processes, algorithms, methods, techniques, etc. described herein.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

According to some embodiments, the computer system 60 may be associated with a near-end network element or may be incorporated within a near-end network element (e.g., node 12, Node A, SLTE 52, or other domestic end node) for performing actions with respect to the commissioning one or more optical channels in an unknown optical link system. For example, the near-end network element may include or may be associated with a plurality of modems arranged within a Sub-Network Connection Group (SNCG). The plurality of modems may be configured to communicate optical signals within an optical spectrum across an unknown optical link system (e.g., intermediate system 16, black-box optical link system 42, submarine fiber cable 56, etc.) to be commissioned. The plurality of modems may be configured to transmit the optical signals to an unknown far-end network element (e.g., node 14, Node B, SLTE 54, or other foreign end node). The memory device 64 may be configured to store computer logic (e.g., optical channel commissioning program 74) having instructions that, when executed, enable the processing device 62 to utilize the plurality of modems to measure optical performance parameters of a plurality of optical channels of the optical spectrum. Each optical channel may be previously unassigned in the unknown optical link system. The optical channel commissioning program 74 may further enable the processing device 62 to provision the plurality of optical channels based on the measured optical performance parameters to enable data communication between the near-end network element and the far-end network element. It should be noted that, before commissioning, the unknown optical link system does not allow data communication between the near-end network element and the far-end network element.

More particularly, the optical channel commissioning program 74 may further enable the processing device to measure the optical performance parameters by measuring Effective Signal-to-Noise Ratio (ESNR) parameters versus frequency, as described in more detail below. The ESNR parameters may be measured when the optical signals are transmitted from the near-end network element to the far-end network element. The ESNR parameters may be measured in a spectrum sweep characterization operation, whereby ESNR is measured for each of a plurality of groups of optical channels in a sequential frequency-dependent manner. Note, the terms "tool," "spectrum optimization," and "spectrum sweep" are used interchangeably herein. The number of optical channels in each group may be based on the number of modems in each SNCG.

The I/O interfaces 66 may include a User Interface (UI) or Graphical User Interface (GUI) that may allow a user (e.g., network operator or other network management/control person) to enter various settings. For example, the user may enter data regarding the identity of the near-end node and, in some embodiments, the identity of the far-end node. Also, the user may enter (e.g., via the UI or GUI) Initialization settings, Characterization settings, Optimization settings, Plan settings, Provision settings, and/or Verification settings. These settings are used to defined aspects of the optical spectrum to be commissioned, the number of channels that the optical spectrum is to include, an initial line rate (e.g., Baud rate) for characterization, a skip factor (as described below), among other features.

For example, the UI may enable a user to enter characterization settings, wherein the ESNR is measured for each group based on the characterization settings. The characterization settings include one or more of a skip factor for defining a number of optical channels to skip, a reading number defining the number of simultaneous ESNR readings with respect to the frequencies in the optical spectrum, a provisioning order for defining a direction with respect to frequencies of the optical spectrum that each simultaneous ESNR reading proceeds, and a starting position defining a position within the optical spectrum where each of the number of simultaneous ESNR reading starts.

Figure 32:
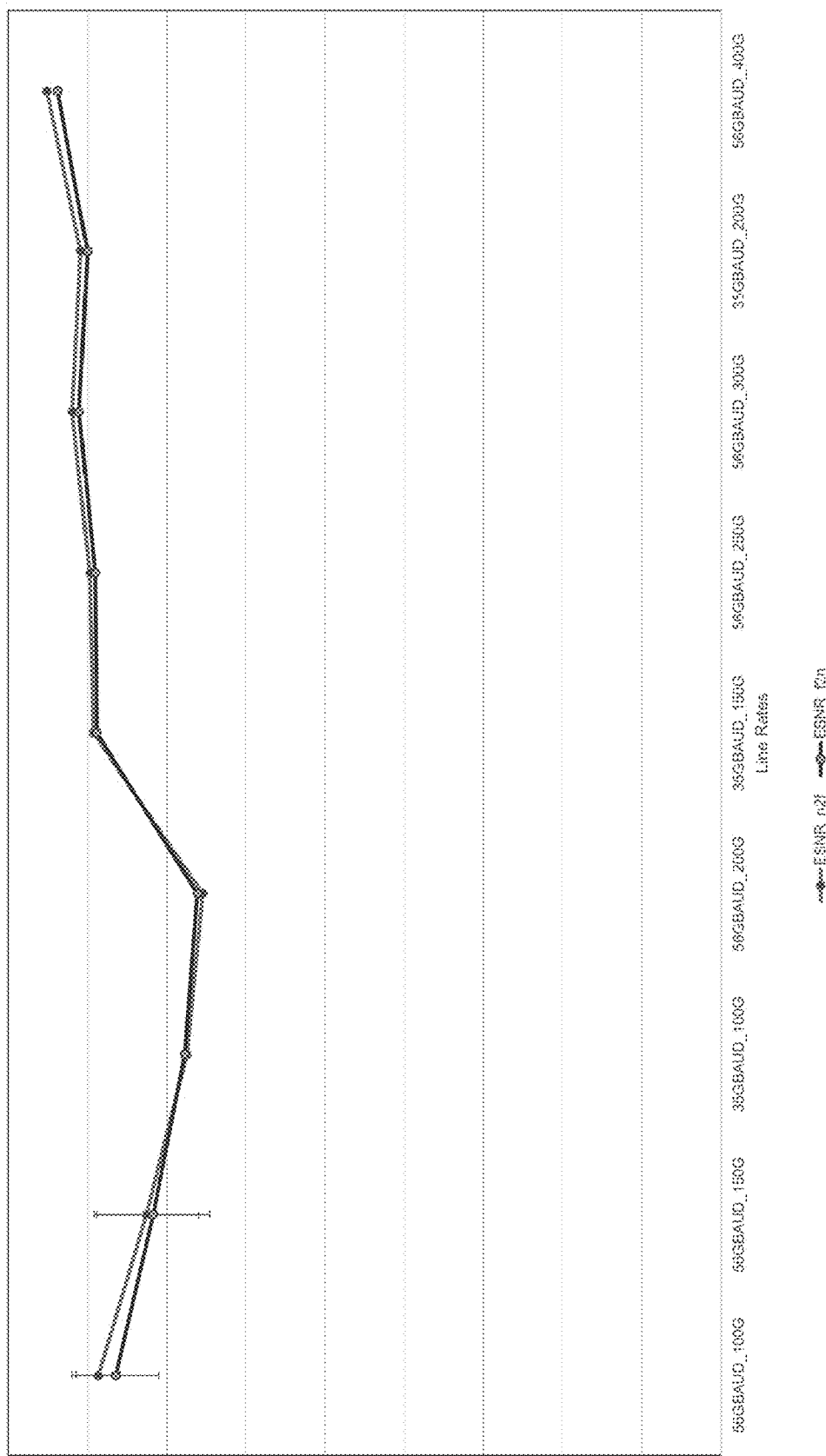
FIG. 32 is a diagram illustrating a chart of ESNR measurements across possible line rates, according to various embodiments of the present disclosure.

In addition to measuring ESNR of the channels, the computer system 60 (e.g., near-end network element) may be configured to measure other types of optical performance parameters, such as coherent optical performance parameters, measurements of Transmitter (Tx) power versus frequency, measurements of flat launch channel power, or other parameters. The computer system 60 may further utilize the optical channel commissioning program 74 in a near-end network element such that the UI may enable a user to enter Initialization settings. For example, the Initialization settings may include one or more of a communication boundary at an edge of the optical spectrum, a channel count, an initial line rate or Baud rate, a probe line rate, a base line rate, and an upshift line rate (moving to a faster rate). Probe line rate is the line rate which is used to evaluate ESNR, i.e., ESNR is measured at that line rate. In FIG. 32, one can see that while ESNR should be an absolute measure, it is not stable for the same channel across different line rates as apparently when there is too much margin (i.e., current line rate ESNR cutoff is too far from the actual ESNR), this result in some instability in ESNR measured. Therefore, Probe line rates should be high enough to minimize this margin while not too high to avoid causing channel fail to optimize. Probe line rate should be ideally stable across entire spectrum but doesn't have to be. However, baseline must be stable across the entire spectrum and viable anywhere. Upshift line rate is essentially just one higher line rate from baseline. The unknown optical link system may include one or more intermediate optical devices or branching units. The instructions of the optical channel commissioning program 74 may further enable the processing device 62 to perform an optimization process of changing an initial line rate based on a difference between the optical performance parameters measured at different line rates, as described in more detail below. The optimization process may be based on an ESNR threshold set by a user.

The unknown optical link system described herein may be a submarine fiber system, a foreign line system, or other unknown photonic transmission system. The unknown optical link system may be part of a point-to-point network, which, at the time of the start of the commissioning of the system, may have unassigned features. This may be a time before Optical Service Channels (OSCs) are assigned for data communication between the near-end network element and the far-end network element and/or before configuration information and spectrum usage information is coordinated between the near-end network element and the far-end network element. Again, the near-end network element and far-end network element may include Submarine Line Termination Equipment (SLTE).

The near-end network element running the optical channel commissioning program 74 may be configured where each of the plurality of modems may initially be configured with a default provisioning state and the optical spectrum may initially be pre-loaded with Amplified Spontaneous Emission (ASE) channel holders. In response to provisioning the plurality of optical channels, the instructions of the optical channel commissioning program 74 may further enable the processing device 62 to commission the near-end network element and far-end network element. The instructions may also enable the processing device 62 to utilize the optical performance parameters to execute certain actions, such as: a) populating one or more provisioning templates, b) creating a photonic topology, c) formulating topology parameters, d) configuring a control plane system in the unknown optical link system, e) budding a channel profile, f) performing a channel planning procedure to maximize system capacity, g) defining optimization criteria, h) re-optimizing a channel plan after a cable fault or repair, and i) performing spectral filtering, dead-band conditioning, and guard-band conditioning.

The present disclosure describes a platform with the objective of commissioning a point-to-point LOOP network by formulating topology parameters and provisioning information based on the measured line system parameters. The term "point-to-point" may refer to various components of an optical system or network (e.g., intermediate Optical Add/Drop Multiplexer (OADMs), branching units, etc.), as long as there is an optical path between the two endpoints (near end and far end). Although an optical path exists, at a time when the system or network is first installed but not yet put into operation, the system or network does not allow data communication between the end points since the photonic channels would not yet be provisioned for data communication.

In a submarine or foreign line system, the baseline configuration for any Submarine Line Terminal Equipment (SLTE) pre-loads the network with a full-band of ASE. Transmission of a single channel or a group of channels may then be loaded in order to screen the spectral performance of the network and collect relevant network parameters. Based on these results, the optical channel commissioning program 74 may allow for the planning and building of a channel profile based on the available degrees of freedom (e.g., Baud rates, power, line optimization modes, dispersion, etc.) in the modems. In the present disclosure, the established channel profile may also contain LOOP configuration parameters to satisfy Day 1 operational requirements as well as Day N operational requirements. The channel profile may be built in a way that is capacity-optimized, cost-optimized, or optimized in other ways. Again, the terms "optimization," "optimal," "maximization," "maximum," etc. may actually be considered to be improvements to, better operating, or even best-available network conditions for sufficient efficiency for normal network operation and not necessarily the very best condition that may ultimately be conceived.

Also, the channel profile may be configured to accommodate staggered timelines of each customer's network. The staggered timelines may refer to a situation where the user or operator can select goals (e.g., margin-optimized, capacity-optimized, client mapping, etc.) and the analysis can take this into account for future modems. It should be noted that the embodiments of the present disclosure may be configured to complement Amplified Simultaneous Emission (ASE) channel holder techniques. Any configuration performed on Day 1 can be scaled to Day N as the ASE can be replaced, as needed, with actual operating channels.

The optical channel commissioning program 74 (as well as other systems and methods described in the present disclosure) may be configured to evaluate an optimal network configuration for use in any higher-level controller (e.g., node managers, software-defined controllers, orchestrators, etc.). These methods may, in turn, be used to populate Zero Touch Provisioning (ZTP) files, or the like, as well as other types of servers on internal Dynamic Circuit Networks (DCNs) for explicit use in provisioning and configuration. The embodiments may be directed to an evaluation technique for the characterization of channel and may also be used as an optimization approach.

The embodiments of the systems and methods of the present disclosure may apply to networks without Optical Service Channel (OSC) capabilities, including submarine systems and foreign line systems. The embodiments of the present disclosure treat the optical line system as a black box and enables provisioning of near and far end modems without data communications between them (i.e., no OSC or site-to-site communication) and without a priori knowledge of the optical performance on the optical line system.

Spectrum Sweep Using Wavelength Analysis of Optical Spectrum

A spectrum sweep may be run to characterize performance of an optical link and to allow entry of modem settings, power profiles, etc. The spectrum sweep may be an automated process that characterizes near-end node (e.g., modem) performance across the entire optical spectrum and determines and configures modem parameter settings to maximize system capacity.

The spectrum sweep, according to various embodiments, may include:
1. Measuring Effective Signal-to-Noise Ratio (ESNR) at each channel frequency at a flat launch power.
2. Sweep channel power at a subset of frequencies.
3. Configure system-level optimal launch power based on the results from (1) and (2).

Figure 5:
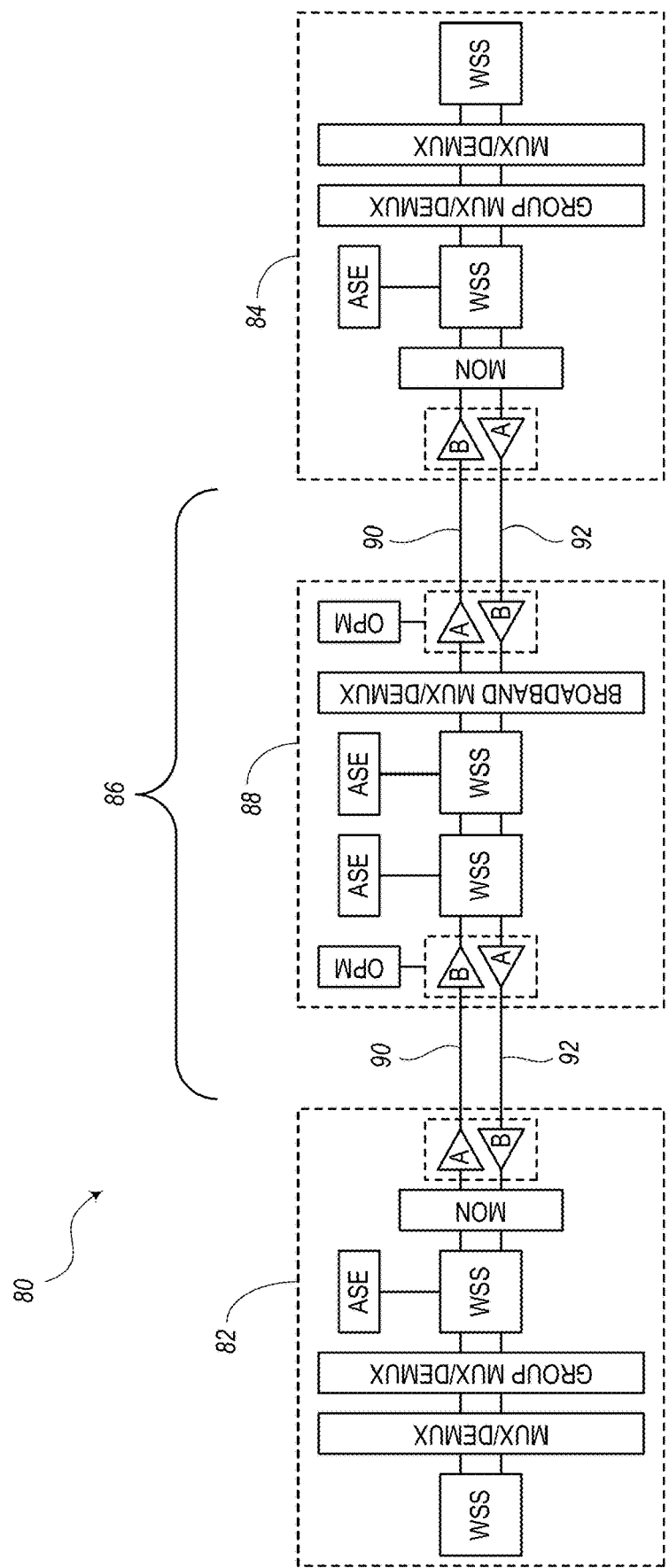
FIG. 5 is a schematic diagram illustrating a Point-to-Point (P2P) system with an optical passthrough, according to various embodiments of the present disclosure.

FIG. 5 is a schematic diagram illustrating an embodiment of a Point-to-Point (P2P) system 80 with an optical pass-through according to a minimum deployment arrangement. A near-end modem 82 (e.g., connected to Submarine Line Termination Equipment (SLTE), etc.) is configured to be provisioned with a far-end modem 84 (e.g., SLTE, etc.) where the near-end modem 82 and far-end modem 84 are arranged to communicate with each other over an unknown optical link system 86. In this embodiment, the unknown optical link system 86 may include an intermediate OADM 88 (e.g., optical passthrough). Also, the unknown optical link system 86 includes a first fiber 90 configured for communication in a first direction from the near-end modem 82 to the far-end modem 84 and a second fiber 92 configured for communication in a second (opposite) direction from the far-end modem 84 to the near-end modem 82 for normal bi-directional communication. It should be noted that additional fibers may be arranged for communication between the near-end modem 82 and far-end modem 84 along additional or alternative paths.

In another embodiment, the optical passthrough may include multiple shelves in each of the modems 82, 84. For example, the modems 82, 84 and the SLTE may be configured for Service and Photonic Layer Interoperability (SPLI).

Figure 6:
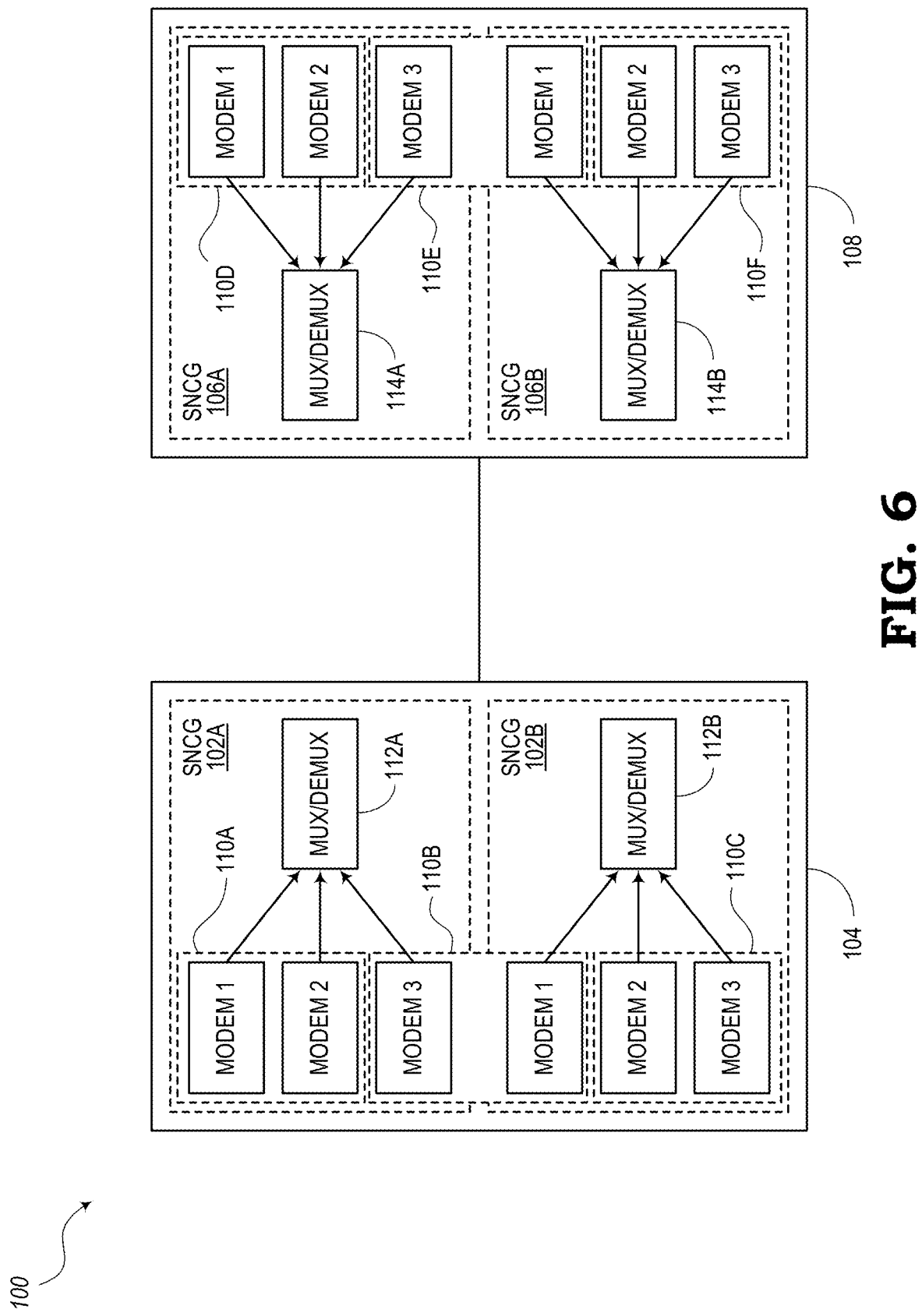
FIG. 6 is a block diagram illustrating a P2P system showing Sub-Network Connection Groups (SNCGs), according to various embodiments of the present disclosure.

FIG. 6 is a block diagram illustrating an embodiment of a P2P system 100 showing Sub-Network Connection Groups (SNCGs) 102A, 102B of a near-end node 104 and SNCGs 106A, 106B of a far-end node 108. Each of the SNCGs 102A, 102B, 106A, 106B may include one or more wave selector devices 110A, 110B, 110C, 110D, 110E, 110F, and/or portions thereof. In some embodiments, a wave selection device (e.g., the wave selector device 110B of the near-end node 104 and the wave selector device 110E of the far-end node 108) may be arranged in two different SNCGs. Each wave selector device 110 may include one or more modems, such that, according to the embodiment shown in FIG. 6, SNCG 102A of the near-end node 104 includes three modems (e.g., Modem 1 and Modem 2 of wave selector device 110A and Modem 3 of wave selector device 110B). Also, SNCG 102B of the near-end node 104 includes three modems (e.g., Modem 1 of wave selector device 110B and Modem 2 and Modem 3 of wave selector device 110c). The SNCG 106A of the far-end node 108 includes three modems (e.g., Modem 1 and Modem 2 of wave selector device 110D and Modem 3 of wave selector device 110E). Also, SNCG 106B of the far-end node 108 includes three modems (e.g., Modem 1 of wave selector device 110E and Modem 2 and Modem 3 of wave selector device 110F).

Furthermore, near-end node 104 of the P2P system 100 includes a Multiplexer/Demultiplexer (MUX/DEMUX) 112A in the SNCG 102A and a MUX/DEMUX 112B in the SNCG 102B. The MUX/DEMUX 112A is configured to handle test traffic through the modems in the SNCG 102A and MUX/DEMUX 112B is configured to handle test traffic through the modems in the SNCG 102B. Also, the far-end node 108 of the P2P system 100 includes a MUX/DEMUX 114A in the SNCG 106A and a MUX/DEMUX 114B in the SNCG 106B. The MUX/DEMUX 114A is configured to handle test traffic through the modems in the SNCG 106A and MUX/DEMUX 114B is configured to handle test traffic through the modems in the SNCG 106B. According to this embodiment, it is possible to utilize one or more modems in each node 104, 108 to enable quicker provisioning of channels, as described in more detail below.

Example of Channel-Provisioning User Interface

Figure 7:
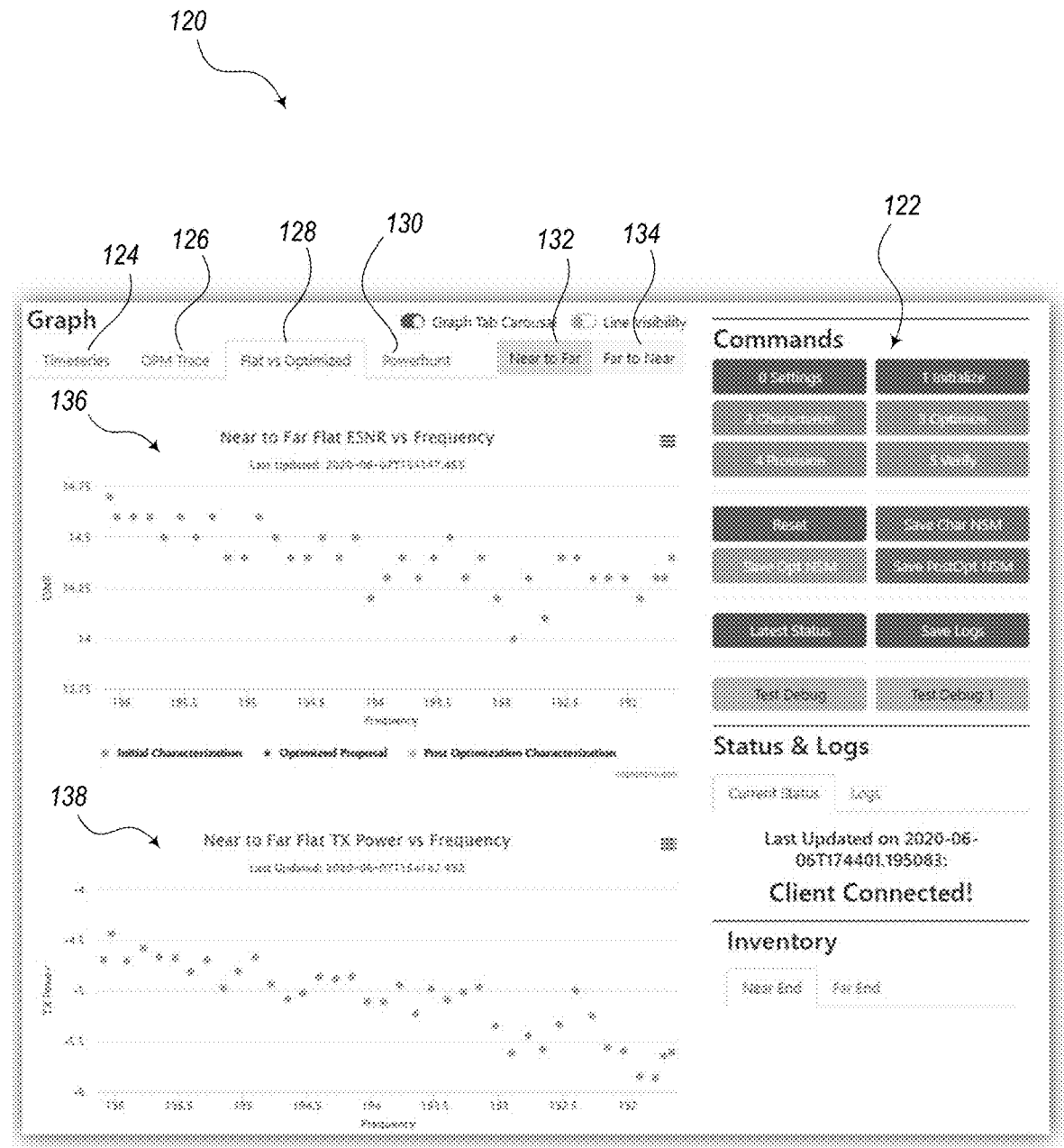
FIG. 7 is a screen shot of a User Interface (UI) showing measured parameters of a P2P system, according to various embodiments of the present disclosure.

FIG. 7 is a screen shot showing an embodiment of a User Interface (UI) 120. In this example, the UI 120 shows measured parameters of a P2P system that are obtained during a provisioning procedure and commands 122 that are available to a user. For example, the commands 122 available via the UI 120 include main functions related to Settings, Initialize, Characterize, Optimize, Provision, and Verify. Also, the commands 122 include a Reset function, Saving characterization, optimization, and post-optimization parameters in a network management device. The UI 120 also includes the commands 122 of Latest Status, Save Logs, Test Debug, and Test Debug 1.

The UI 120, in this example, includes a Timeseries tab 124, an Optical Performance Monitor (OPM) Trace (OPM Trace) tab 126, a Flat vs Optimized tab 128, a Powerhunt tab 130, a Near-to-Far tab 132, and a Far-to-Near tab 134. One of the Near-to-Far tab 132 and Far-to-Near tab 134 may be selected to define the direction where test signals are directed and also defines which node is used to perform the test. In this case, the Near-to-Far tab 132 has been selected.

Also, in the screen shot of FIG. 7, the Flat vs Optimized tab 128 has been selected to show a Flat ESNR vs Frequency graph 136 for showing the results of test signals in the near-to-far direction and a Flat Tx Power vs Frequency graph 138 for also showing the results of test signals in the near-to-far direction.

General State Machine

Figure 8:
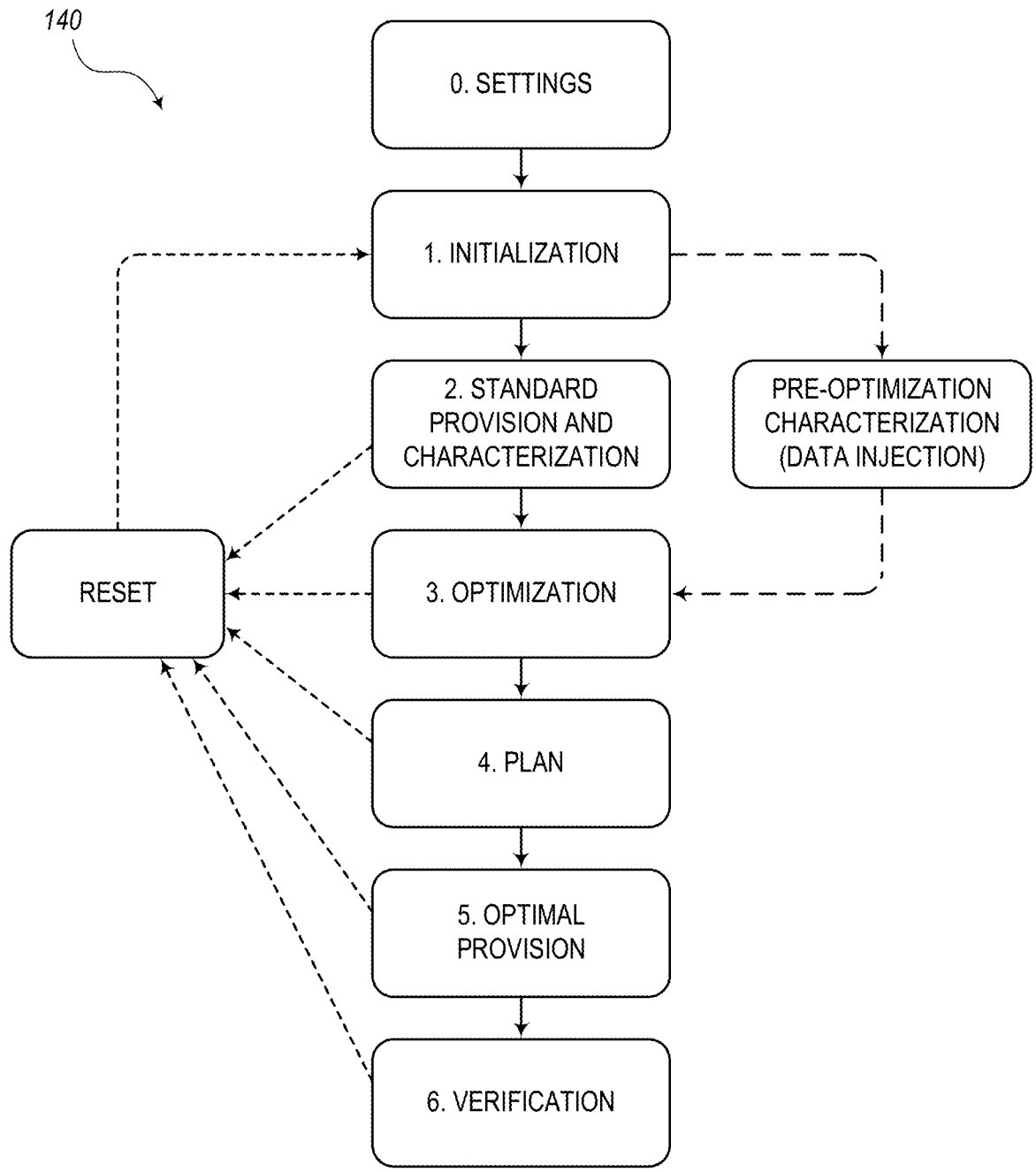
FIG. 8 is a diagram illustrating a state machine for provisioning optical channels in a P2P system with an unknown optical link system, according to various embodiments of the present disclosure.

FIG. 8 is a diagram illustrating a state machine 140 of an active device (e.g., near-end node) for performing actions to provision optical channels in a P2P system with an unknown optical link system. A first state of the state machine 140 includes "0. Settings," which includes a state where a user can enter various Initialization, Characterization, and Optimization settings for defining how the provisioning or commissioning procedures may be performed. A next state "1. Initialization" includes an initial provisioning of channels with ASE channel holders according to channel characteristics of the optical spectrum. For example, the characteristics used for Initialization may include a line TOP, a channel frequency, a blue edge communications boundary, a channel count, and a selected initial line (Baud) rate.

The state machine 140 also includes a "2. Standard Provision and Characterization" state using standard provisioning techniques or an alternative "Pre-Optimization Characterization" state where data is injected. The characterization states enable measurements (e.g., measurements of ESNR, Tx Power, etc.), which may be performed over the frequencies of the entire spectrum. The state machine 140 advances to the "3. Optimization" state, where the system is configured to utilize the measurements (characterizations) to determine an optimized arrangement or commissioning for the previously-unassigned channels of the optical spectrum.

The next state of the state machine 140 include "4. Plan" where a plan for optimizing the channel provisioning is determined. Then, the state of "5. Optimal Provision" is reached, where the system is configured to implement the plan to obtain the optimized provision. The state machine 140 may also include an optional state of "6. Verification." Verification may include verifying that the optimized plan is implemented and is still the optimal plan. In some cases, the verification may reveal that changes to the network result in a different optimization plan, which may require a re-characterization and re-optimization of the provisioning plan. At various points in the state machine 140, the user may select a "reset" command 122 (FIG. 7) to reset the provisioning process. Upon resetting, the state machine 140 moves the system to the Initialization state to restart the procedure.

Un-Provisioned Channels

Figure 9:
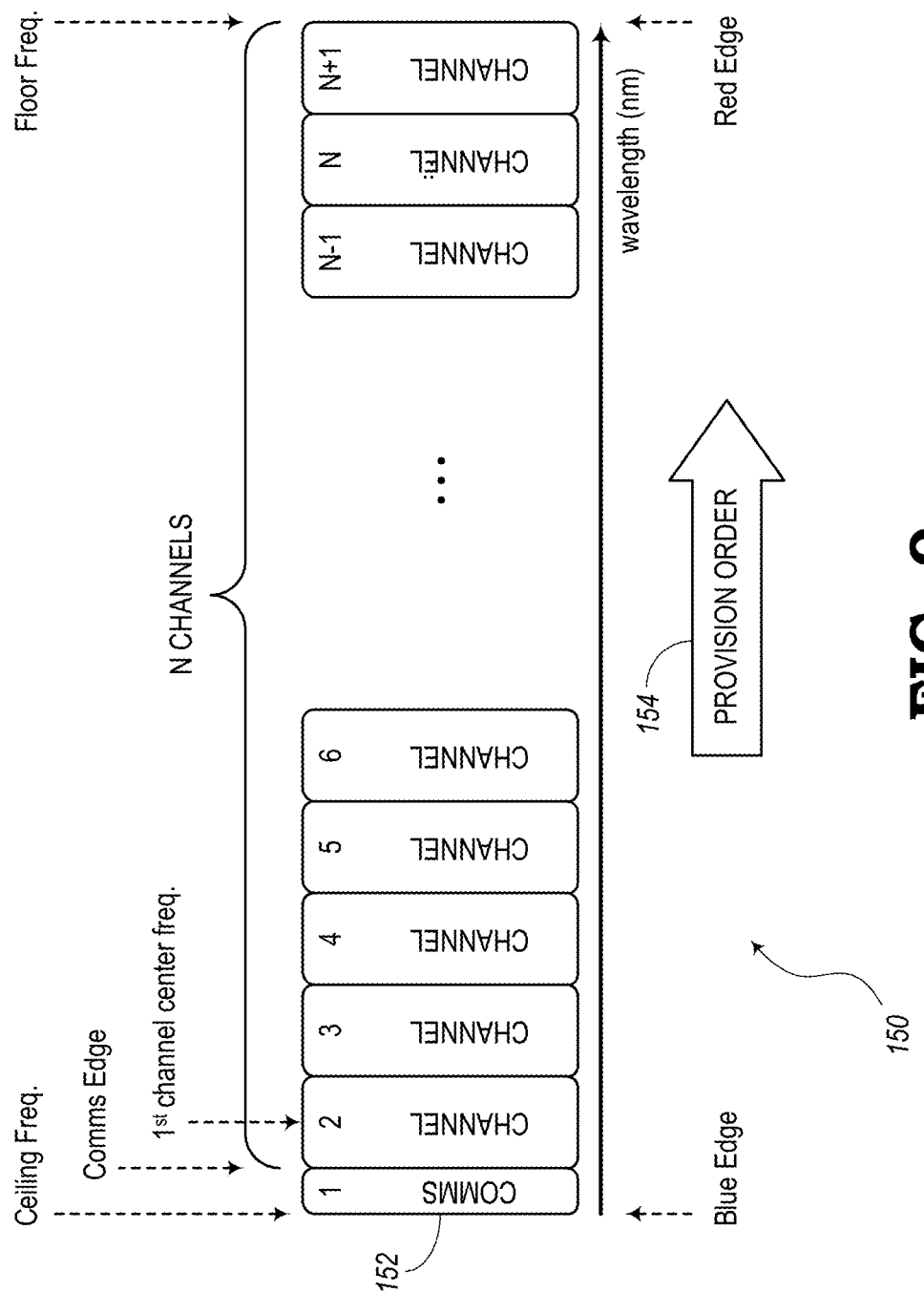
FIG. 9 is a diagram illustrating a graph of unassigned channels to be provisioned (or commissioned) in an unknown optical link system with a blue edge communication channel initialized, according to various embodiments of the present disclosure.

FIG. 9 is a diagram illustrating an example of a graph 150 showing unassigned channels to be provisioned (or commissioned) in an unknown optical link system. In some embodiments, the unknown optical link system may be configured to transport optical signals that fall within a spectrum ranging from a "floor frequency" of 191.325 THz to a "ceiling frequency" of 196.125 THz, for example in the C-band. The floor frequency may be referred to as a "red edge" and the ceiling frequency may be referred to as a "blue edge." Note, the terms "red" and "blue" are used to denote relative locations in the optical spectrum. In a C-band spectrum system in which optical signals may be handled, the frequency range from the blue edge to the red edge may theoretically correspond to signals having wavelengths ranging from about 1530 nm to 1565 nm. Portions of the spectrum may include channels indexed with indicator numbers. In the example of FIG. 9, the graphs shows indicator numbers ranging from 1 to N+1, where portions 2 through N+1 are configurable channels and the portion 150 labelled "1" is a blue edge communication channel initialized according to various embodiments of the present disclosure. A provisioning order 154 is shown in this example from the blue edge (lower wavelength signals) toward the red edge (higher wavelength signals) shown from left to right on the page.

User-Defined Settings for Provisioning Channels

Figure 10:
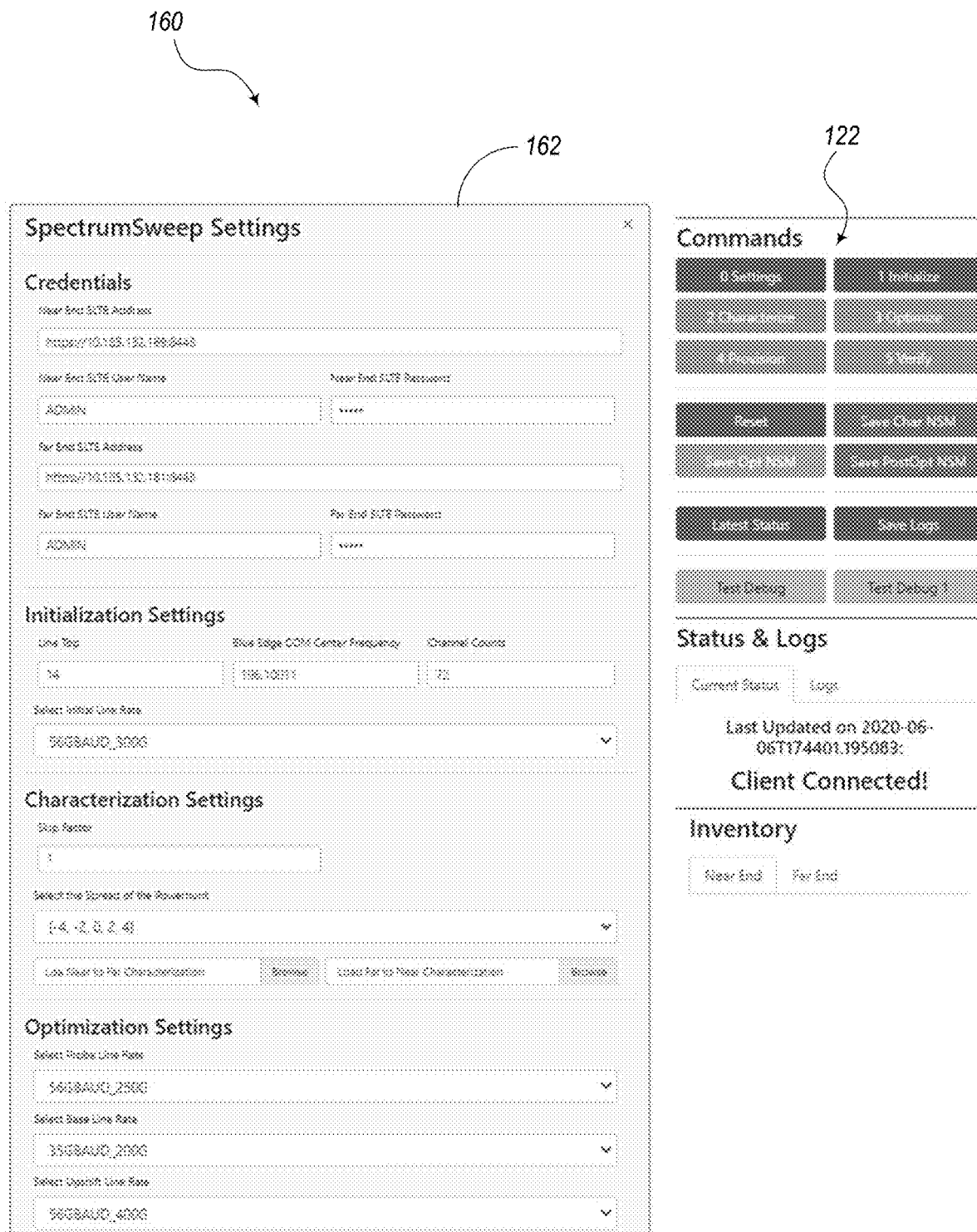
FIG. 10 is a screen shot of a UI showing configurable settings for performing a spectrum sweep of the unassigned channels in the unknown optical link system, according to various embodiments of the present disclosure.

FIG. 10 is a screen shot of a UI 160 showing configurable settings for performing a spectrum sweep of the unassigned channels in the unknown optical link system. The "spectrum sweep settings" window 162 may be configured to pop up when the "0. Settings" command 122 is selected. In this example, the window 162 shows a "Credentials" section that allow a user to enter information identifying one or both of the near-end node and far-end node. An "Initialization Settings" section of the window 162 allows a user to enter Initialization information about the line top, blue communication boundary information, channel count, and initial line rate. A "Characterization Settings" section of the window 162 allows a user to enter Characterization information regarding how the spectrum is characterized. For example, measurements (i.e., characterization) of the channels may include implementing a sequence of ESNR readings, one at a time, where each reading includes determining ESNR at one or more channels in a group. A skip factor of the Characterization Settings indicates a number of channels that are skipped between each ESNR reading, which may be utilized to speed up the provisioning process.

Based on Characterization processes (e.g., "2. Standard Provision and Characterization" and "Pre-optimization Characterization (data injection)" of the state machine 140, etc.) described in the present disclosure, the embodiments of the present disclosure may include provision and/or re-provisioning standard Channel Controller (CHC) and/or Network Media Channel Controller (NMCC) plans. Characterization may include flat measurements and/or "power-hunt" (e.g., power detection) measurement of transmitter power or launch power. Also, provisioning may include assigning or commissioning an optimized CHC/NMCC plan. Verification may include re-provisioning the optimized CHC/NMCC plan, as needed. The verification may include flat measurements (e.g., with patched Transmitter Adjacency (ADJTX) optimal power, etc.).

Provisioning may be comparable to re-provisioning. For example, provisioning may take a longer amount of time, whereas re-provisioning may take a shorter amount of time. The provisioning time may be a factor of the number of ASE channels, whereas the re-provisioning time may be a factor of the number of modems. Provisioning may include fully reconfiguring the spectrum after the blue edge communications channel (e.g., standard provision and optimal provision), whereas re-provisioning may include restoring holes left by channel/SNCG removal (e.g., after flat/powerhunt characterization). Provisioning may include switching from one line (Baud) rate and another (e.g., 35 GBaud grid to 56 GBaud grids, 56 GBaud grid to 35 GBaud grids, 56 GBaud initial grid to optimized 35 GBaud/56 GBaud grid). In re-provisioning, the process may include restoring the original 35 GBaud grid, restoring the original 35/56 GBaud grid, and/or restoring the original 56 GBaud grid.

Three-Modem Example

FIGS. 11A-11E are graphs 170 (i.e., graphs 170A, 170B, 170C, 170D, 170E) showing a plurality (N) of unassigned channels 172 in an unknown optical link system and a Characterization process of measuring Effective Signal-to-Noise Ratio (ESNR) of the unassigned channels 172 utilizing three modems in each SNCG (e.g., SNCG 102, 106 shown in FIG. 6) using a provisioning order 174 from a blue edge to a red edge.

Figure 11A:
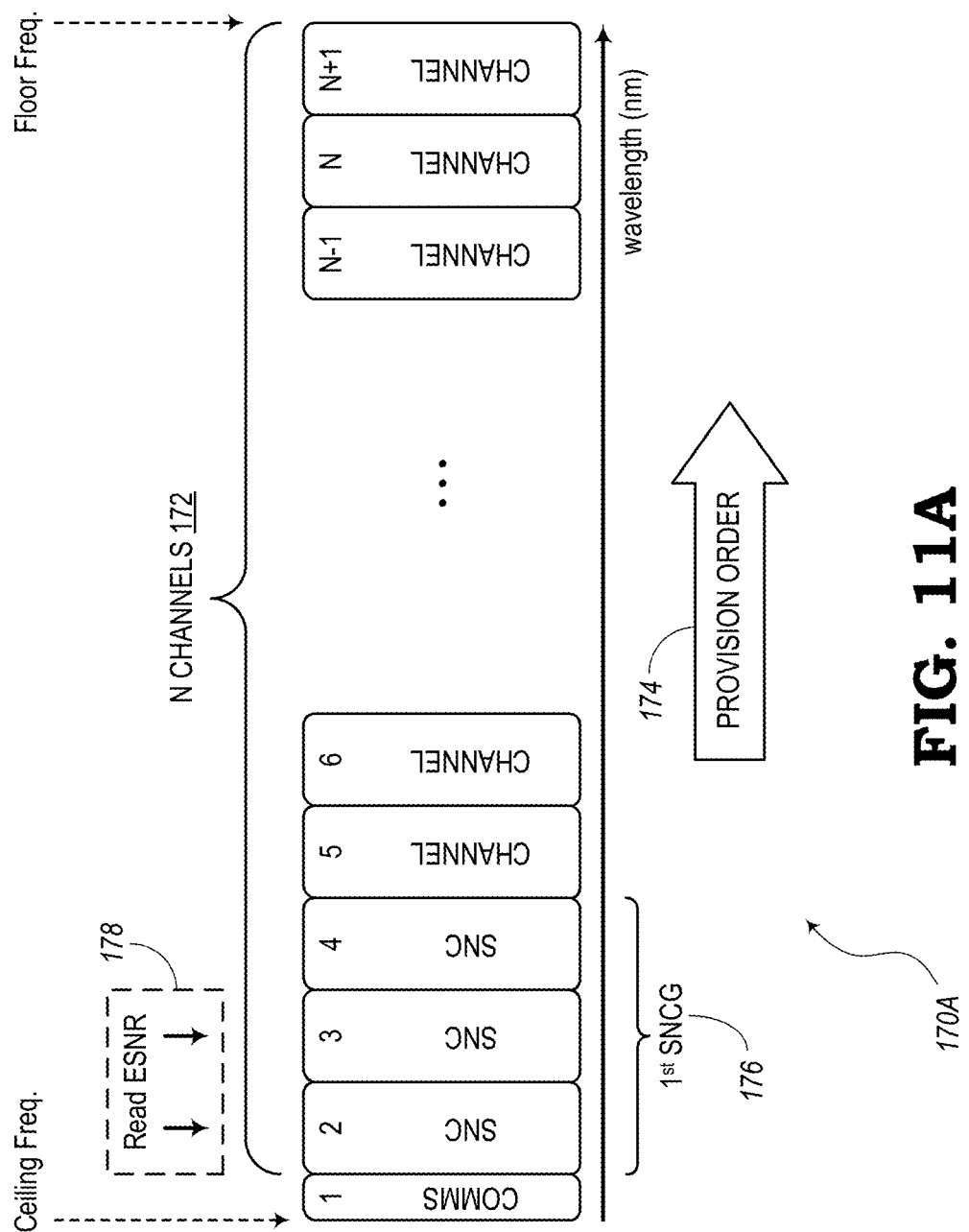
FIGS. 11A-11E are graphs showing a plurality of unassigned channels in an unknown optical link system and a process of measuring Effective Signal-to-Noise Ratio (ESNR) of the unassigned channels utilizing three modems in each SNCG in a provisioning order from a blue edge to a red edge, according to various embodiments of the present disclosure.

Each SNCG in this case is able to read the ESNR for the Sub-Network Channels (SNCs) for each channel in the SNCG except the outer channels in the group. However, for the first and last SNCGs, the channel at the edge of channels 172 may also be characterized in that respective SNCG. For example, FIG. 11A shows a first SNCG 176. Since the SNCG 176 include three modems in this example, three channels (e.g., the channels labelled 2, 3, and 4) can be characterized. However, channel 4 cannot be measured at this point since it is on the end of the SNCG 176. Thus, it is possible at this point to read ESNR of channels 2 and 3. It should be noted that the SNCGs are configured to overlap to some degree to account for the unavailability of the end channels for reading.

Figure 11B:
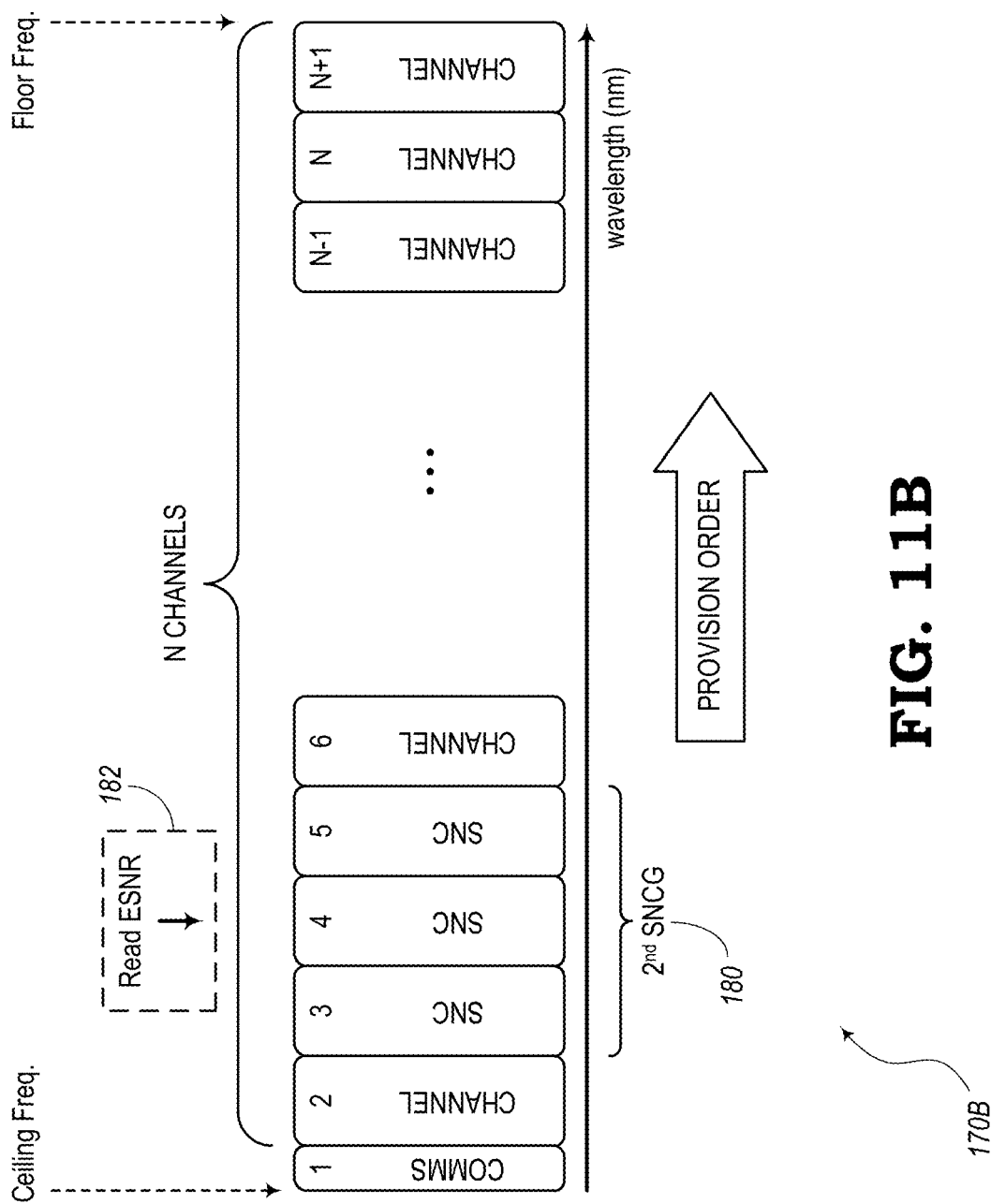
Figure 11C:
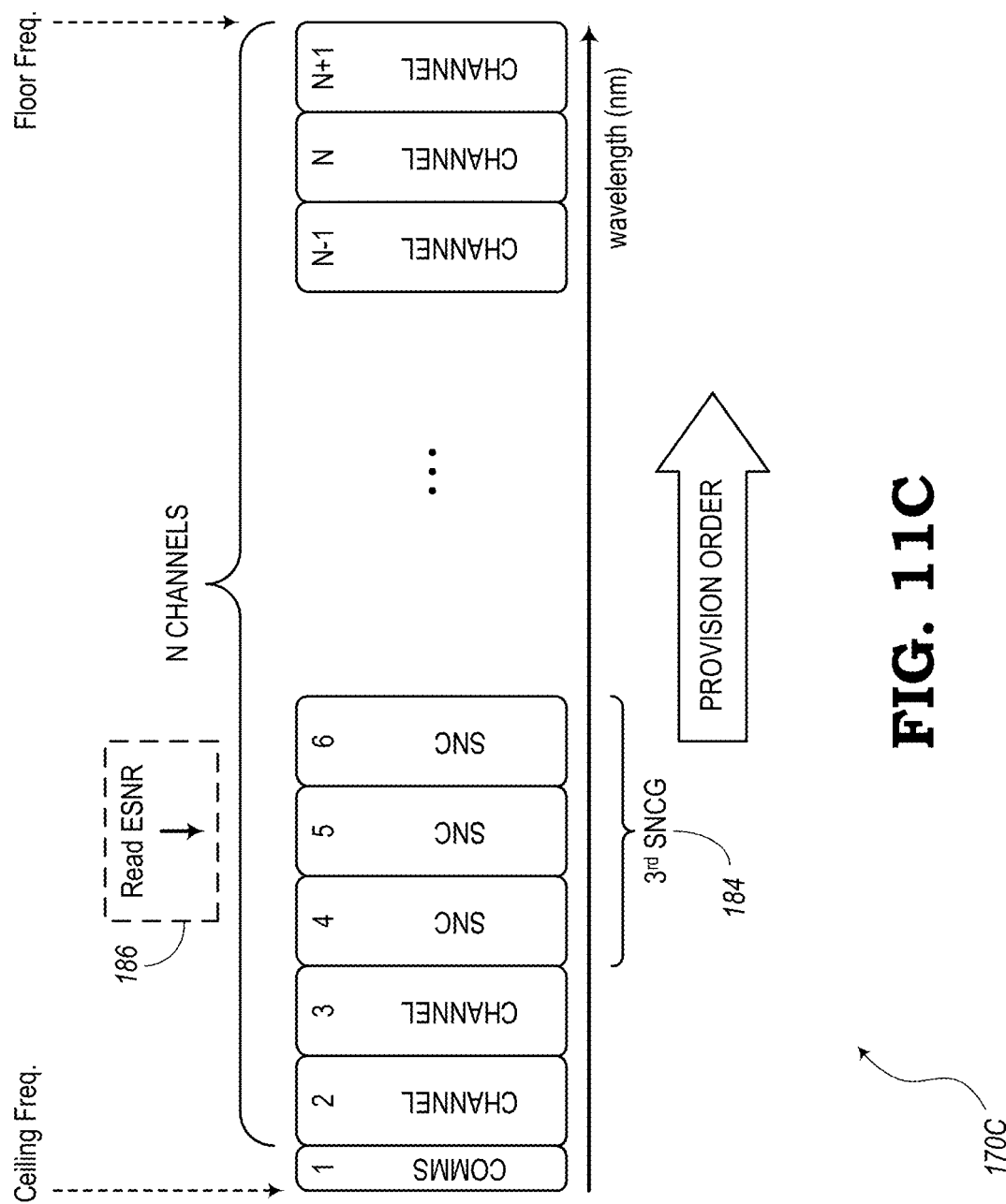
Figure 11D:
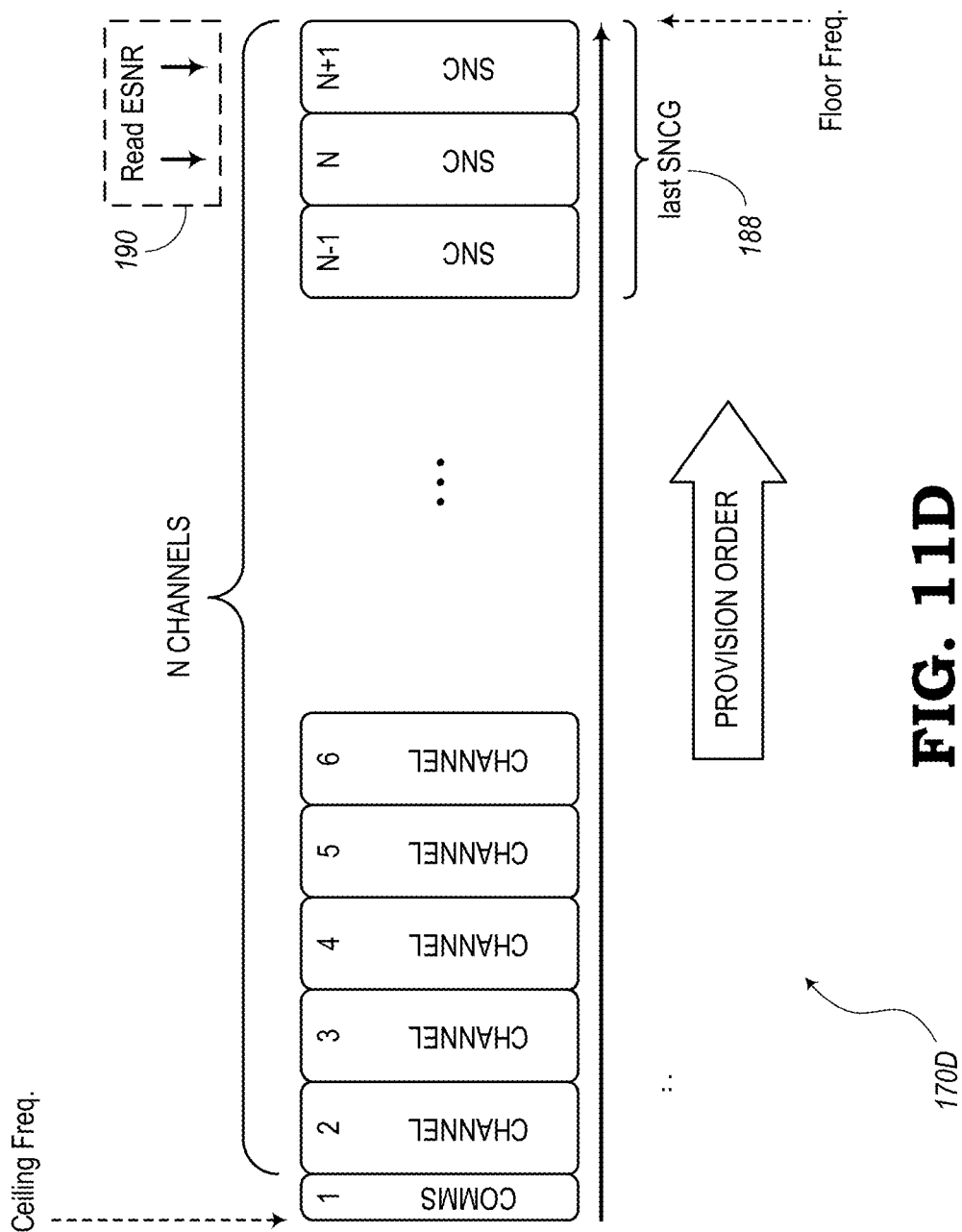

In FIG. 11B, a second SNCG 180 is shown including SNCs (e.g., channels labelled 3, 4, and 5). Only SNC 4 can be measured at this point, where the ESNR is read 182. FIG. 11C shows a third SNCG 184 and a third ESNR read 186. This process is repeated across the entire sweep of the spectrum until the last group (e.g., SNCG 188) is set for reading ESNR 190 of the last two channels (e.g., N and N+1).

Figure 11E:
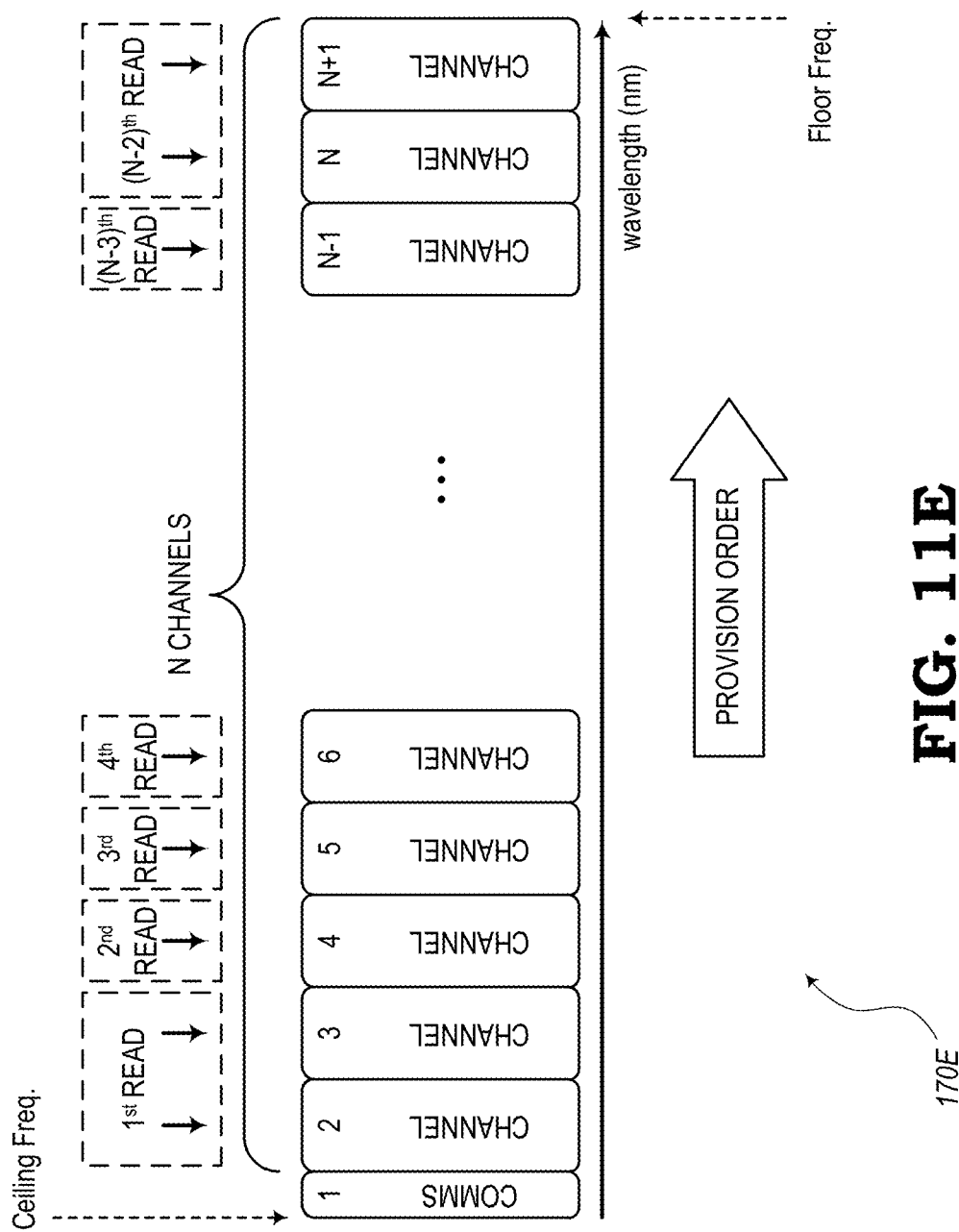

The ESNR reads are shown together in FIG. 11E from the first read to the (N−2)th read. FIG. 11E shows a full Characterization. In one example, there may be 72 channels. Thus, with three modems, there are 72−one red edge−one blue edge=70 reads (measurements). Also, with 70 reads, the number of SNCGs can be calculated by 70 reads/(3 modems−one blue interference−one read interference)=70/1=70 SNCGs.

Figure 12:
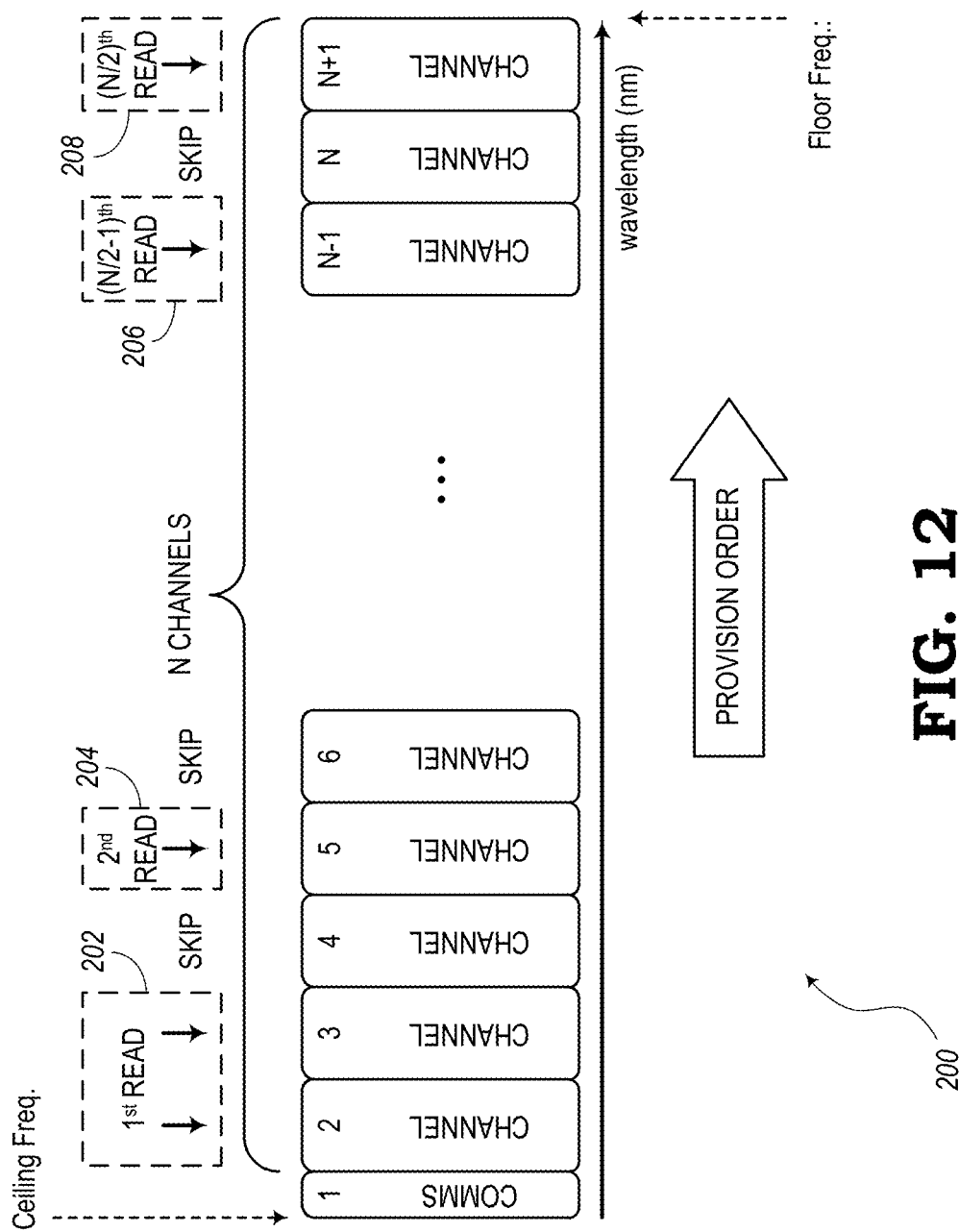
FIG. 12 is a graph showing the plurality of unassigned channels and a process of measuring ESNR utilizing three modems in each SNCG and skipping channels, according to various embodiments of the present disclosure.

FIG. 12 is a graph 200 showing the plurality of unassigned channels and a process of measuring ESNR utilizing three modems in each SNCG. In this example, the process includes a technique of skipping channels. For example, if the user selects a "skip factor" of 1 (e.g., as shown in the Characterization Settings portion of the spectrum sweep settings window 162 of FIG. 10), the ESNR reading process include reading one set of channels, skipping the next channel, reading the next set of channels, skipping the next channel, and so on.

Therefore, by skipping one channel in between reads, the first read 202 includes reading the ESNR of each of channels 2 and 3, the second read 204 includes reading the ESNR of channel 5 (i.e., channel 4 is skipped), . . . , the (N/2−1)th read includes reading the ESNR of channel N−1, and the (N/2)th (or last) read includes reading the ESNR of channel N+1 (i.e., channel N is skipped). First, with 72 channels, the number of iterations of channel reads can be calculated by 72 channels−one red edge−one blue edge=70 reads (measurements). Also, with the skip number set at one, the number of read is divided by (1+skip number), where 70/2=35 reads (measurements). With three modems in this example, the number of SNCGs can be calculated as 35 reads/(3 modems−1 blue interference−1 red interference) =35/1=35 SNCGs.

Four-Modem Example

FIGS. 13A-13D are graphs 210 (i.e., 210A, 210B, 210C, 210D) showing the plurality of unassigned channels and a process of measuring ESNR utilizing four modems in each SNCG. With four modems in each SNCG, a first SNCG 212 (FIG. 13A) is configured to read ESNR for channels 2, 3, and 4, where all but the last channel (e.g., SNC 5) is read. Again, the SNCGs may overlap as needed to account for the end SNCs that cannot be read. Thus, the second SNCG 216

Figure 13A:
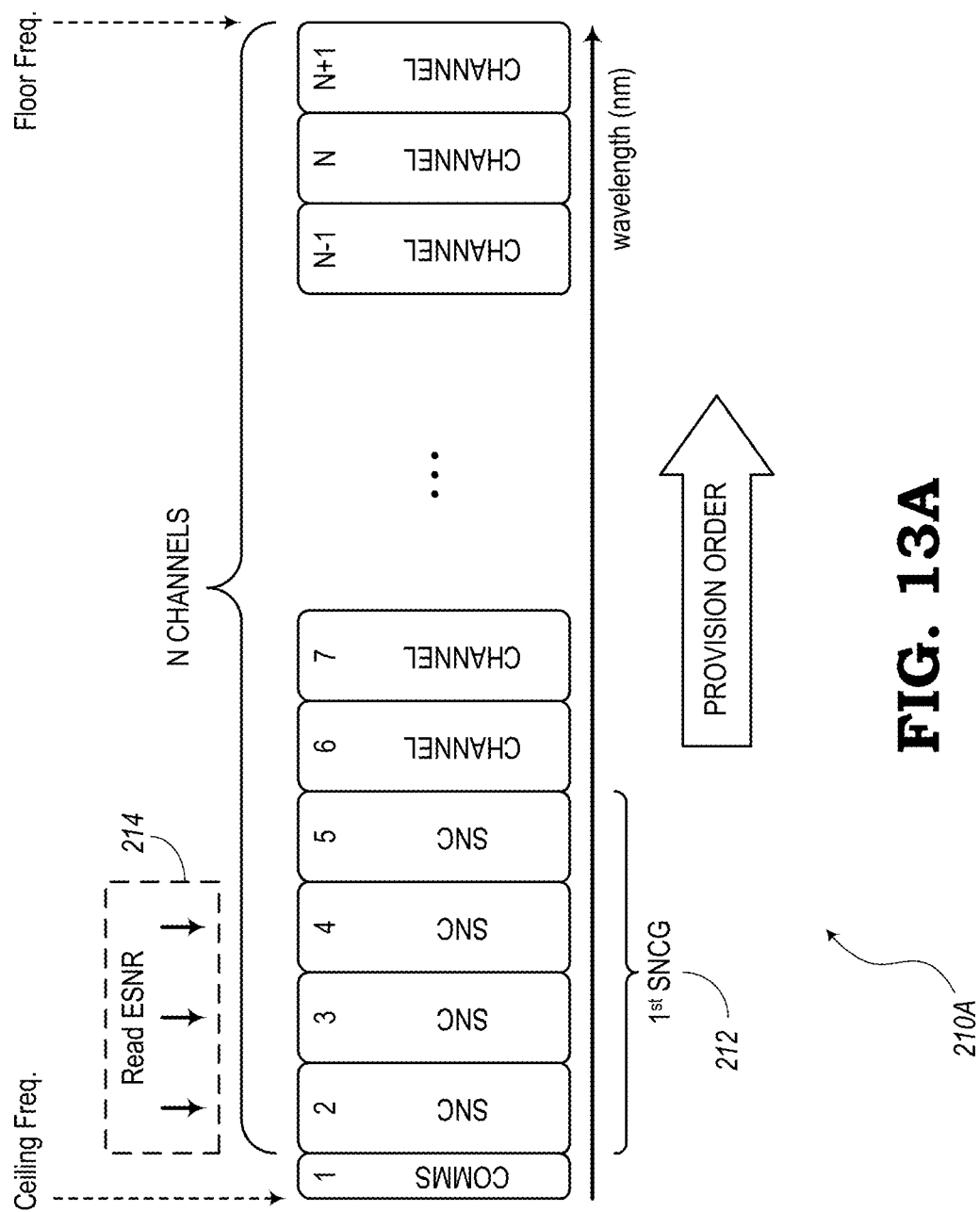
FIGS. 13A-13D are graphs showing the plurality of unassigned channels and a process of measuring ESNR utilizing four modems in each SNCG, according to various embodiments of the present disclosure.
Figure 13B:
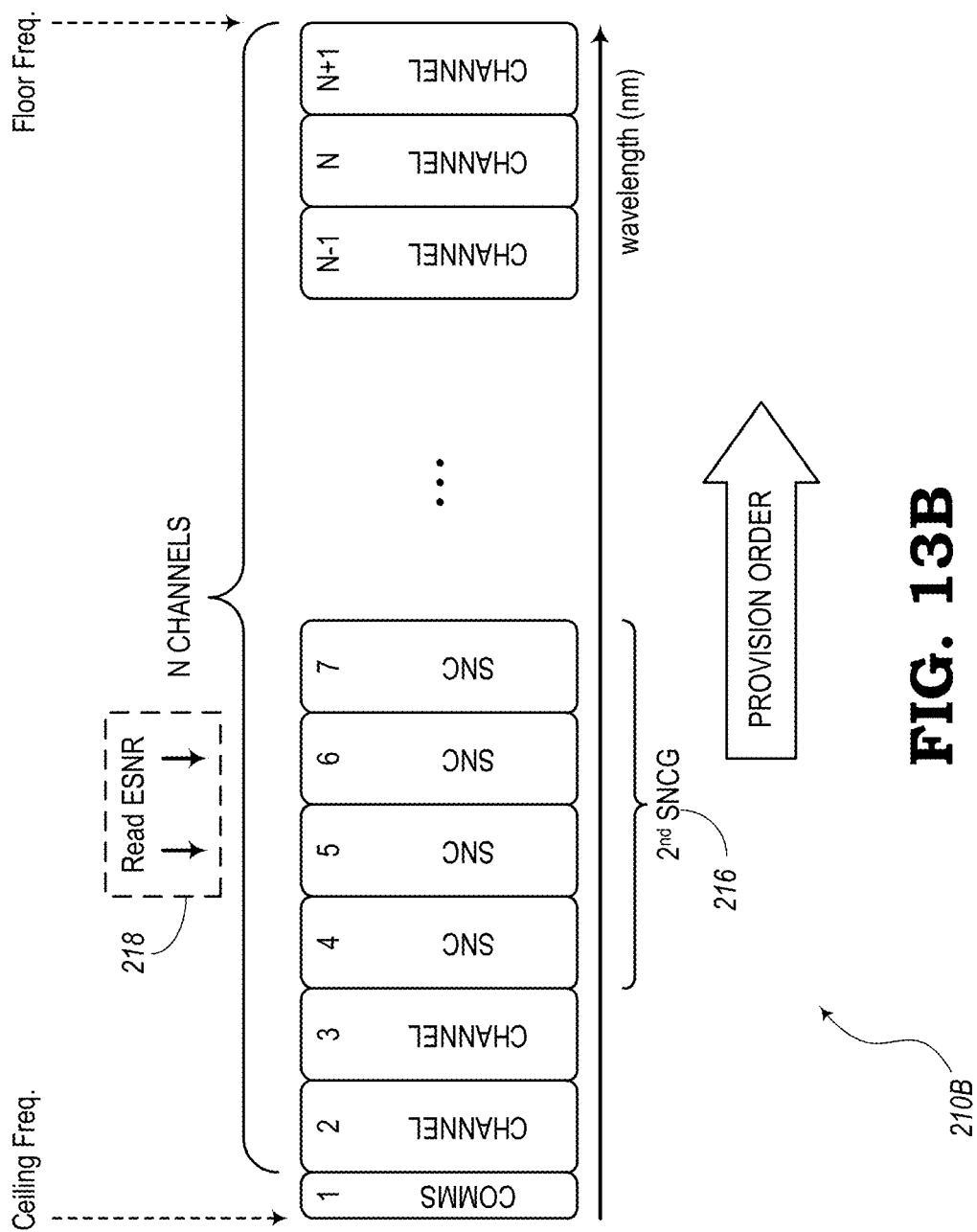
Figure 13C:
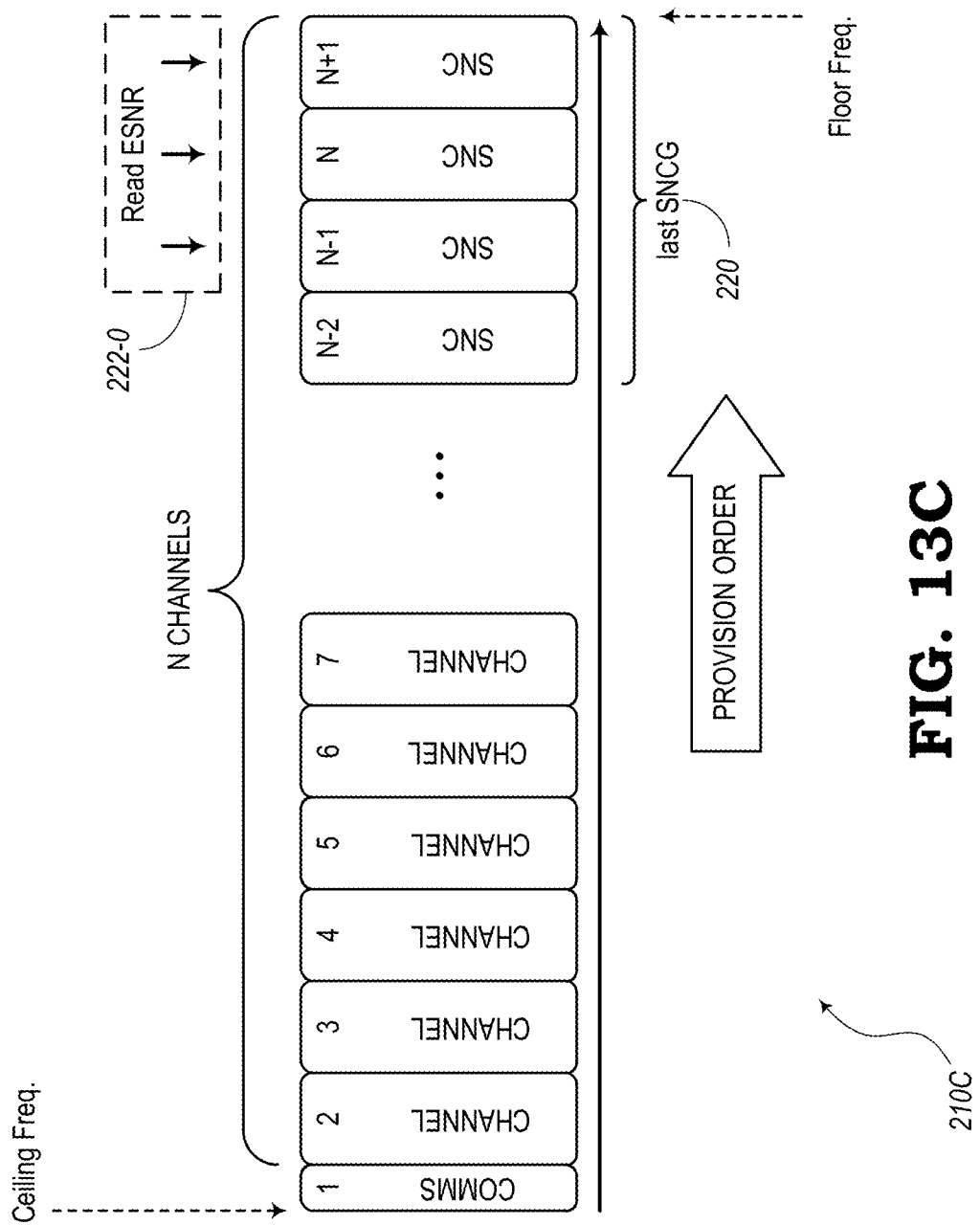

(e.g., including SNCs 4, 5, 6, and 7) are configured as shown in FIG. 13B to enable the reading of ESNR 218 of SNCs 5 and 6. Again, this sequence is repeated until a last SNCG 220 is configured (FIG. 13C) for reading ESNR 222-0 of SNCs N−1, N, and N+1.

Figure 13D:
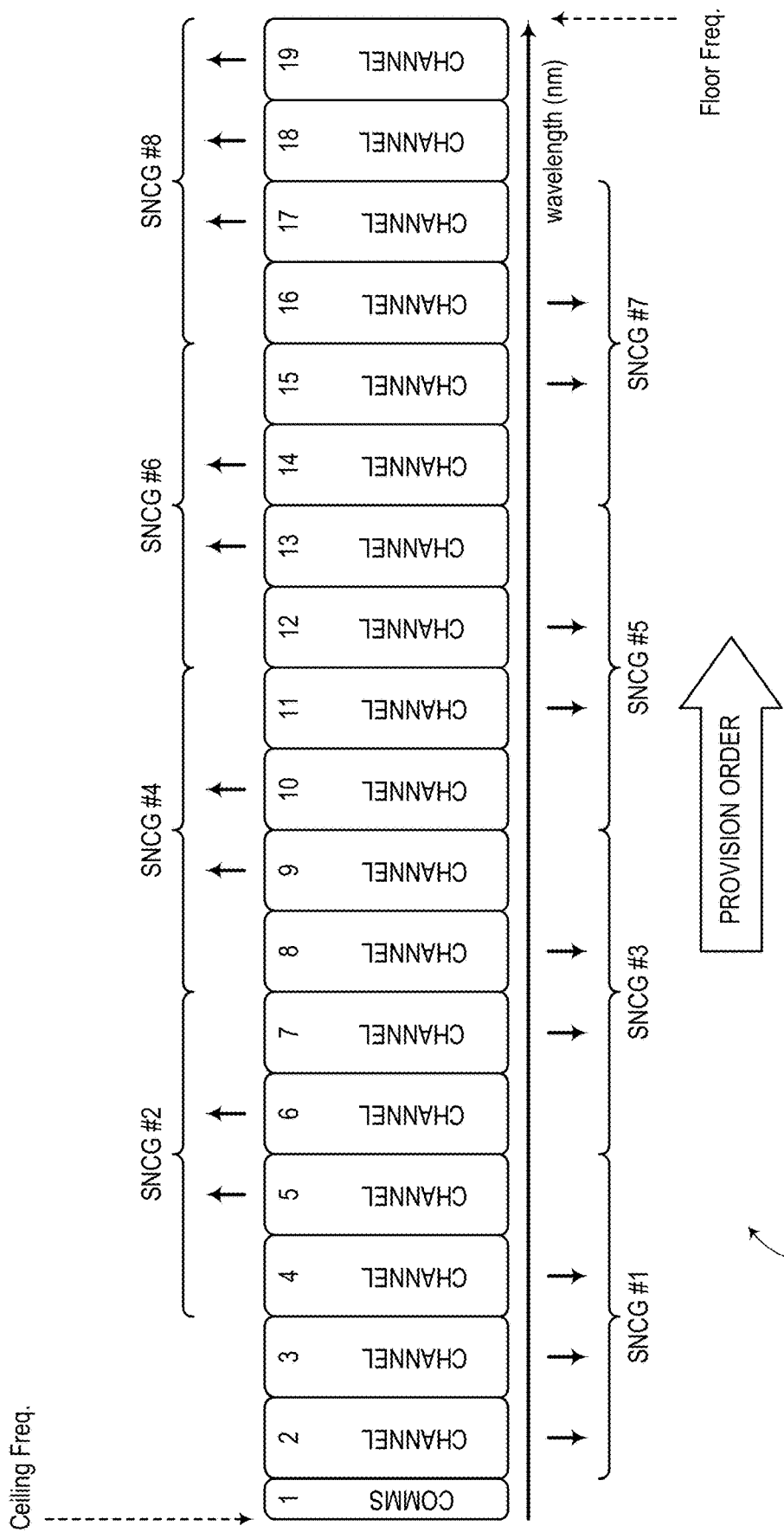

FIG. 13D shows all the SNCGs and the channels that are read for each respective SNCG. With 4 modems and 72 channels, the number of reads can be calculated as 72 channels−one red edge−one blue edge=70 reads (measurements). The number of SNCGs can be calculated as 70 reads/(4 modems−1 blue interference−1 red interference) =70/2=35 SNCGs.

Figure 14A:
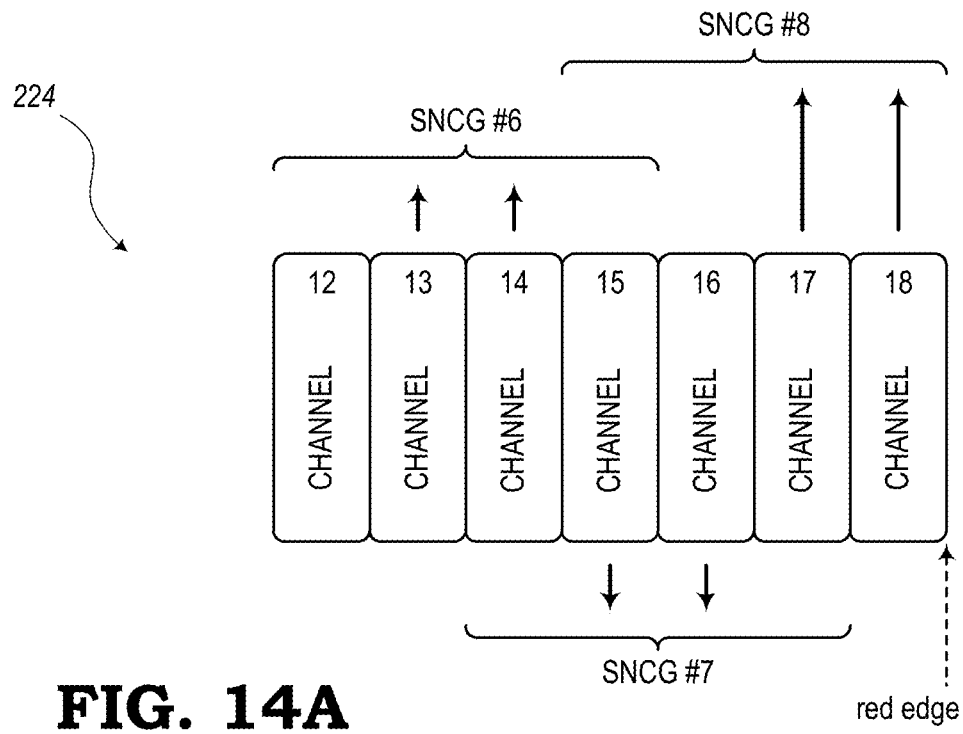
FIGS. 14A and 14B are graphs showing unassigned channels at an end (red edge) of the spectrum being provisioned where the ESNR measurements of the last provisioning SNCGs are reduced, according to various embodiments of the present disclosure.
Figure 14B:
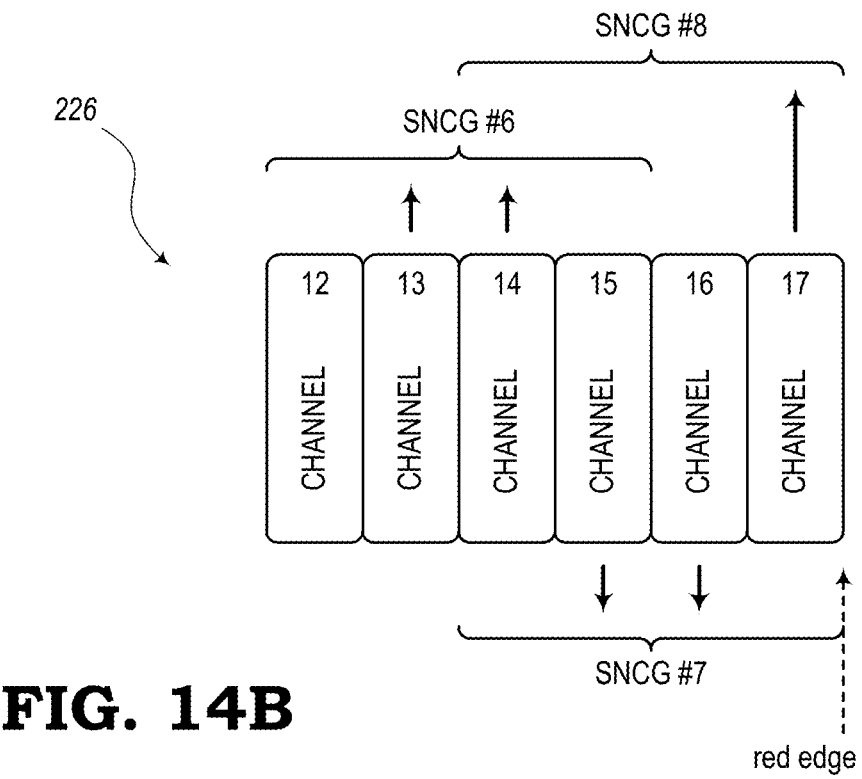

FIGS. 14A and 14B are graphs 224, 226, respectively showing unassigned channels at an end (red edge) of the spectrum being provisioned where the ESNR measurements of the last provisioning SNCGs are reduced. For example, it may be noted that the last SNCG may not necessarily end with a complete reading and therefore the overlapping pattern at the end of the sequence may be changed slightly to accommodate remnant channels for reading in order that all the channels can be read as intended.

Thus, there may be some red edge complexity in this scenario. Also, according to other embodiments, the complexity may also rise for other various scenarios. For example, if there are even more modems, plus any interplay with the skip factor, the complexity may rise. In some embodiments, there may be a mandatory red edge coverage for better interpolation stability and accuracy.

Figure 15:
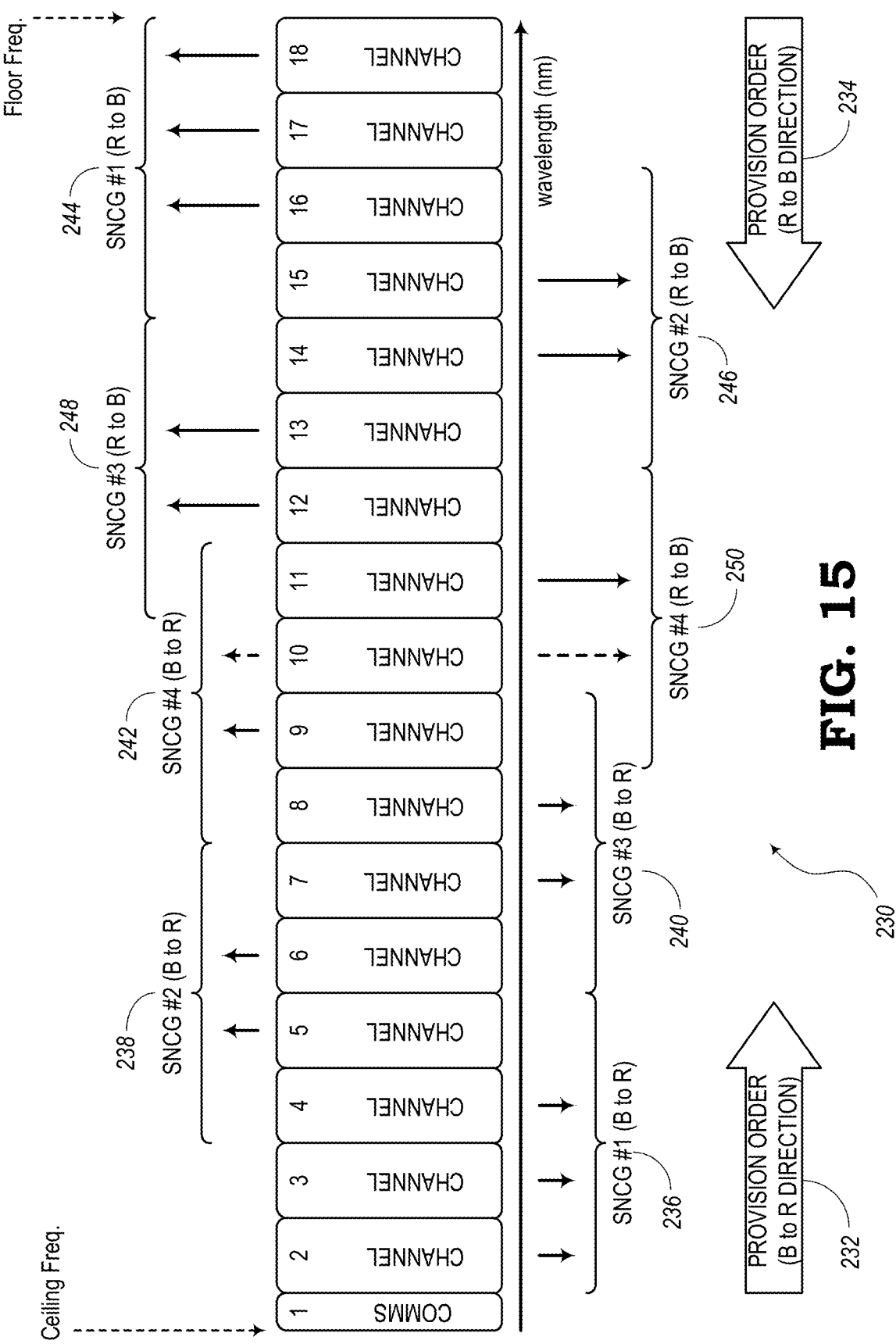
FIG. 15 is a graph showing unassigned channels being provisioned and a process of measuring ESNR utilizing four modems in each SNCG and using both a blue-to-red provisioning order and a red-to-blue provisioning order, according to various embodiments of the present disclosure.

FIG. 15 is a graph 230 showing an example of unassigned channels being provisioned and a process of measuring ESNR utilizing four modems in each SNCG and using both a blue-to-red provisioning order 232 and a red-to-blue provisioning order 234. In this arrangement, the process may include simultaneous ESNR readings, where a first group of readings start at the blue edge to begin a B-to-R directional sweep in the provision order 232 and a second group of readings start (substantially simultaneously) at the red edge to begin a R-to-B directional sweep in the provision order 234. In this example, 18 channels are shown for the sake of simplicity. Simultaneous readings can be made available with the introduction of multiple MUX/DEMUX devices (e.g., MUX/DEMUX devices 112, 114 shown in respective nodes 104, 108 in FIG. 6).

The B-to-R sweep includes a first SNCG 236, a second SNCG 238, a third SONG 240, and a fourth SONG 242. The R-to-B sweep includes a first SNCG 244, a second SNCG 246, a third SNCG 248, and a fourth SNCG 250. It may be noted that the fourth SNCGs 242, 250 of the two sweeps includes a common reading channel (e.g., channel 10). Thus, in this case, either or both of the sweeps may be configured to read the ESNR for this channel.

Figure 16:
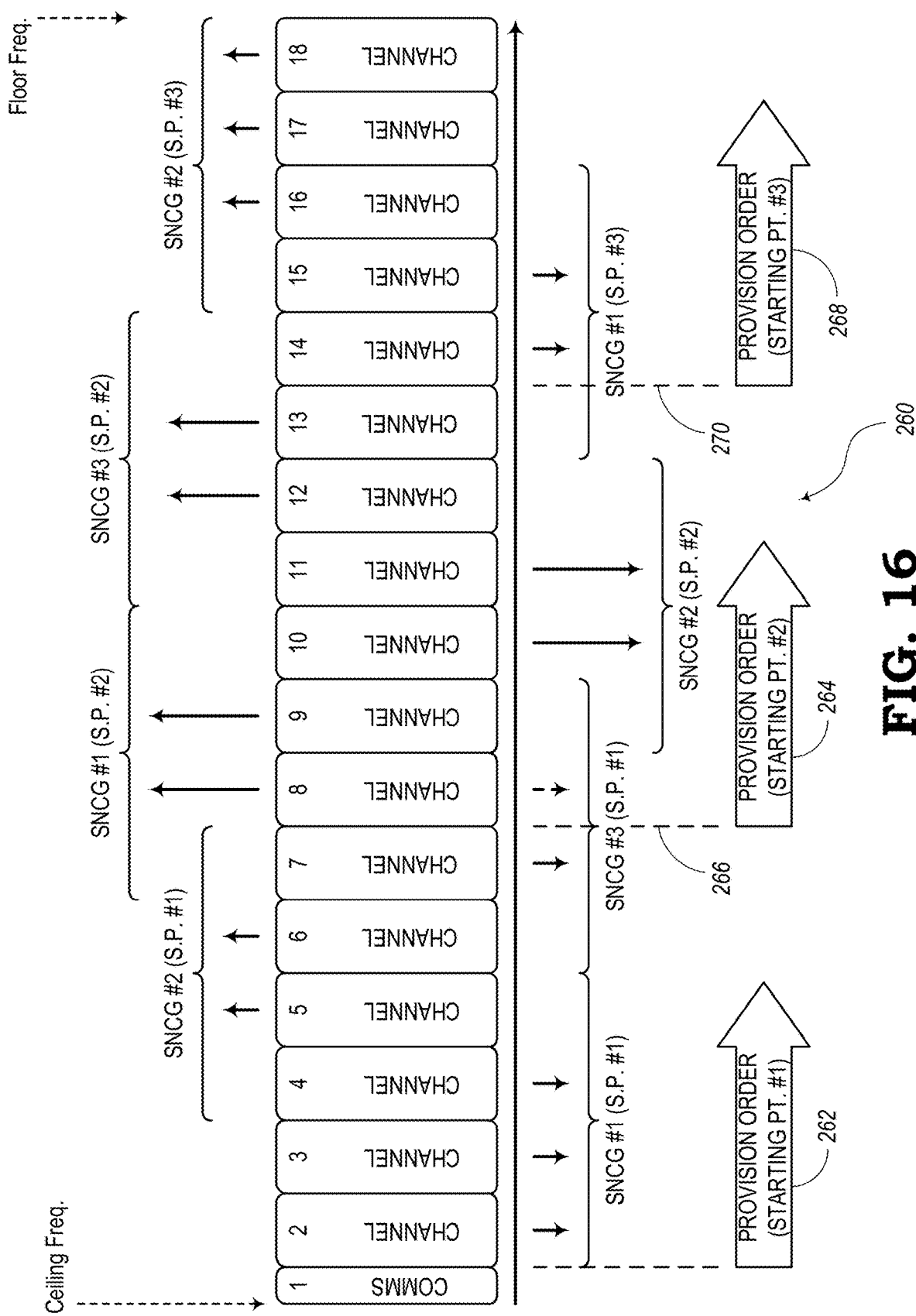
FIG. 16 is a graph showing unassigned channels being provisioned and a process of measuring ESNR utilizing four modems in each SNCG and using multiple provisioning starting points, for concurrent sweeping different spectrum portions, according to various embodiments of the present disclosure.

FIG. 16 is a graph 260 showing unassigned channels being provisioned and a process of measuring ESNR utilizing four modems in each SNCG and using multiple provisioning starting points. A first provisioning order 262 may include a first starting point (e.g., at the blue edge) and proceed in a B-to-R direction. A second provisioning order 264 may include a second starting point 266 and proceed in the B-to-R direction. A third provisioning order 268 may include a third starting point 270 and proceed in the B-to-R direction. According to other embodiments, the systems and methods of the present disclosure may be configured to include any number of simultaneous provisioning sweeps starting at any channels and proceeding, where each sweep may be directed in one direction (e.g., B-to-R, R-to-B) or where some sweeps proceed in the B-to-R direction while others proceed in the R-to-B direction. The multiple provisioning starting points can be available with multiple MUX/DEMUXes in each end node. The MUX/DEMUXes may enable intermediate starts for this multi-portion approach.

FIG. 17A is a table 280 illustrating the responsibilities of each shelf of a multi-shelf instantiation for commissioning unassigned channels of an unknown optical link system, according to various embodiments of the present disclosure. FIG. 17B is a table 290 illustrating the responsibilities of a shelf of a single-shelf instantiation for commissioning unassigned channels, according to various embodiments of the present disclosure.

Functions of Initialization, Characterization, Optimization, and Verification

Figure 18:
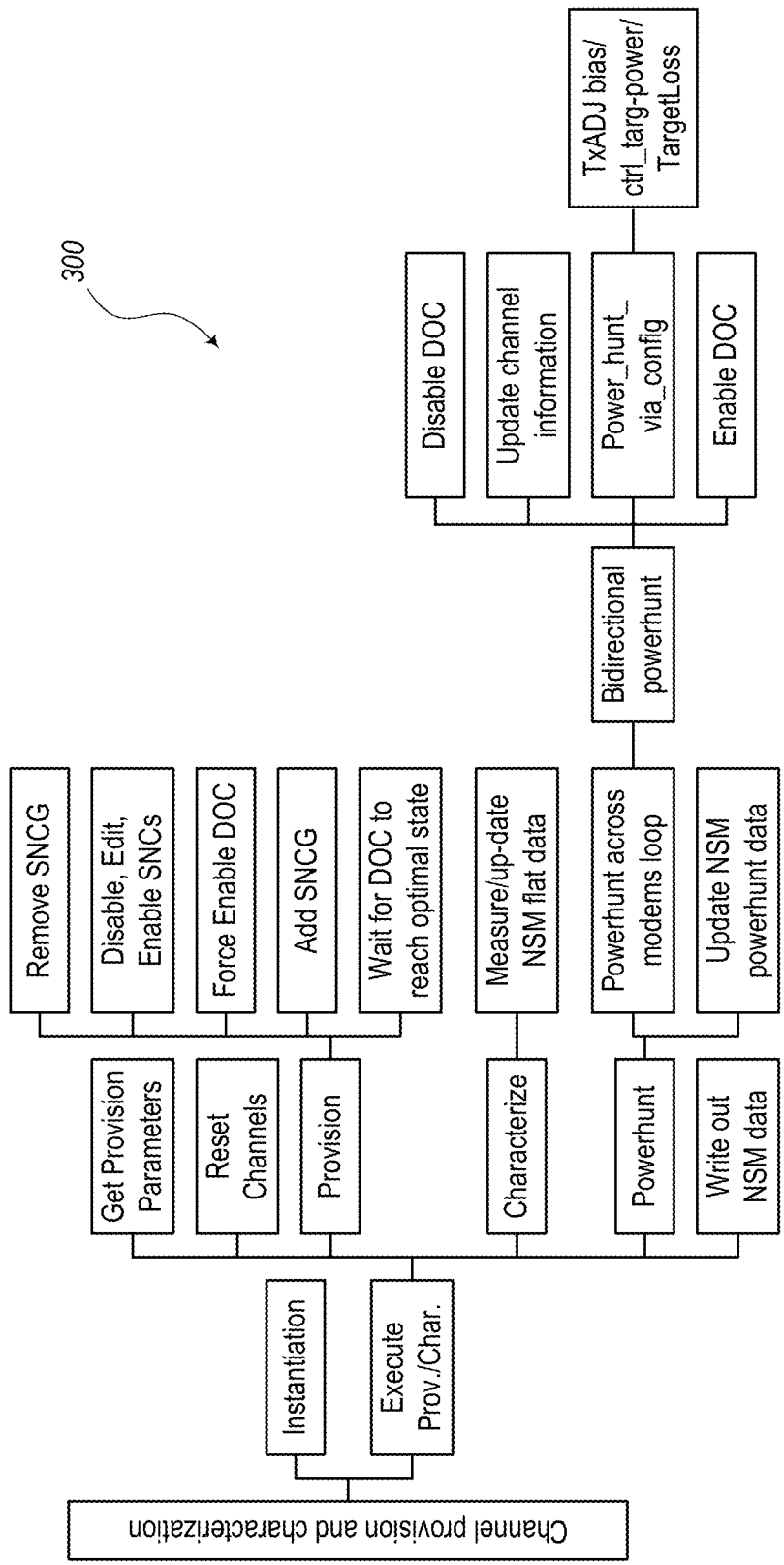
FIG. 18 is a functional block diagram illustrating functions of a characterization module for commissioning unassigned channels, according to various embodiments of the present disclosure.

FIG. 18 is a functional block diagram illustrating an embodiment of various functions of a characterization module 300 for commissioning unassigned channels. The characterization module 300 may be configured to characterize the optical spectrum. A Mixin process may include a cycle or loop that iterates through the channel plan. The Mixin process may include measurements, where the actual function may contain provision, measurement, powerhunt (e.g., power detection), etc.

The optimization module 310 may include JSON or dynamically generated data. A Network Media Channel Controller (NMCC) may be utilized to measure center frequency of the channels, a spectral width, control target power, etc. A Channel Controller (CHC) may be utilized to measure channel information, a maximum frequency, a minimum frequency, and a channel mode.

A "powerhunt" (or power detection) process may include detection of SNR Bias to find ADJTX for the modem. The process may patch an ADJTX bias VALUE to an OFFSET value (e.g., −4). The setting offset may be "ONLY" and not setting to the final target value. A target loss detection may include getting NMCC flat target loss parameters, where Target_Loss=Flat_Target_Loss+delta and set the Target_Loss to the NMCC.

Modems may be chosen based on Flat detection and/or Powerhunt detection. For running a single measurement, range probe modems may be chosen from provision parameters obtained, such as 0, 1, 2: 01, 1, 12. This may be based on the modems being sorted accordingly. SNCs 0-3 may include channels 1, 2, and 3, with ADJTX and modems.

Figure 19:
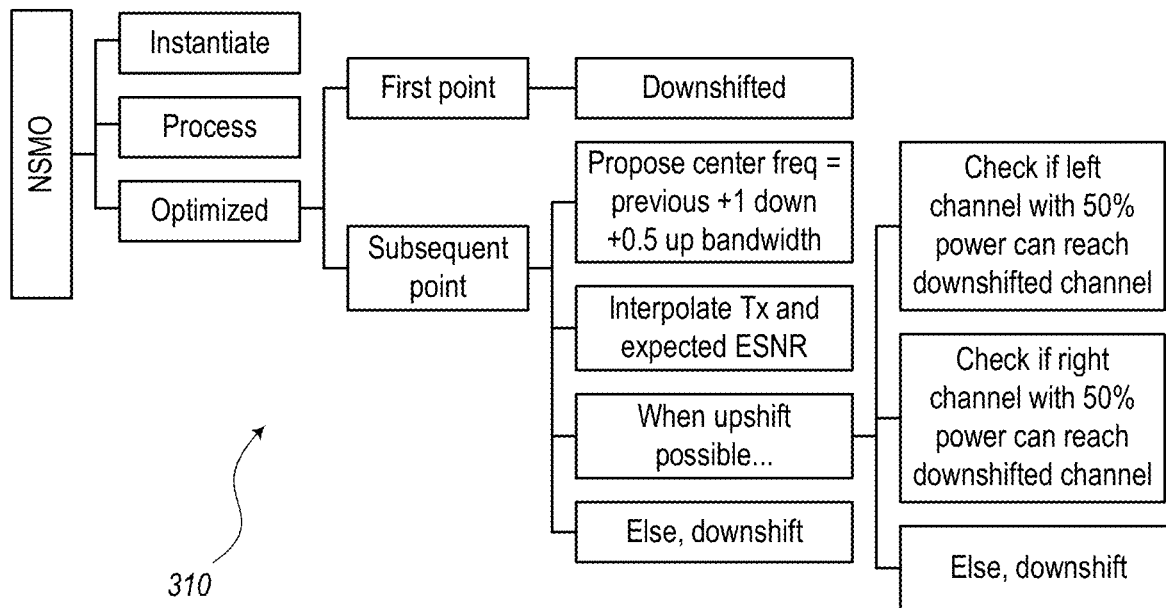
FIG. 19 is a functional block diagram illustrating functions of an optimization module for commissioning unassigned channels, according to various embodiments of the present disclosure.
Figure 20:
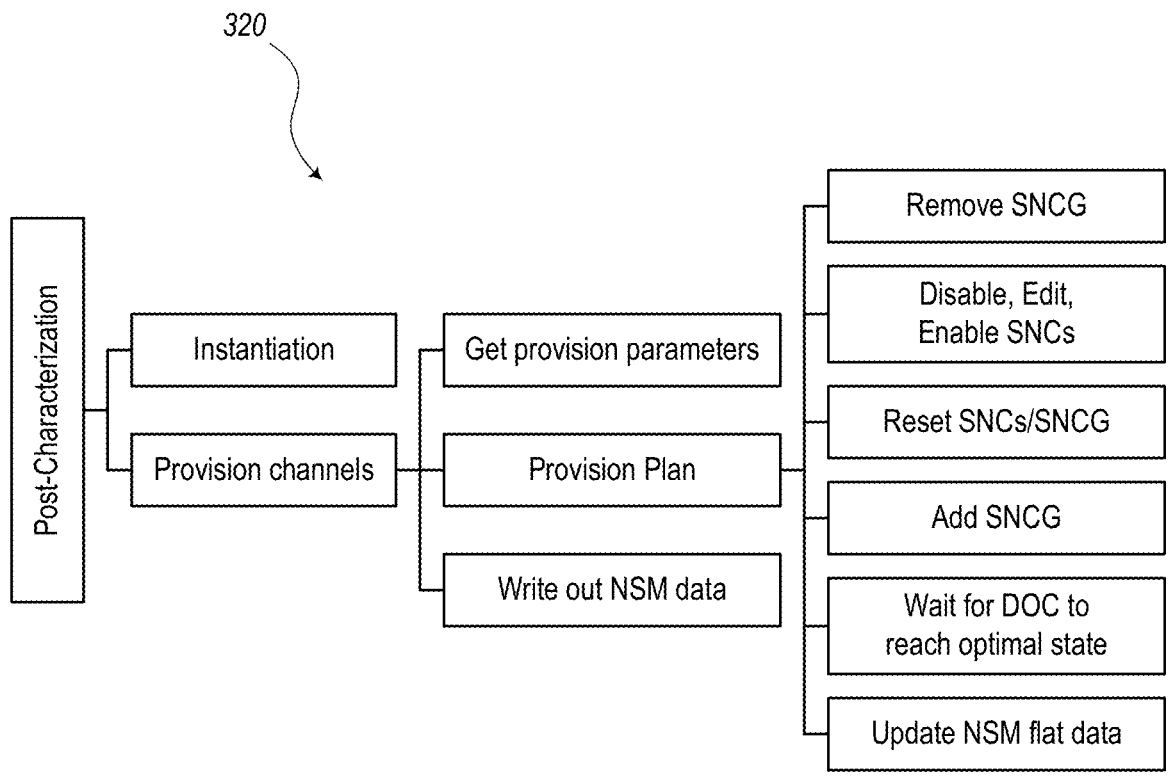
FIG. 20 is a functional block diagram illustrating functions of a post-characterization (verification) module for commissioning unassigned channels, according to various embodiments of the present disclosure.

FIG. 19 is a functional block diagram illustrating an embodiment of functions of an optimization module 310 for commissioning unassigned channels. FIG. 20 is a functional block diagram illustrating functions of a post-characterization module 320 for commissioning unassigned channels. A backend performance streaming related to the post-characterization module 320 of FIG. 20 may include streaming OPM data every 10 seconds and checking if the streaming performance needs to be started. If not, the OPM data may be stored in local storage (e.g., database 70).

Figure 21:
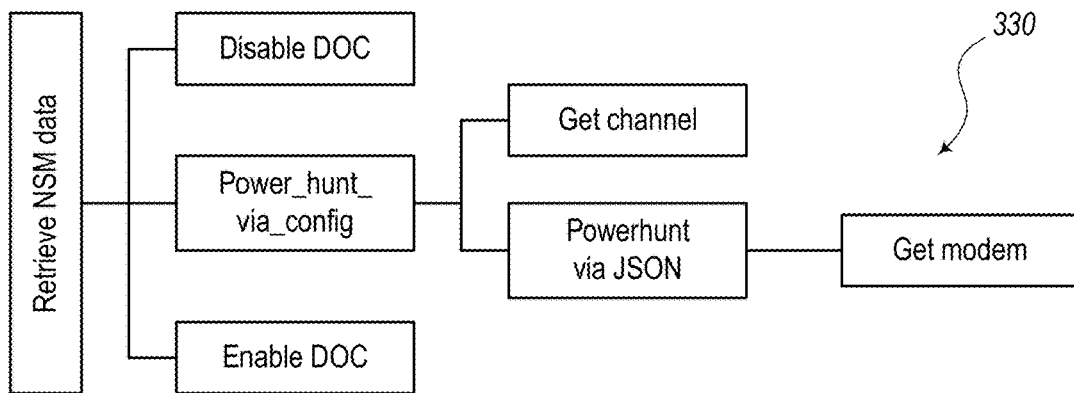
FIG. 21 is a functional block diagram illustrating functions of a process for retrieving network data for commissioning unassigned channels, according to various embodiments of the present disclosure.

FIG. 21 is a functional block diagram illustrating an embodiment of functions of a process 330 for retrieving network management data for commissioning unassigned channels. A powerhunt process may be bi-directional. For retrieving network management data, Optimization steps and Plan steps may be executed. For Optimization, an Optimization network management node with Tx power detection. The Tx power can be translated to an Optimization NMCC configuration. Also, a control target power may be set at this point. A channel count specification of a frontend (e.g., frontend 352) may be set such that the channel count is greater than the number of sessions. The process 330 may include computing a per channel power (dB) amount for the sessions. The network management data storage may be configured for bi-directional detection.

Figure 22:
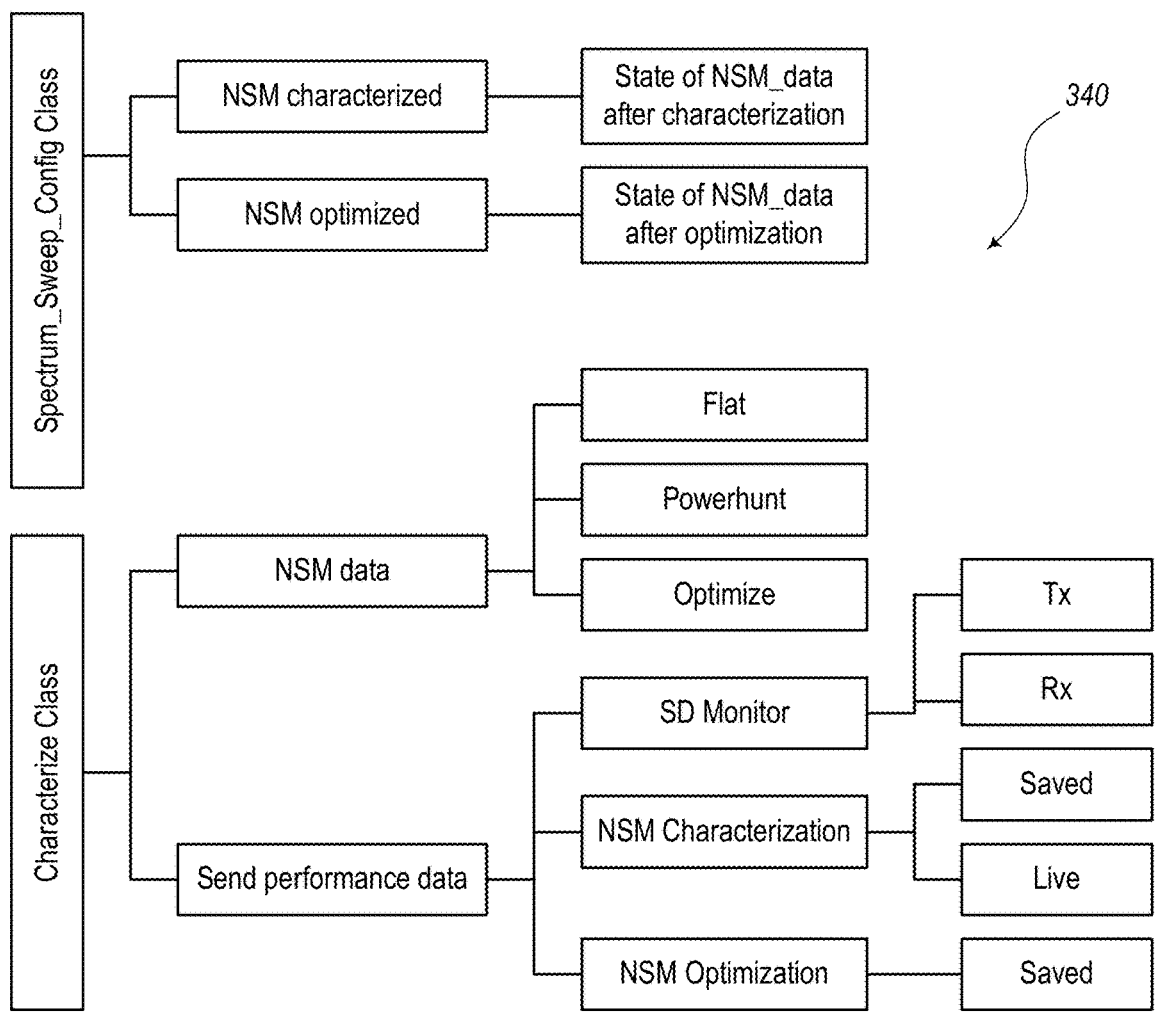
FIG. 22 is a functional block diagram illustrating functions of processes for characterizing a class and for classifying spectrum sweep configurations, according to various embodiments of the present disclosure.

FIG. 22 is a functional block diagram illustrating an embodiment of functions of processes 340 for characterizing a class and for classifying spectrum sweep configurations. The processes 340 may include a docker compose process, which may include a variable pass through to obtain a docker file.

Frontend (Near-End) and Backend (Far-End)

Figure 23:
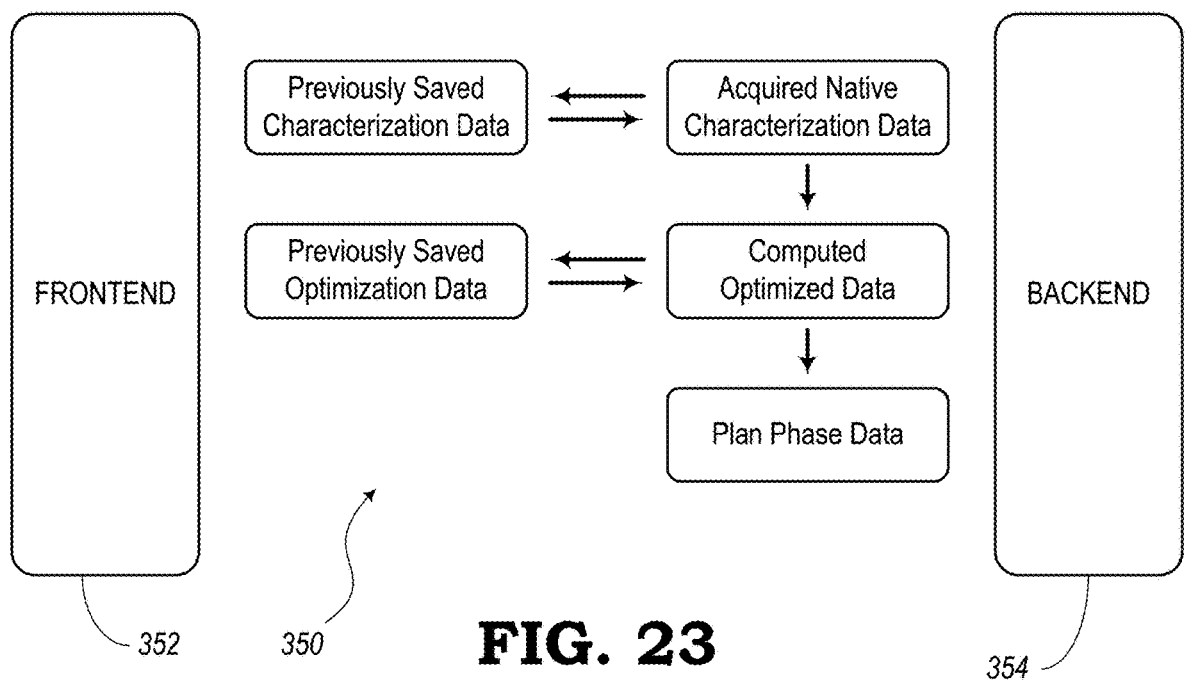
FIG. 23 is a diagram illustrating interactions between a frontend and a backend for commissioning unassigned channels, according to various embodiments of the present disclosure.

FIG. 23 is a diagram illustrating an embodiment of a network 350 that includes interactions (from button to session variable) between a frontend 352 and a backend 354 for commissioning unassigned channels. The frontend 352 may be a near-end node, near-end network element, domestic node, etc. for initiating a process for provisioning channels of an unknown fiber system connecting the frontend 352 with the backend 354. In this embodiment, the backend 354 may be a far-end node, far-end network element, foreign node, etc.

Buttons of the frontend 352 may be configured to enable requirements for provisioning. Settings may always be enabled. Initialization may always be enabled. Characterize may require an Initialization flag and may not have existing characterize data. Optimize may require an Initialization flag, may not have existing optimize data, and may have existing characterize data. Plan may require an Initialization flag, where network management optimization is to be set. This will overwrite the server side configuration Optimize Characterize NMCC data, etc.

For Provision and Verify, an Initialization flag may be required, may include a Plan step, may include a config opt CHC list, may include a config opt NMCC list, may include a configuration Optimize config, config opt base power int, config opt trans mode list. For Provision only, an Initialization flag may be required, may include a Plan step, may include config opt CHC, may include config opt NMCC, config opt config, config opt base power, and config opt trans mode.

The frontend 352 may include other buttons to enable various requirements. A Reset may include no requirements. If detection is in one direction, the data is stored in memory. The frontend data structure may include a timestamp, ESNR values, Tx power, Rx power, etc.

The backend 354 may include Input/Output steps. The backend 354 may include Initialization based on setup connections and outputs of config (e.g., Spectrum_Sweep-_Config), config of flat CHC, config of flat NMCC, and frontend capacity. A Characterize process may include outputs of frontend network management flat data, frontend visual graph data, etc. An Optimize process may include inputs of network management flat data, outputs of frontend network management optimization data, and frontend visual graphs, etc., and an Update step.

A Plan process of the backend 354 may include input of network management optimize data, and outputs of config optimize CHC, config optimize NMCC, line rates, and frontend capacities. A Verify process of the backend 354 may include input of config optimize CHC and config optimize NMCC and output of frontend network management post optimize data. A Provision process may include actually send the CHC and NMCC data to a Wavelength Selective Switch (WSS) to reset the node. Also, the backend 354 may include an API, such as a Socket I/O drive, with processes to Initialize, Characterize, Optimize, Plan, Provision, and (optional) Verify.

Figure 24:
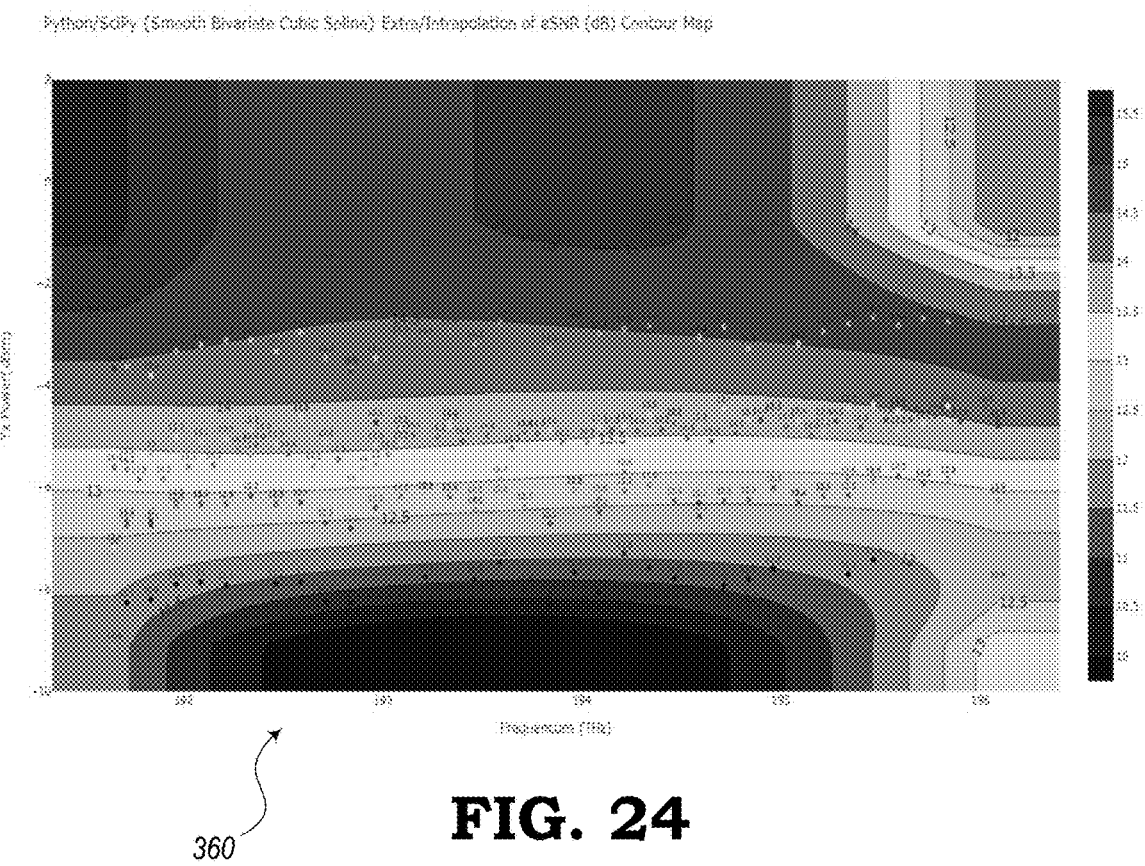
FIG. 24 is a chart showing ESNR measurements as a function of Transmitter (Tx) power and frequency for optimization, according to various embodiments of the present disclosure.

FIG. 24 is a chart 360 (e.g., prototype development chart) showing an example of results of ESNR measurements of a Characterization process. The ESNR measurements may be a function of Transmitter (Tx) power and frequency and may be utilized for Optimization purposes according to various embodiments of the present disclosure.

Line Rates

Figure 25:
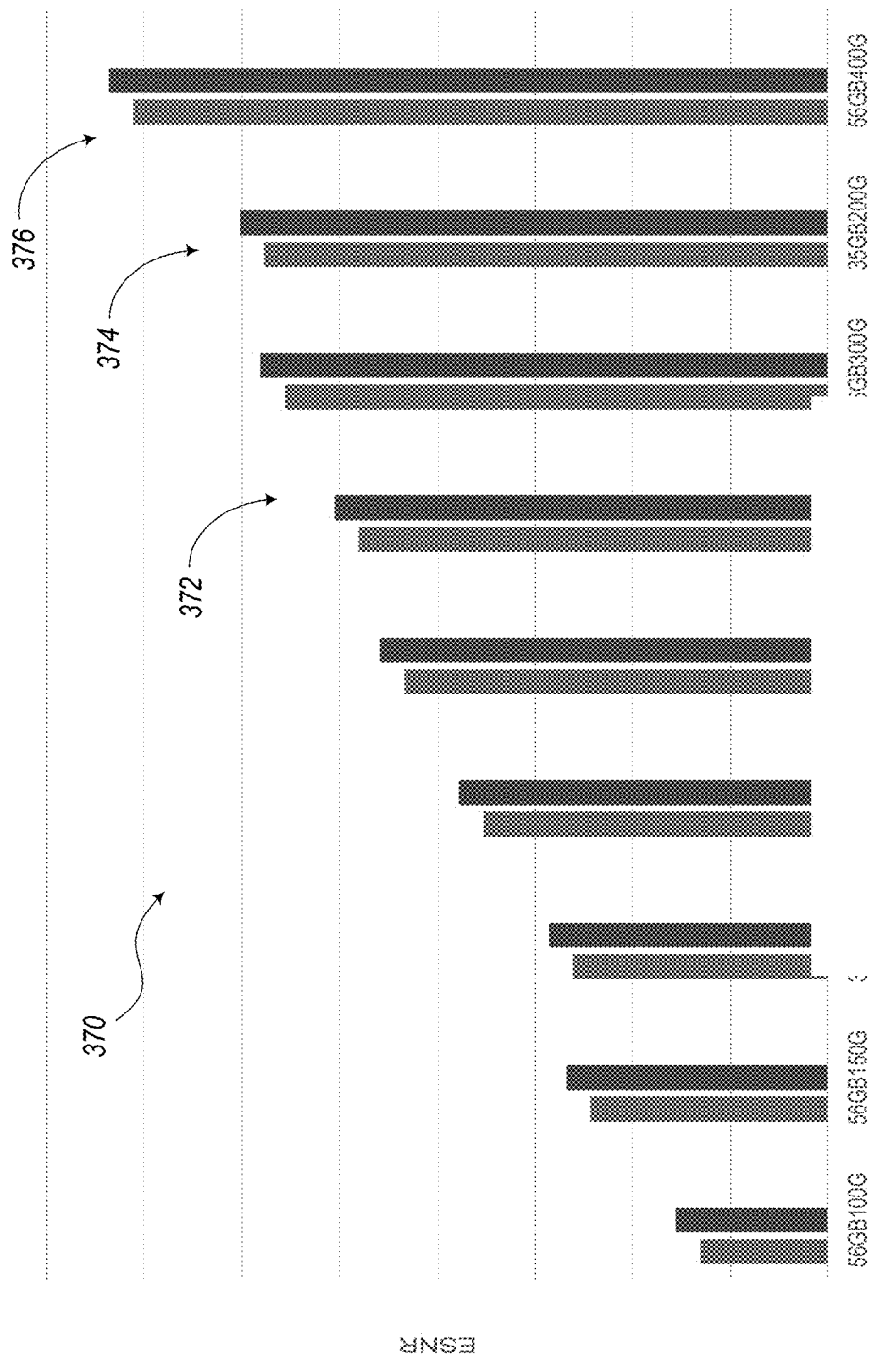
FIG. 25 is a graph showing ESNR measurements utilizing possible line rates, according to various embodiments of the present disclosure.

FIG. 25 is a graph 370 showing ESNR measurements utilizing possible line rates. For each line rate, a wave detection device is used to determine an ESNR cutoff (i.e., the first line of the pair) and a cutoff+a margin of 0.5 is shown as the second line of the pair. The line rates are those rates that are applicable for optimization. The line rate 372 of 56 GBaud 250G may be referred to as a "probing line rate." The line rate 374 of 35 GBaud 200G may be referred to as a "base line rate." Also, the line rate 376 of 56 GBaud 400G may be referred to as an "upshift line rate." For example, the probing line rate, base line rate, and upshift line rate may be selected by the user from the spectrum sweep settings window 162 shown in FIG. 10.

Figure 26:
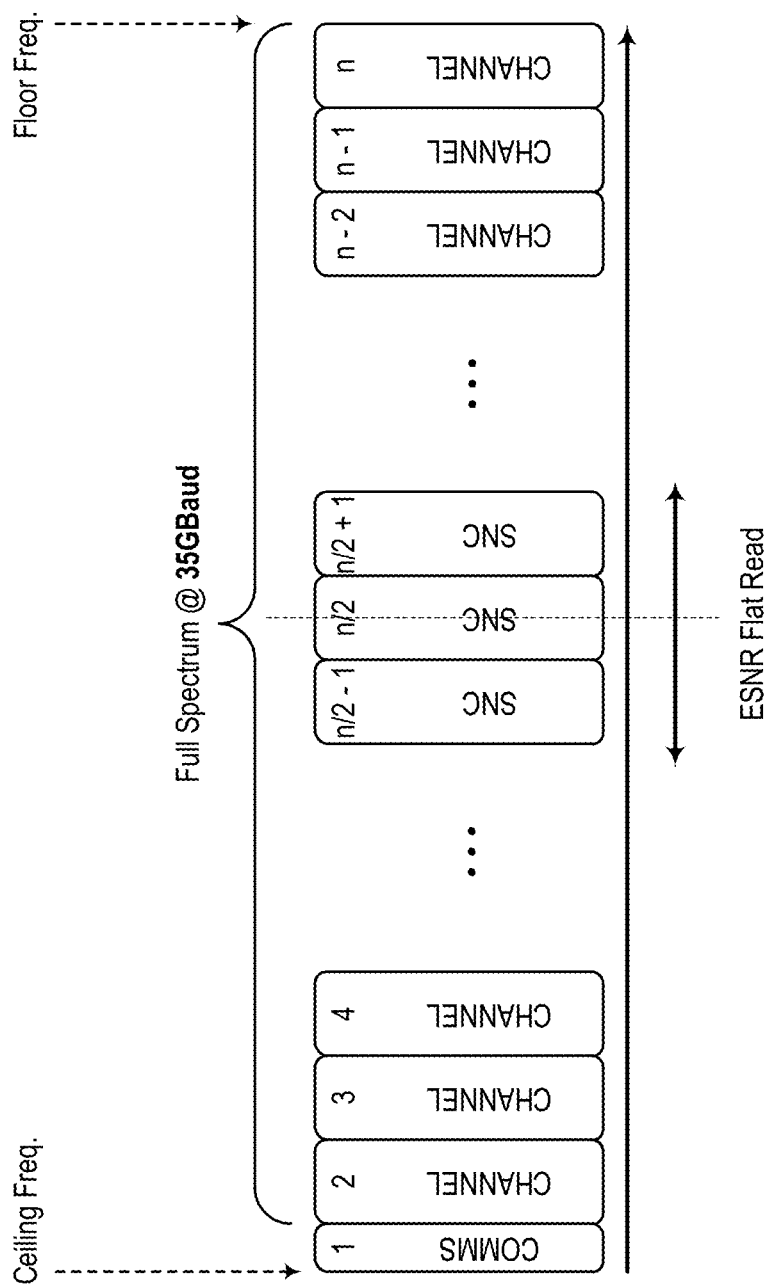
FIG. 26 is a diagram illustrating a graph of unassigned channels using a 35 GBaud line rate for the full spectrum and a flat ESNR reading, according to various embodiments of the present disclosure.
Figure 27:
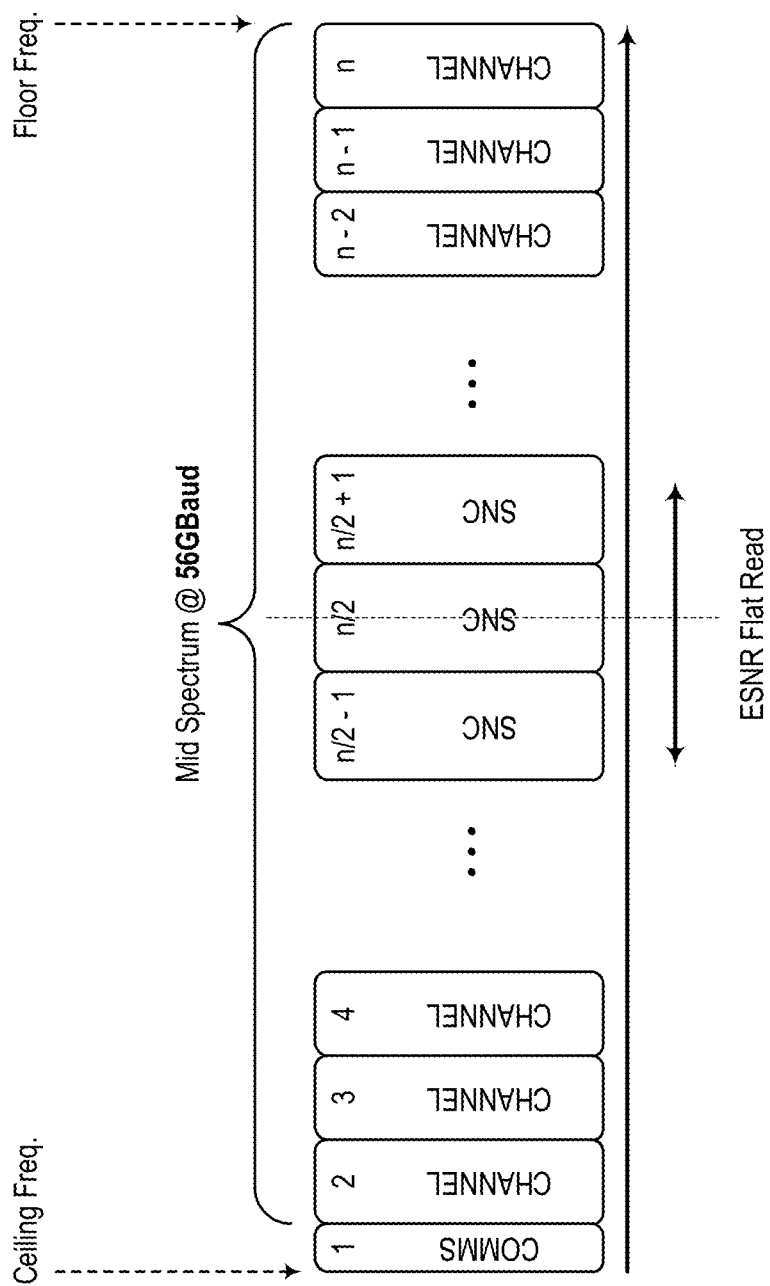
FIG. 27 is a diagram illustrating a graph of unassigned channels using a 56 GBaud line rate for a middle portion of the spectrum and a flat ESNR reading, according to various embodiments of the present disclosure.

FIG. 26 is a diagram illustrating a graph where unassigned channels are to be assigned using a 35 GBaud line rate for the full spectrum and a flat ESNR reading. FIG. 27 is a diagram illustrating a graph where unassigned channels are to be assigned using a 56 GBaud line rate for a middle portion of the spectrum and a flat ESNR reading.

Figure 28:
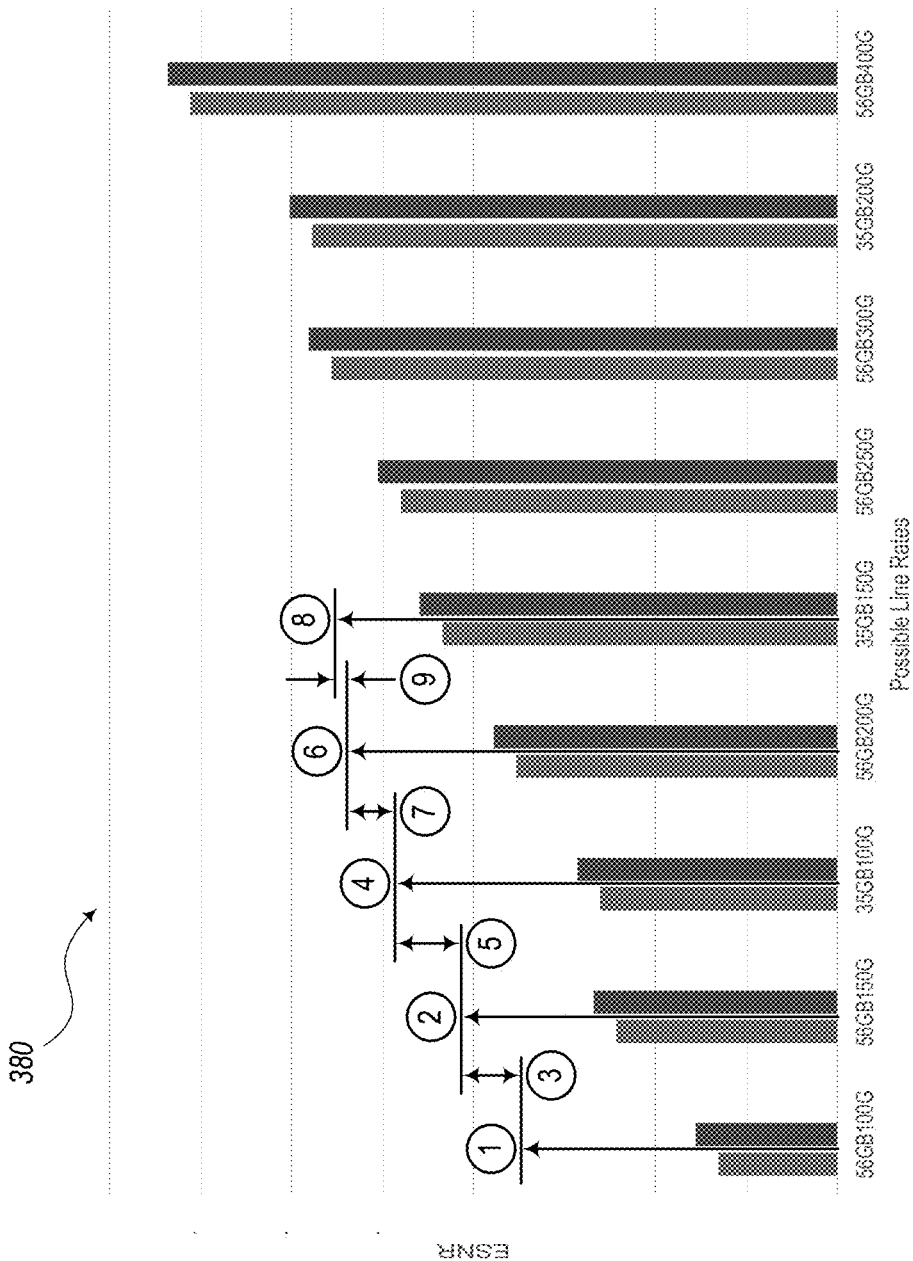
FIG. 28 is a diagram illustrating a process for utilizing the graph of FIG. 25 to automatically optimize a line rate using a full spectrum technique, according to various embodiments of the present disclosure.

FIG. 28 is a diagram illustrating a process 380 for utilizing the graph 370 of FIG. 25 showing ESNR and possible line rates to automatically optimize a line rate using a full spectrum technique, according to one embodiment. In this example, the process 380 includes 1) setting a first line rate and measuring midband ESNR, 2) setting a second line rate and measuring midband ESNR, and 3) determining if the delta in the ESNR measurements is greater than 0.5, and if so, checking a next line rate. The process 380 also include step 4) for setting another line rate and measuring midband ESNR and step 5) for determining if ESNR delta is greater than 0.5, and if so, check the next line rate. The process 380 then includes 6) setting a line rate and measuring midband ESNR and then 7) checking the next line rate if the ESNR delta is greater than 0.5.

The process 380 further includes 8) setting the line rate again and measuring midband ESNR and 9) checking the ESNR delta. In this case, it is determined that the ESNR delta is not greater than 0.5, so the process 380 includes setting the probing rate based on the ESNR. Additional steps (not numbered in the figure) are then performed. Step 10) includes conducing flat/powerhunt measurements and ensuring that all ESNRs are valid. Step 11) includes checking against safe margin to set line rate (e.g., 56 GBaud 200G). Step 12a) includes determining if all are valid. If so, this is set as the base line rate (e.g., 56 GBaud 200G). Otherwise, in step 12b), if not all are valid, then the lower line rate is probed, and the lower is set as the base line rate (e.g., 35 GBaud 100G). The process 380 includes looping back and repeating from step 11) as needed. Step 13) include a next tier consideration for detecting an upshift line rate (e.g., 35 GBaud 150G). The process 380 may be considered to be a full process.

Figure 29:
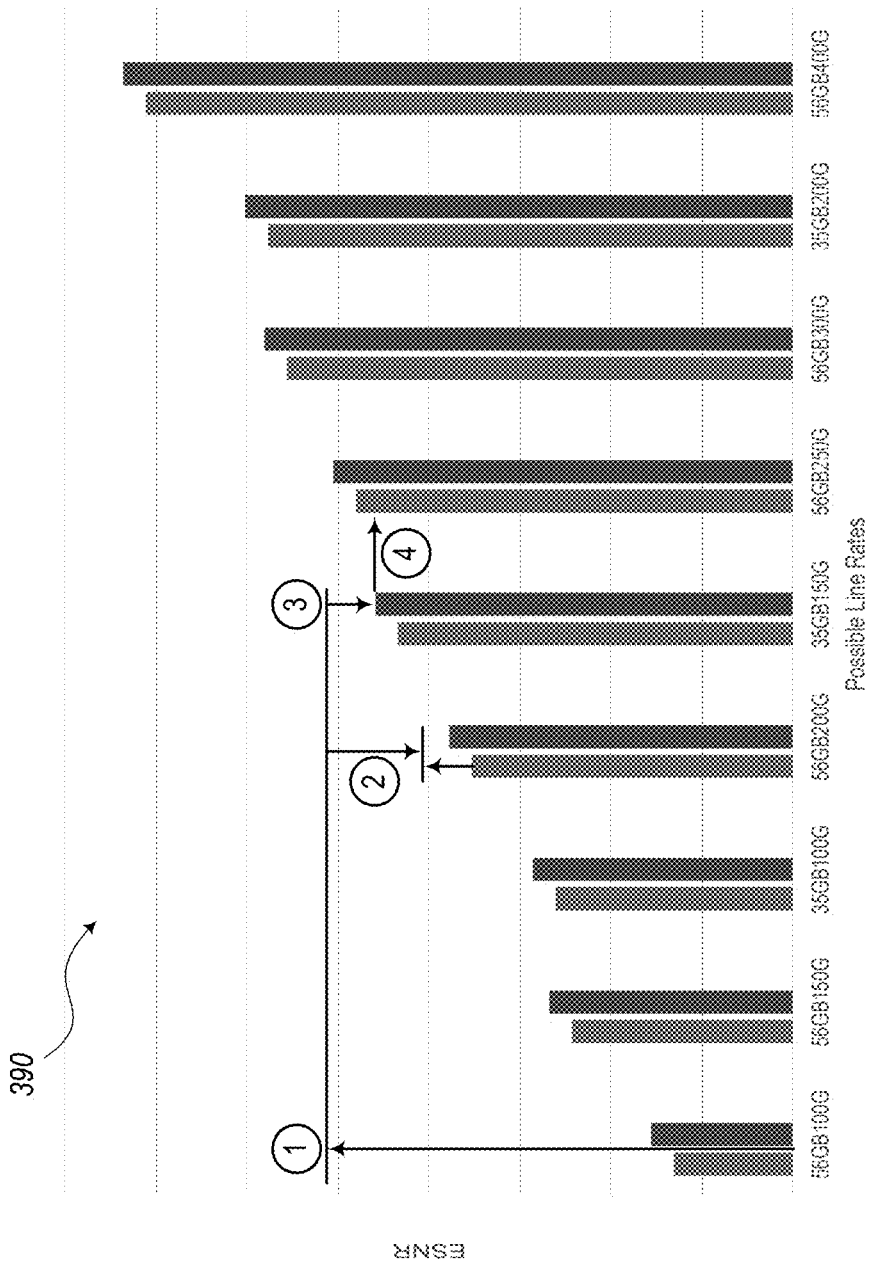
FIG. 29 is a diagram illustrating a process for utilizing the graph of FIG. 25 to automatically optimize a line rate using a lite technique, according to various embodiments of the present disclosure.

FIG. 29 is a diagram illustrating another process 390 for utilizing the graph 370 of FIG. 25 to automatically optimize a line rate using a lite technique. The process 390 includes step 1) of setting the line rate and measuring the midband ESNR and step 2) of setting a probing rate based on ESNR−2 (e.g., 10.3−2.0=8.3). Step 3) includes setting a base rate based on ESNR vs margin. Step 4) include setting an unshift rate for the one above (next set). This process 390 may be referred to as a "lite" process.

Figure 30:
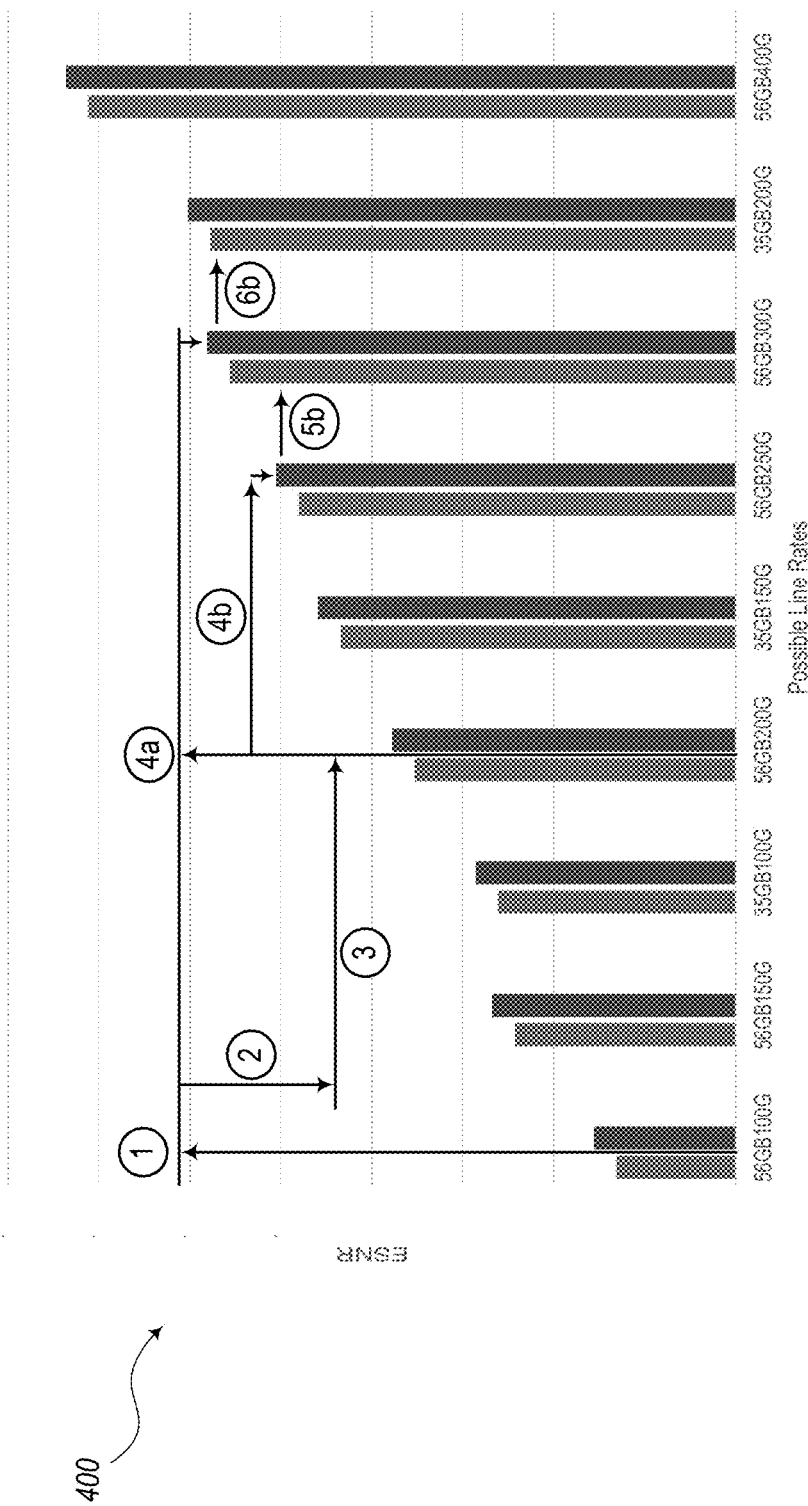
FIG. 30 is a diagram illustrating a process for utilizing the graph of FIG. 25 to automatically optimize a line rate using an intermediate technique, according to various embodiments of the present disclosure.

FIG. 30 is a diagram illustrating a process 400 for utilizing the graph 370 of FIG. 25 to automatically optimize a line rate using an intermediate technique. The process 400 includes 1) setting a line rate and measuring midband ESNR and then 2) setting a probing rate based on ESNR−3 (e.g., 12.1−3.0=9.1). The process 400 then includes 3) setting the line rate and measuring midband ESNR again. Then, step 4a) includes, if it is the same or similar (within 0.5), the process 400 sets the probe line rate as 56 GBaud 100G. If it is different, step 4b) include using the new one as the probe line rate.

In some embodiments, the process 400 may include steps (not shown in the figure), where step 5a) includes setting the base rate based on ESNR vs margin and step 6a) include setting an upshift rate one above (next to the right). Alternatively, the process 400 may include steps 5b) of setting the base rate based on ESNR vs. margin and 6b) of setting the upshift rate one above.

Figure 31:
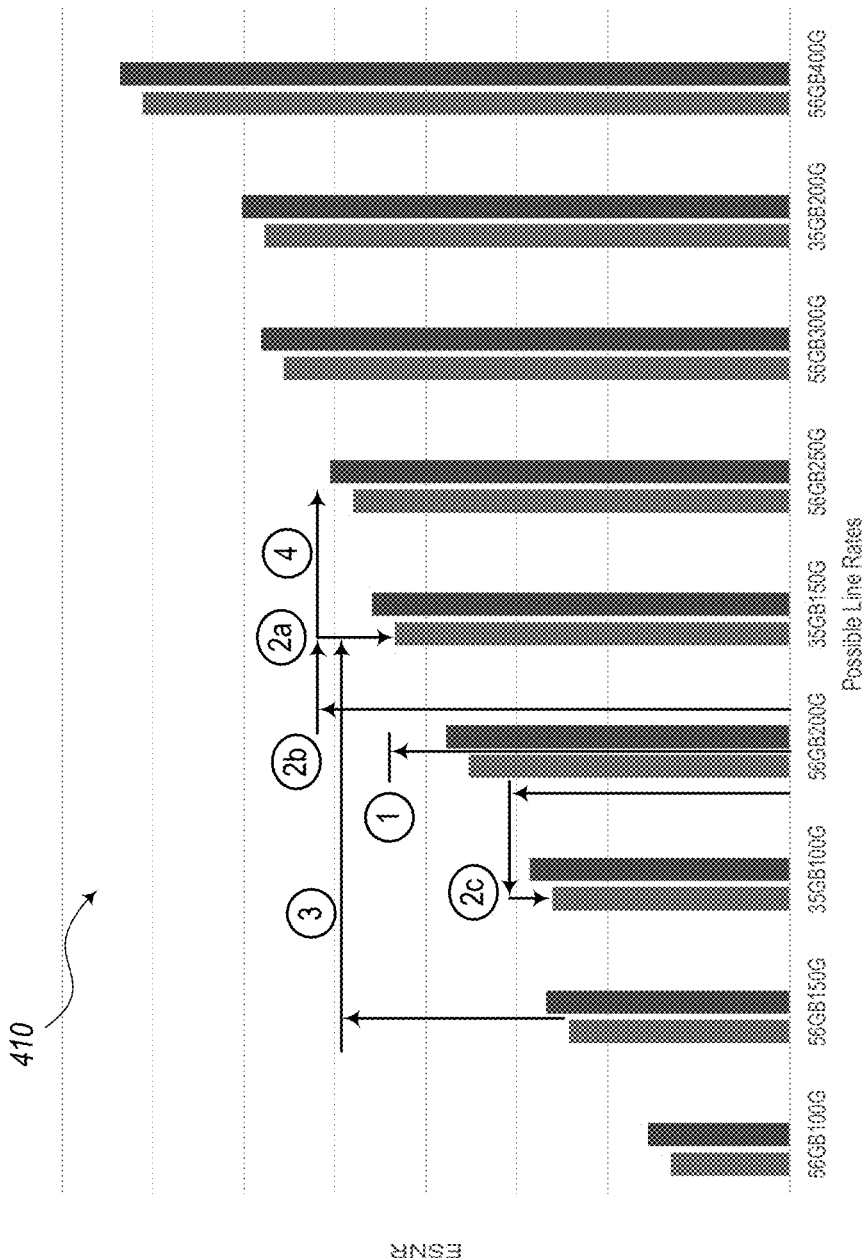
FIG. 31 is a diagram illustrating a process for utilizing the graph of FIG. 25 to automatically optimize a line rate using a final technique, according to various embodiments of the present disclosure.

FIG. 31 is a diagram illustrating a process 410, according to another implementation, for utilizing the graph 370 of FIG. 25 to automatically optimize a line rate using a final technique. In this embodiment, the process 410 includes 1) setting the line rate 56 GBaud 200G and measuring midband ESNR. In step 2a), if the ESNR is above 10, then 35 GBaud 150G is used to probe. In step 2b), if ESNR is between 7 and 10 (i.e., 7<ESNR<10), then 56 GBaud 200G is used to probe. In step 2c), if ESNR is lower than 7, then 35 GBaud 100G is used to probe.

After setting the rate based on one of steps 2a, 2b, or 2c, the process 410 at this point includes step 3) of setting the base rate based on all the ESNR measure. It may be necessary to satisfy baseline requirements (e.g., margin of 0.5). In step 4), the process 410 includes setting an upshift rate for one above the base line rate.

FIG. 32 is a diagram illustrating a chart of ESNR measurements across possible line rates. According to some embodiments of the present disclosure, processes may include setting a flat ESNR level at a specific level (e.g., 11.4) for calculating possible line rates.

Therefore, according to various embodiments of the present disclosure, systems, methods, computer logic instructions stored on non-transitory computer-readable media, near-end network elements (nodes), far-end network elements (nodes), etc. are described for enabling the provisioning/assigning of optical channels in previously un-provisioned/unassigned/un-commissioned optical fiber communication links in an optical system or network. Upon assigning the channels, the end nodes and optical network (or sub-network) can hence be commissioned for normal operation of transporting optical signals across parts or all of an optical spectrum according to the provisioning of the channels.

In some embodiments, a near-end network element may include a plurality of modems arranged within a Sub-Network Connection Group (SNCG). The plurality of modems may be configured to communicate optical signals within an optical spectrum across an unknown optical link system to be commissioned, the plurality of modems being configured to transmit the optical signals to an unknown far-end network element. Processes may include utilizing the plurality of modems to measure optical performance parameters of a plurality of optical channels of the optical spectrum, where each optical channel is previously unassigned in the unknown optical link system. The processes may also include provisioning the plurality of optical channels based on the measured optical performance parameters to enable data communication between the near-end network element and the far-end network element. It should be noted that, before commissioning, the unknown optical link system does not allow data communication between the near-end network element and the far-end network element.

In some embodiments, the systems, methods, etc. of the present disclosure may be further defined, whereby processes can include measuring the optical performance parameters by measuring Effective Signal-to-Noise Ratio (ESNR) parameters versus frequency. The ESNR parameters may be measured when the optical signals are transmitted from the near-end network element to the far-end network element. The ESNR parameters may be measured in a spectrum sweep characterization operation where ESNR is measured for each of a plurality of groups of optical channels in a sequential frequency-dependent manner. The number of optical channels in each group is based on the number of modems in each SNCG.

A near-end network element configured to perform these processes at one end of the unknown transmission system may further include a User Interface (UI) configured to enable a user to enter characterization settings. For example, the ESNR may be measured for each group based on the characterization settings. The characterization settings may include one or more of a skip factor for defining a number of optical channels to skip, a reading number defining the number of simultaneous ESNR readings with respect to the frequencies in the optical spectrum, a provisioning order for defining a direction with respect to frequencies of the optical spectrum that each simultaneous ESNR reading proceeds, and a starting position defining a position within the optical spectrum where each of the number of simultaneous ESNR reading starts.

The near-end network element of claim 1, wherein the optical performance parameters are coherent optical performance parameters including one or more of a measurement of Transmitter (Tx) power versus frequency and a measurement of flat launch power. The near-end network element of claim 1, further comprising a User Interface (UI) configured to enable a user to enter initialization settings, wherein the initialization settings include one or more of a communication boundary at an edge of the optical spectrum, a channel count, an initial line rate or Baud rate, a probe line rate, a base line rate, and an upshift line rate, and wherein the UI is implemented within one or more of a Layer 0 Control Plane (LOOP), a server, a Network Management System (NMS), a Domain Optical Controller (DOC), a node management system, a software-defined network controller, and a network orchestrator. The near-end network element of claim 1, wherein the unknown optical link system includes one or more intermediate optical devices or branching units.

The near-end network element of claim 1, wherein the instructions further enable the processing device to perform an optimization process of changing an initial line rate based on a difference between the optical performance parameters measured at different line rates. The near-end network element of claim 11, wherein the optimization process is based on an Effective Signal-to-Noise Ratio (ESNR) threshold set by a user. The near-end network element of claim 1, wherein the unknown optical link system is one of a submarine fiber system and a foreign line system configured in a point-to-point network before Optical Service Channels (OSCs) are assigned for data communication between the near-end network element and the far-end network element and before configuration information and spectrum usage information is coordinated between the near-end network element and the far-end network element, and wherein the near-end network element and far-end network element include Submarine Line Termination Equipment (SLTE).

The near-end network element of claim 1, wherein each of the plurality of modems is initially configured with a default provisioning state and the optical spectrum is initially pre-loaded with Amplified Spontaneous Emission (ASE) channel holders. The near-end network element of claim 1, wherein, in response to provisioning the plurality of optical channels, the instructions further enable the processing device to commission the near-end network element and far-end network element. The near-end network element of claim 1, wherein the instructions further enable the processing device to utilize the optical performance parameters to execute one or more actions including populating one or more provisioning templates, creating a photonic topology, formulating topology parameters, configuring a control plane system in the unknown optical link system, building a channel profile, performing a channel planning procedure to maximize system capacity, defining optimization criteria, re-optimizing a channel plan after a cable fault or repair, and performing spectral filtering, dead-band conditioning, and guard-band conditioning.

Figure 33:
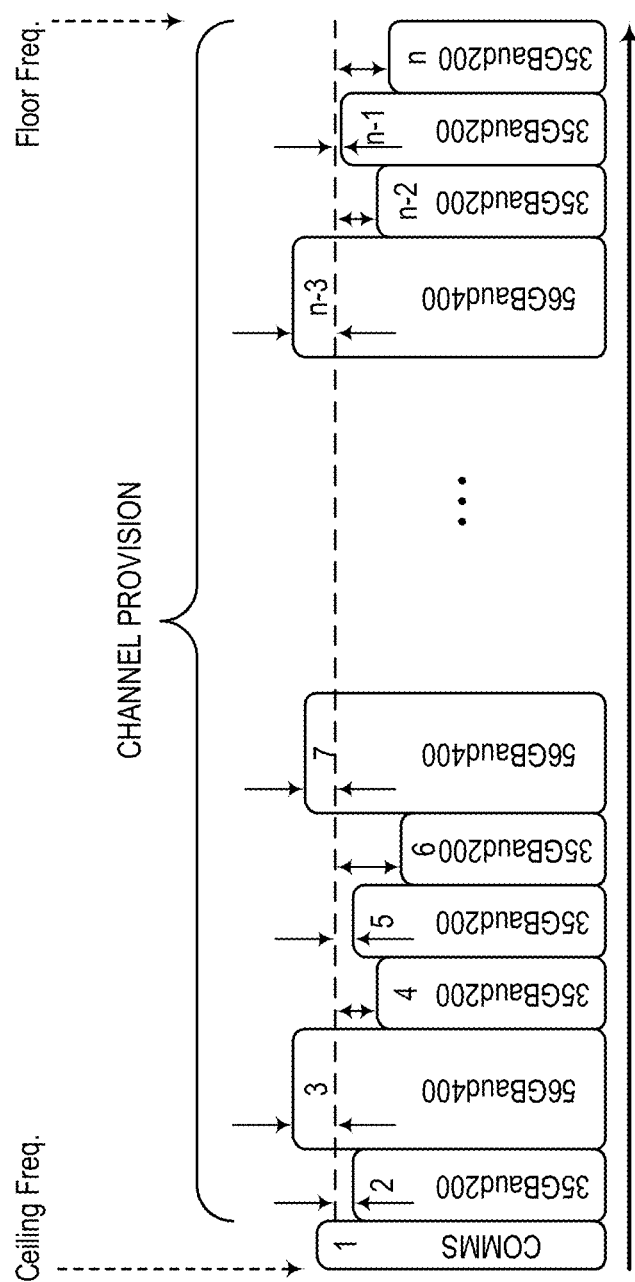
FIG. 33 is a diagram illustrating a graph of channels and line rates being ideally provisioned in a situation where there is consistent in both the near-to-far direction and the far-to-near direction, according to various embodiments of the present disclosure.

FIG. 33 is a diagram illustrating a graph of channels and line rates being ideally provisioned in a situation where there is consistency in both the near-to-far direction and the far-to-near direction. Therefore, there is the same provisioning in both directions, which would be an ideal situation. However, provisioning in the near-to-far direction may be different from the provisioning in the far-to-near direction, as described below with respect to FIG. 34.

Figure 34:
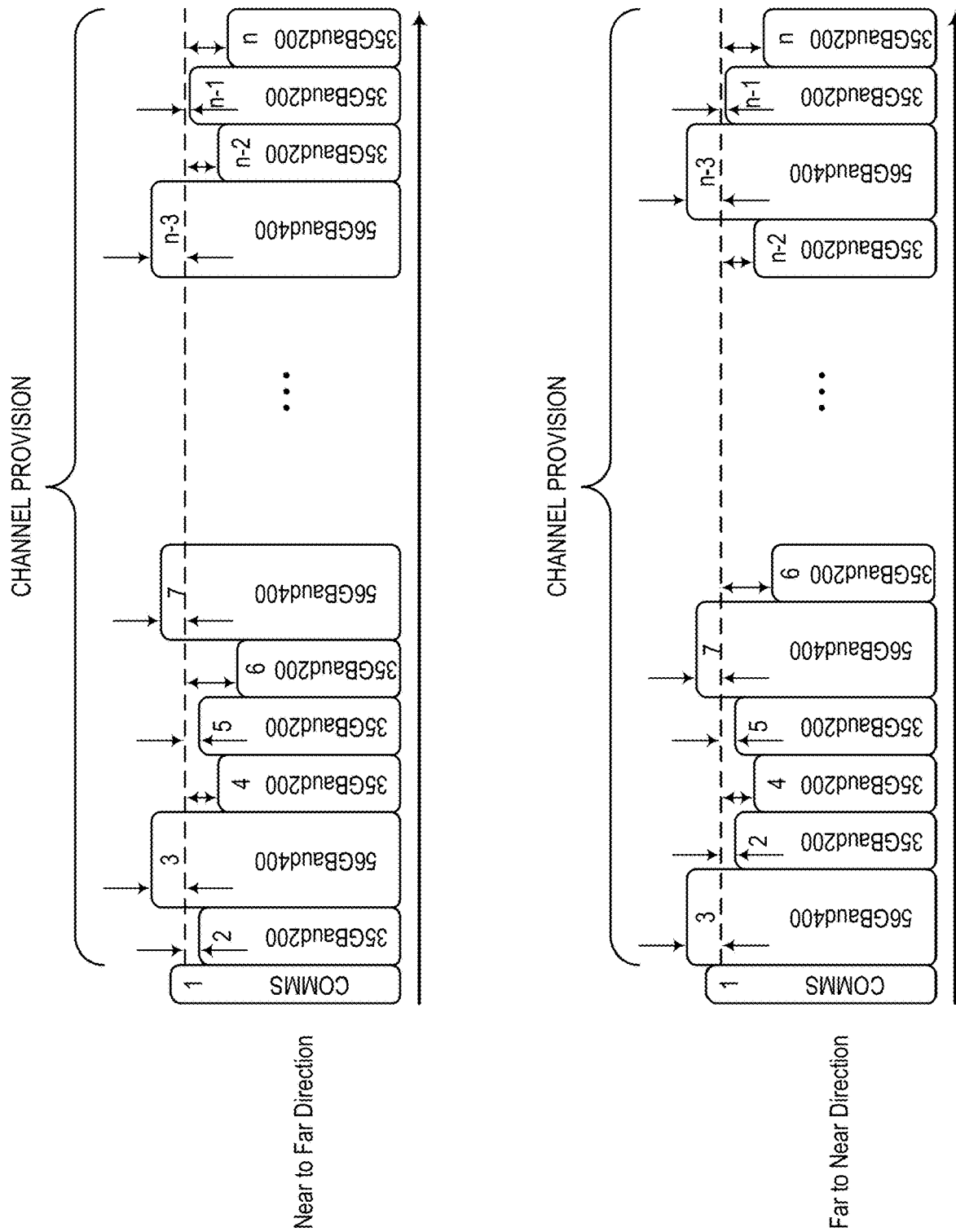
FIG. 34 is a diagram illustrating a graph of channels and line rates being provisioned in a situation where there is inconsistency in the near-to-far direction and far-to-near direction, according to various embodiments of the present disclosure.

FIG. 34 is a diagram illustrating a graph of channels and line rates being provisioned in a situation where there is inconsistency in the near-to-far direction and far-to-near direction. In some respect, the situation shown in FIG. 34 may be a worst case scenario. For example, the channels 2 and 3 may be swapped in a reverse direction. Also, channels 6 and 7 may be swapped and channels n–3 and n–2 may be swapped. Certain actions may be taken to minimize the effects of these inconsistencies. For example, the total capacity may be reduced, the minimum ESNR may be detected, both may be nulled, and/or the margin may be increased for re-optimization.

If the same capacities are detected in both directions, it may be possible to use the direction with a smaller average Tx power. If the capacities are different in the two directions, it may be possible to use the direction with less capacity. In some embodiment, it may be ideal to perform iterative processes as needed to make a sufficient provision decision.

Verification

Figure 35:
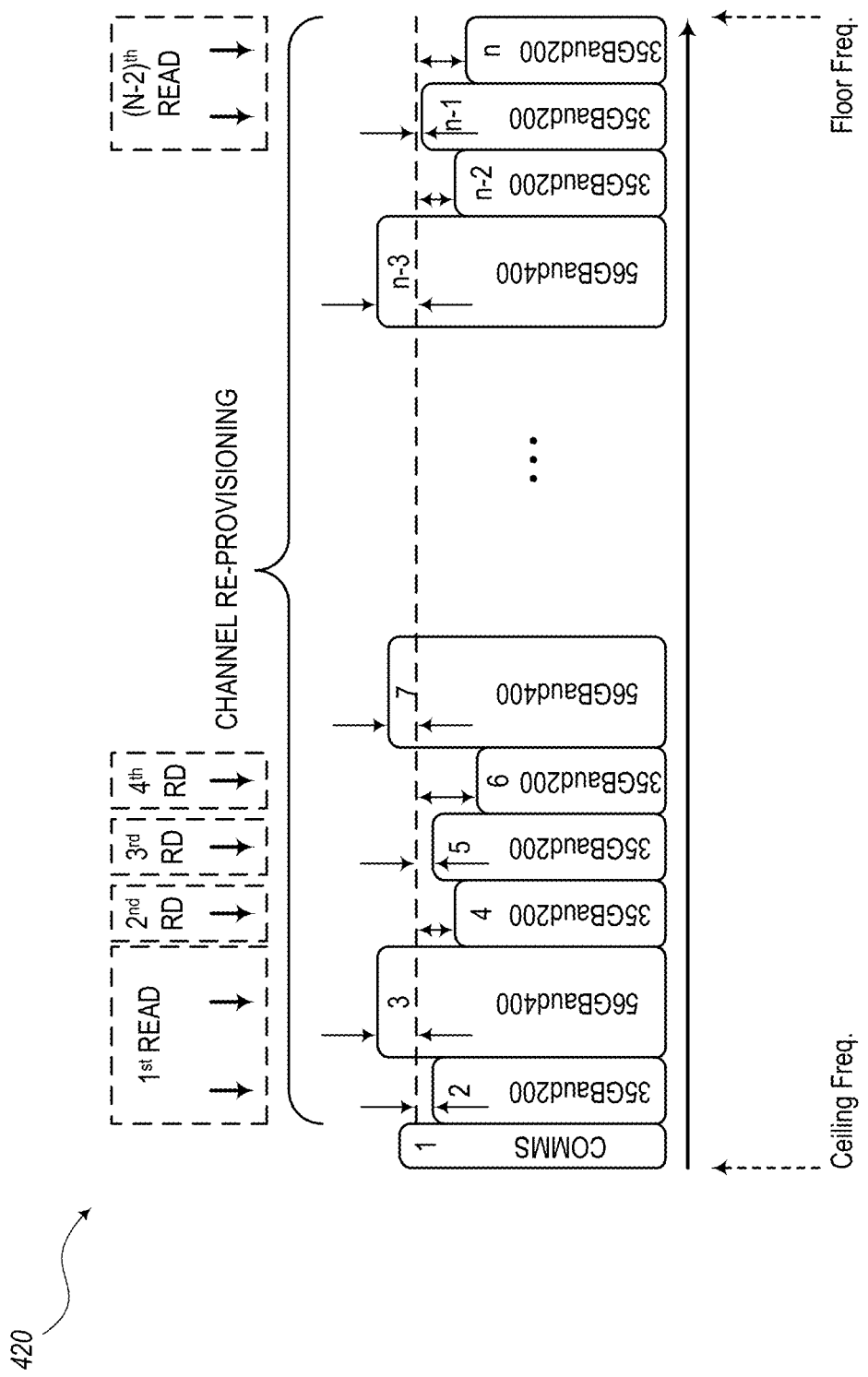
FIG. 35 is a diagram illustrating a graph of channels and line rates being provisioned and a re-characterization process of measuring ESNR of the unassigned channels utilizing three modems in each SNCG in a provisioning order from the blue edge to the red edge, according to various embodiments of the present disclosure.

FIG. 35 is a diagram illustrating a graph of channels and line rates being provisioned and an embodiment of a verification process 420 of measuring ESNR of the channels utilizing three modems in each SNCG in a provisioning order from the blue edge to the red edge. In this embodiment, the re-characterization process 420 may include performing N–2 reads where a first read includes channels 2 and 3, the second read includes channel 4, the third read includes channel 5, . . . , and the last read (i.e., read #N–2) includes the channels n–1 and n. According to one example, there are 106 channels. Thus, the number of channels (e.g., 106) minus the read edge and minus the blue edge equals the number of reads (e.g., 106–1–1=104 reads) or measurements of ESNR. With 3 modems, the number of SNCGs is equal to the number of read divided by (the number of modems–1 blue interference–1 red interference). In this case, the number of SNCGs is 104/(3–1–1)=104/1=104 SNCGs.

ESNR and Power Graphs in User Interface

Figure 36:
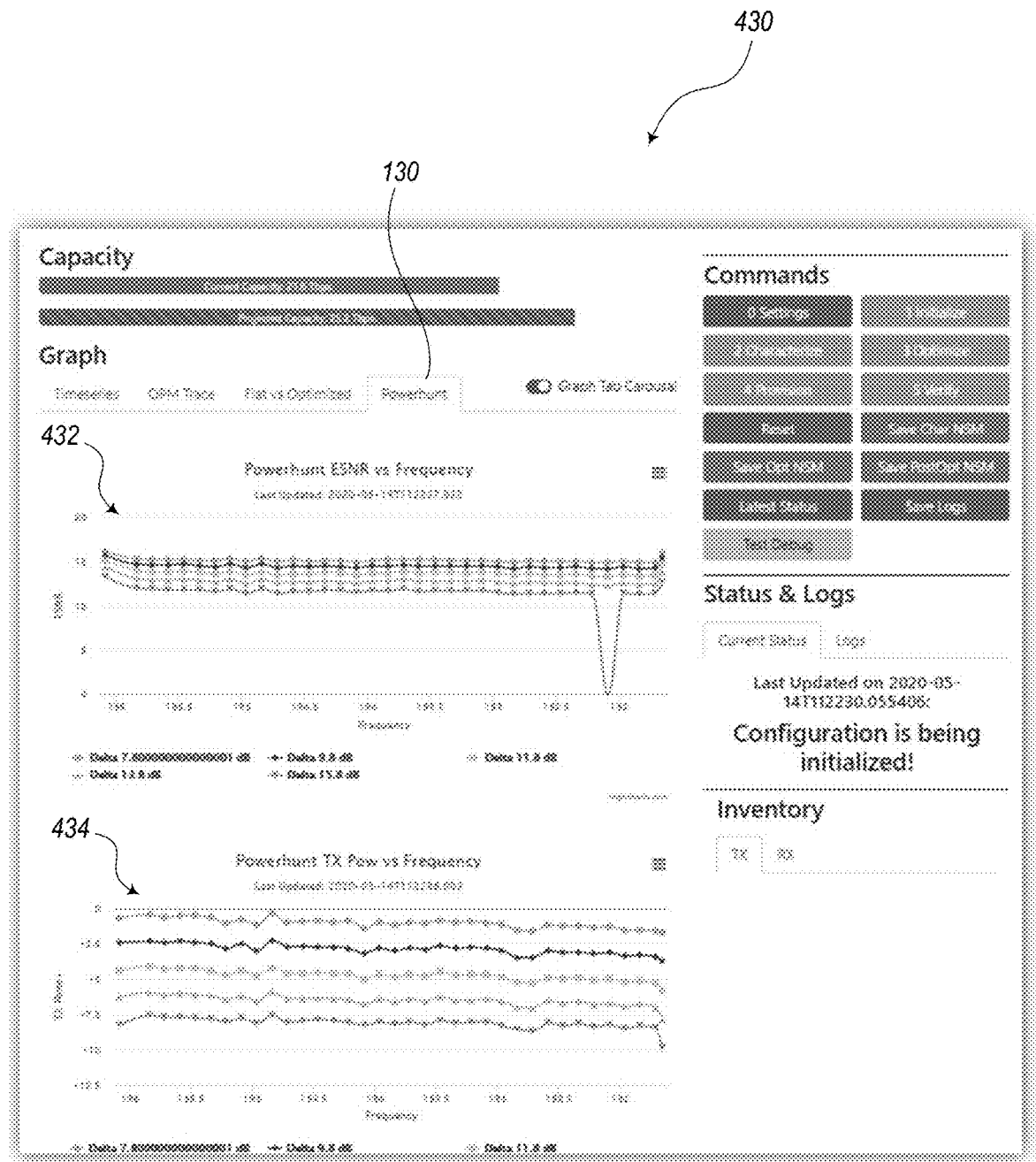
FIG. 36 is a screen shot of a UI showing graphs of detection processes for measuring ESNR vs frequency and measuring Tx power vs frequency, according to various embodiments of the present disclosure.

FIG. 36 is a screen shot of a UI 430 showing a first powerhunt graph 432 and a second powerhunt graph 434. The graphs 432, 434 are shown when the powerhunt tab 130 is selected by a user. The first powerhunt graph 432 shows detection processes for measuring ESNR vs frequency and the second powerhunt graph 434 shown detection processes for measuring Tx power vs frequency.

Figure 37:
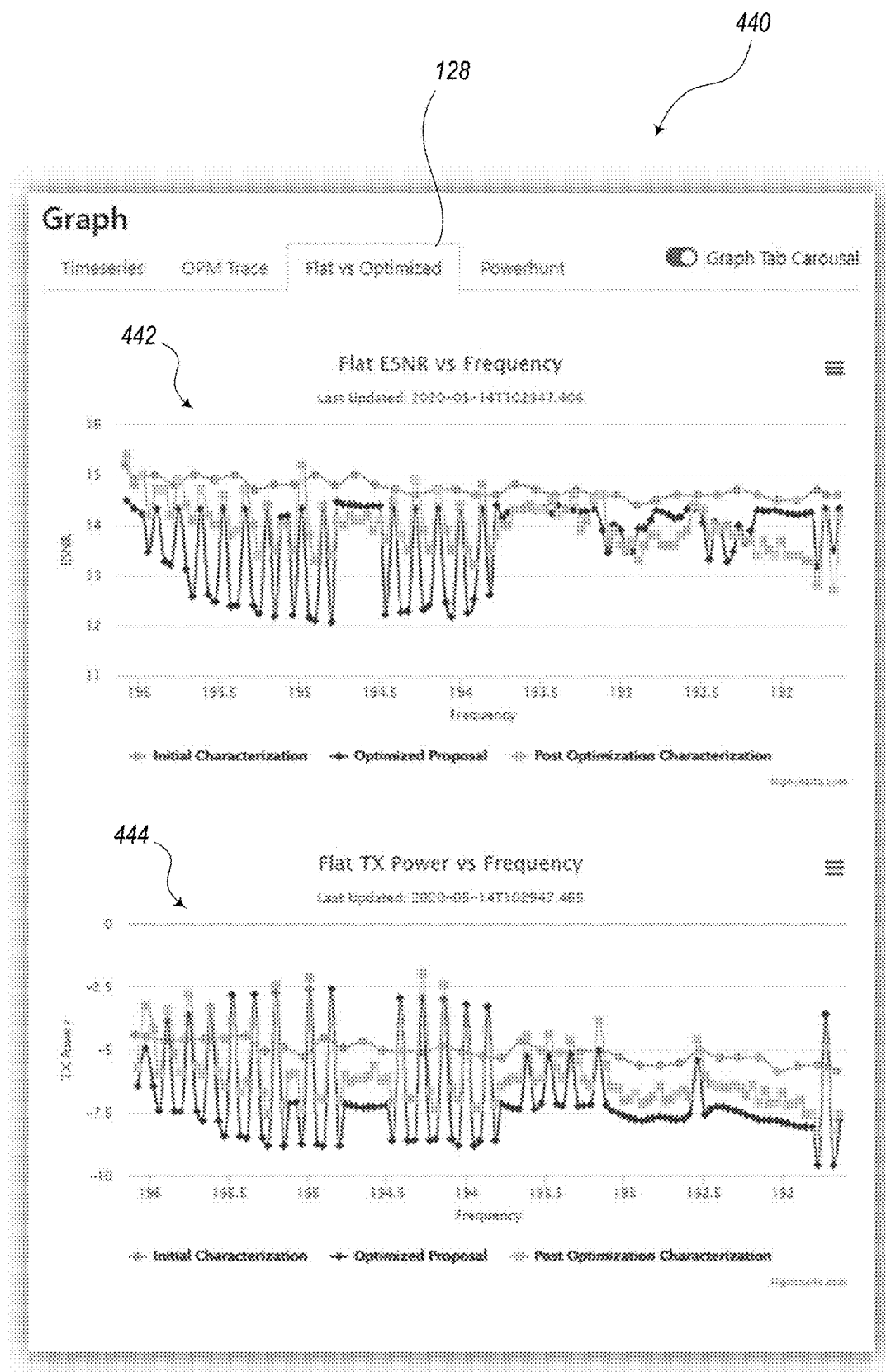
FIG. 37 is a screen shot of a UI showing graphs of detection processes for measuring ESNR vs frequency and measuring Tx power vs frequency, according to various embodiments of the present disclosure.

FIG. 37 is a screen shot of a UI 440 showing graphs of detection processes when the flat vs optimized tab 128 is selected. The UI 440 may show a first graph 442 and a second graph 444, according to the illustrated embodiment. The first graph 442 shows power detection results in which measurements of ESNR vs frequency in a flat domain are shown. The second graph 44 shows power detection results in which measurements of Tx power vs frequency in the flat domain are shown.

Figure 38:
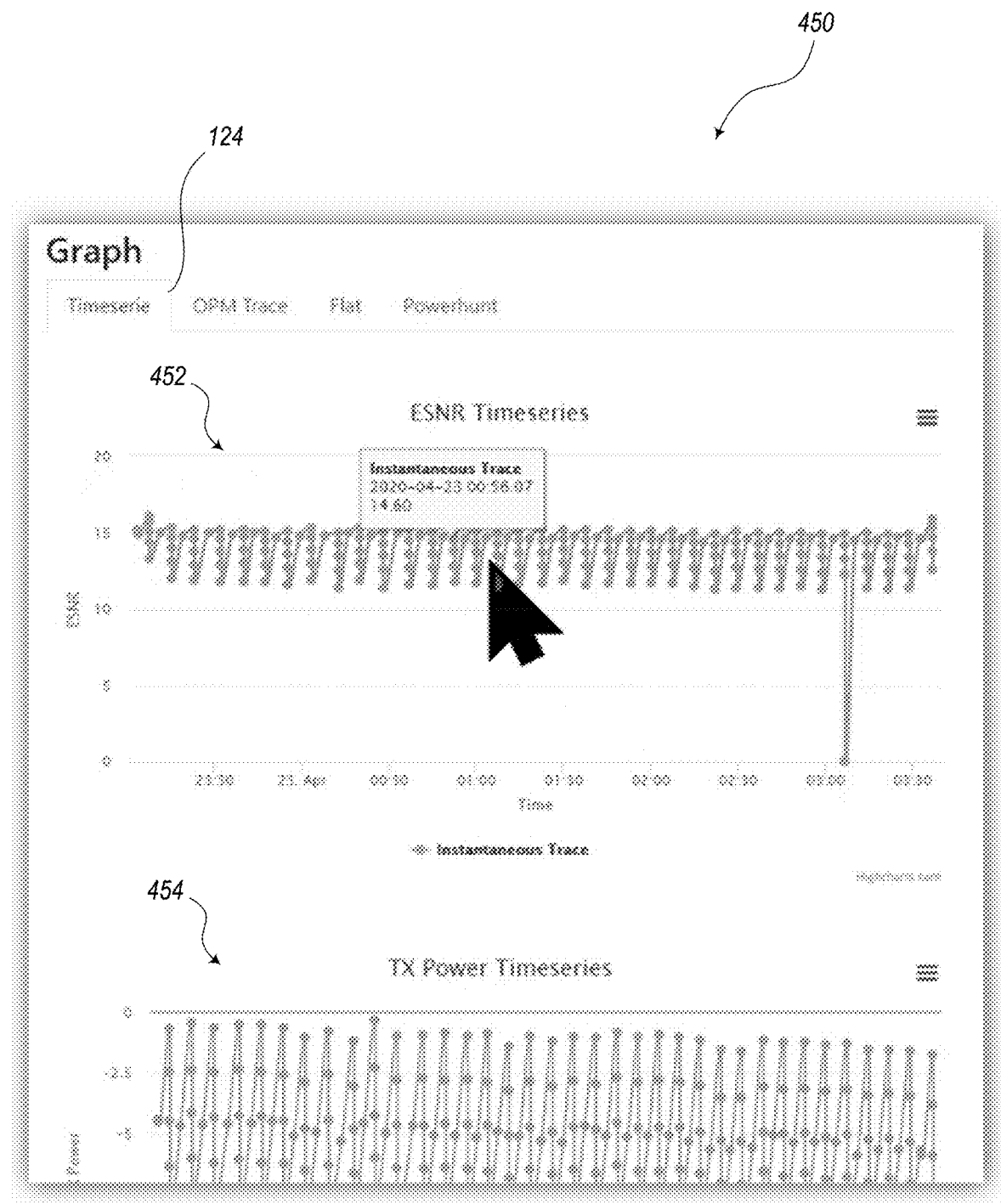
FIG. 38 is a screen shot of a UI showing graphs of an ESNR time-series and a Tx power time-series, according to various embodiments of the present disclosure.

FIG. 38 is a screen shot of a UI 450 showing graphs of an ESNR time-series and a Tx power time-series when the time-series tab 124 is selected by a user. The UI 450 in this embodiment shows a first graph 452 of ESNR time-series data obtained over time and a second graph 454 of Tx Power time-series data obtained over time.

Figure 39:
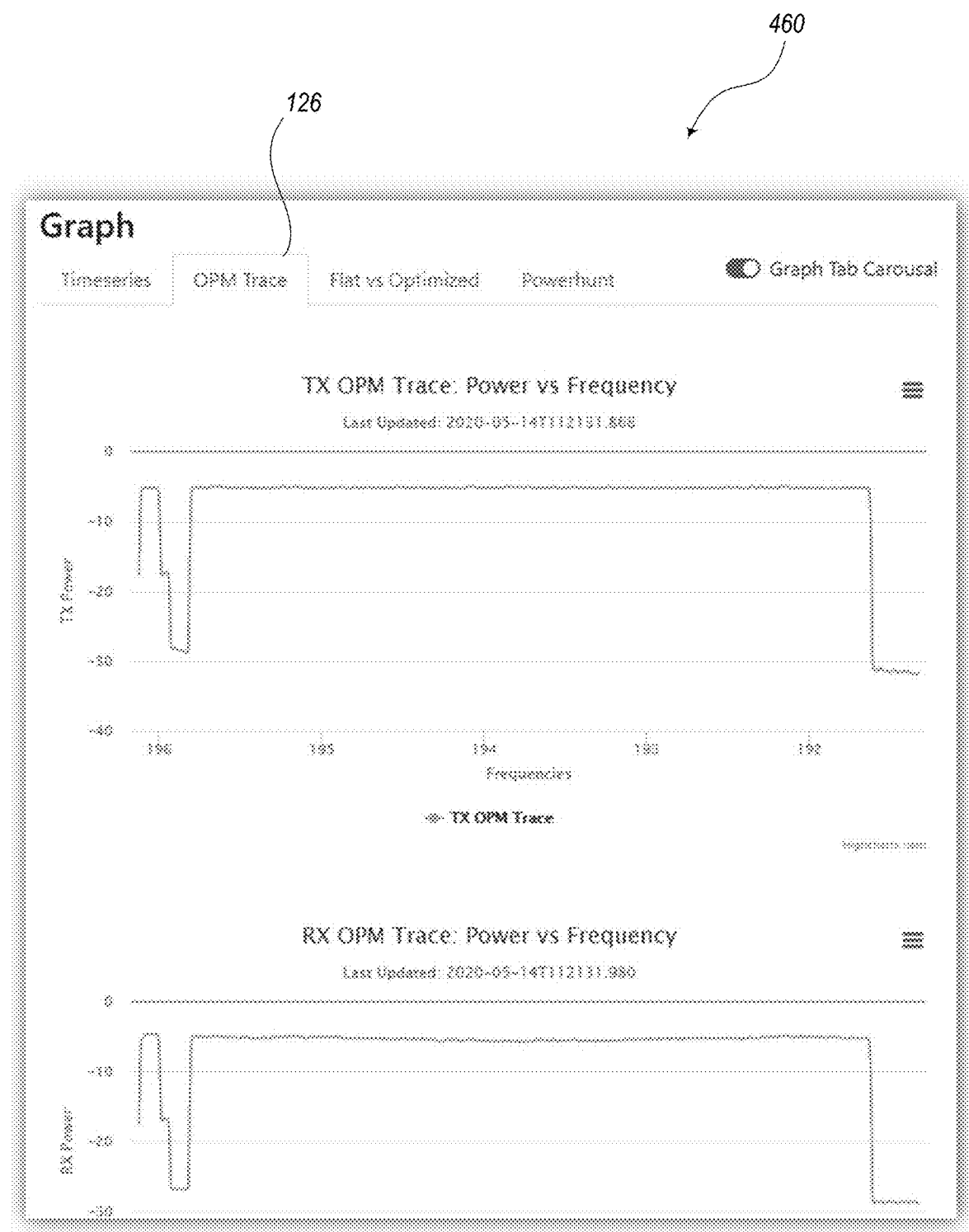
FIG. 39 is a screen shot of a UI showing graphs of Optimal Performance Monitors (OPMs) for detecting traces at a Transmitter (Tx) and a Receiver (Rx) of power vs frequency, according to various embodiments of the present disclosure.

FIG. 39 is a screen shot of a UI 460 showing graphs of Optimal Performance Monitors (OPMs) when the OPM trace tab 126. In this embodiment, the UI 460 includes the results of detecting traces at a Transmitter (Tx) for showing power vs frequency in a first graph 462 and detecting traces at a Receiver (Rx) for showing power vs frequency in a second graph 464.

Results and Benefits

Figure 40A:
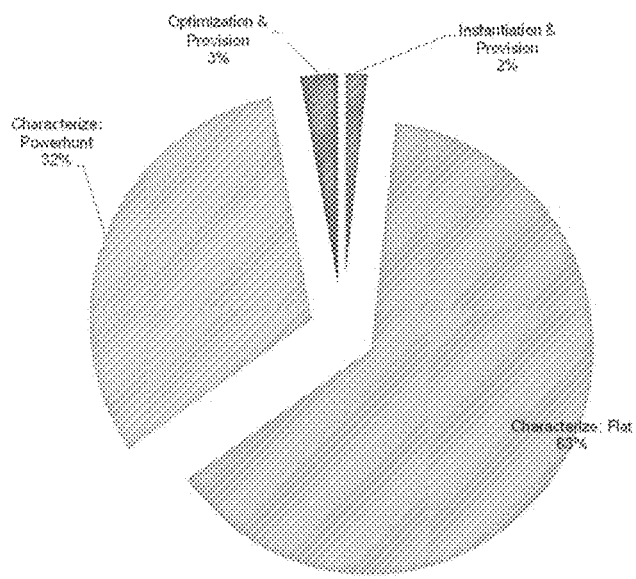
FIGS. 40A-40C are diagrams illustrating pie charts that show different runtime distributions based on an amount of verification performed in processes for provisioning or commissioning unassigned channels, according to various embodiments of the present disclosure.
Figure 40B:
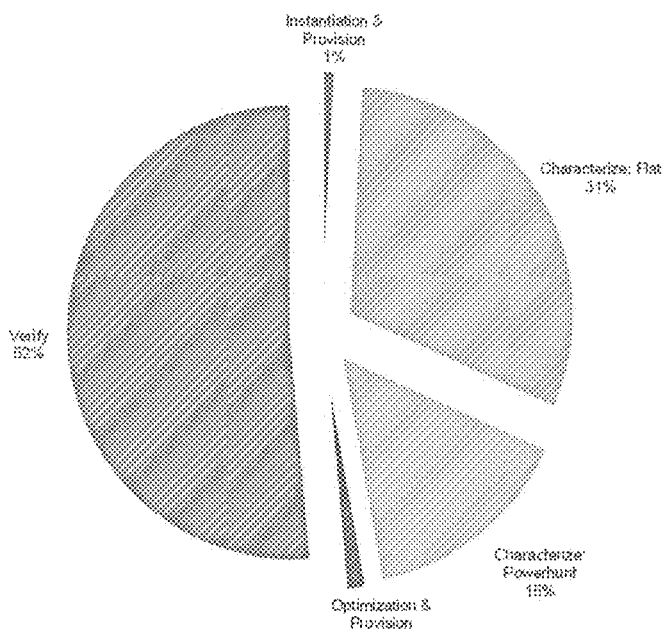
Figure 40C:
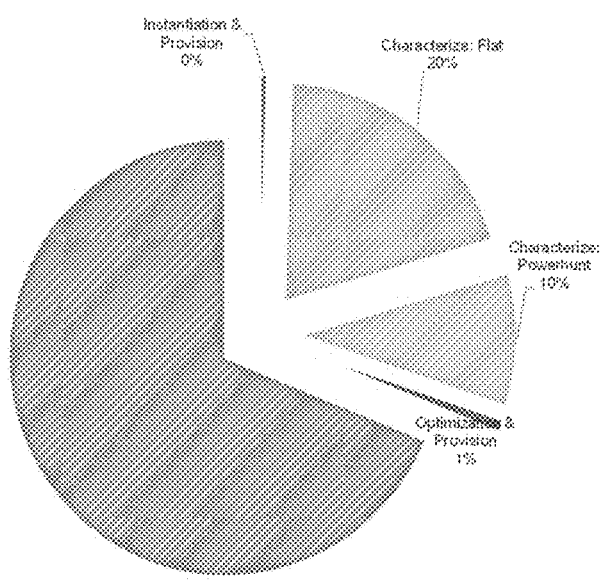

FIGS. 40A-40C are diagrams illustrating pie charts that show different runtime distributions based on an amount of verification performed in processes for provisioning or commissioning unassigned channels. Of course, one or ordinary skill in the art will understand that the embodiments of the present disclosure exhibit a great improvement in the provisioning time. For instance, where conventional techniques may typically require several days or weeks for completion, the systems and methods of the present disclosure are configured to perform automatic provisioning techniques that can be completed in under 24 hours, regardless of the particular process used. With no verification (FIG. 40A), the present provisioning processes can be completed in about 5 hours. With 50% verification, the present provisioning processes can be completed in about 10.5 hours. Even with full 100% verification, the present provisioning processes can be completed in about 16.5 hours.

Furthermore, the provisioning times of the present disclosure may be further reduced based on other certain techniques described herein. For example, by adding addition modems for measuring ESNR, it is possible to reduce the amount of time needed to perform the provisioning processes. With three modems as a baseline, by adding one more modem (i.e., four modems total), the processing time can be reduced by about 50%. With two additional modems (i.e., five modems total), the processing time can be reduced by about 66.6%. With three additional, the time can be reduced by about 75%, and so on.

Figure 41A:
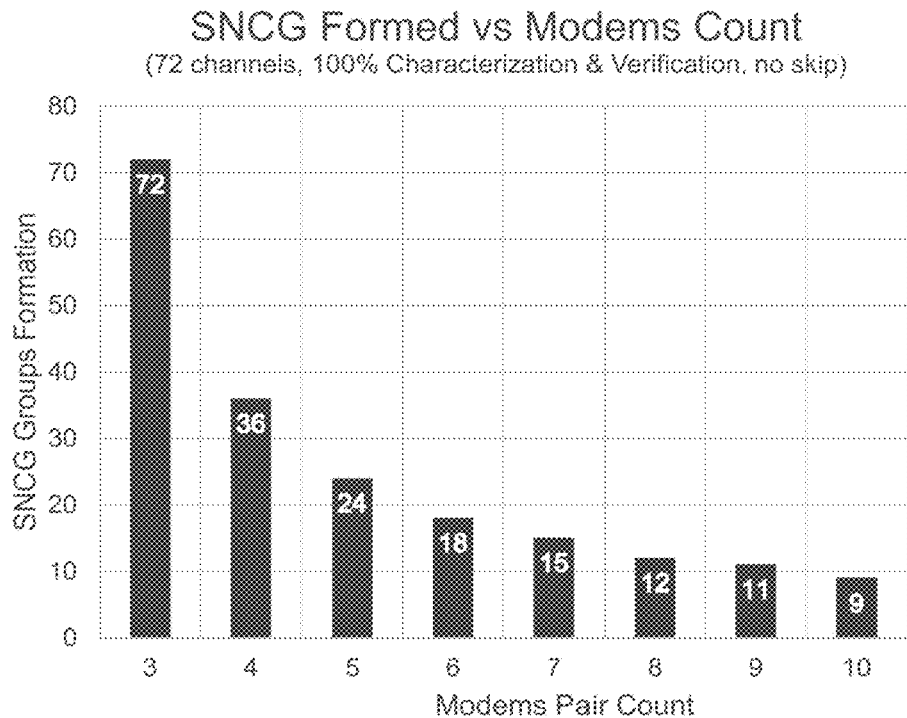
FIG. 41A is a diagram illustrating a graph showing a number of SNCGs needed for different numbers of modems utilized in each SNCG, according to various embodiments of the present disclosure.
Figure 41B:
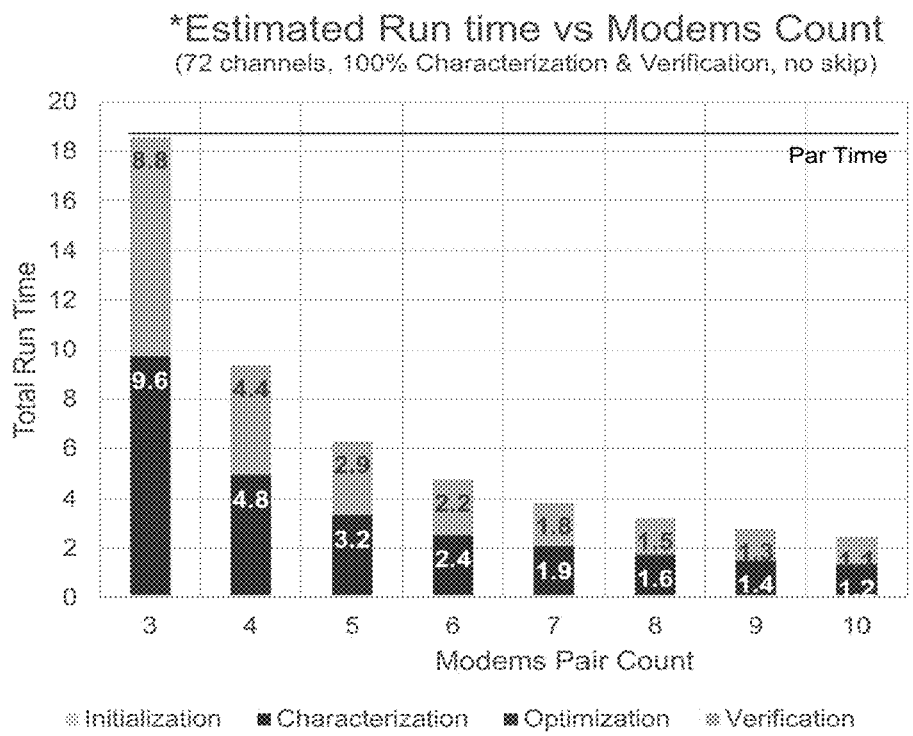
FIG. 41B is a diagram illustrating a graph showing total run times based on the number of modems utilized in each SNCG, according to various embodiments of the present disclosure.

FIG. 41A is a diagram illustrating a graph showing a number of SNCGs needed for different numbers of modems utilized in each SNCG. FIG. 41B is a diagram illustrating a graph showing total run times based on the number of modems utilized in each SNCG. This is based on an example of 72 channels at about 56 Gbaud. Of course, the modem capabilities affect the number of SNCGs.

The systems and methods of the present disclosure may be configured to include certain novel features with respect to conventional systems. For example, the present embodiments may use new or existing modem technologies to automatically build an end-to-end spectral performance profile. In some embodiments, the present systems and methods may also include considerations for dead-bands, guard-bands, pass-bands, and spectral filtering of the optical spectrum. The performance profile may be translated into a configuration that meets the network's requirements (e.g., margin, lifetime, capacity, etc.). These can include any number of optimization techniques or formulations that determine the frequency and transmission mode mappings across the band.

Additionally, other novel features with respect to conventional systems may include using formulated mappings in commissioning the network elements (NEs), whether through internal or external controllers (e.g., ZIP, etc.) or direct LOOP provisioning. Also, the present embodiments may include rapid turn-up and deployment operations allowing hands-off provisioning in networks without a service channel or external DON. The present systems and methods can pre-populate topology/cross-connects for channel upgrades such that new circuit packs inherit settings instantly without requiring human intervention. Also, it is possible with the present embodiments to easily perform provisioning techniques on actual customer terminals and modems for characterization. In this way, it is possible to validate all of the working parts from LOOP down to NE control at an early stage.

To reiterate some of the benefits of the embodiments of the present disclosure, it may be possible to quickly and effectively commission point-to-point systems as well as mesh and other types of systems, which can be a major service bottleneck in conventional system that require manually-intensive and time-consuming laborious tasks. The present disclosure dramatically reduced the operational expenditures, time to service, human error, and thus technical support tickets. If integrated correctly, the systems and methods described in the present disclosure could reduce or potentially eliminate site visits given the remote capabilities, which could result in great savings in operating expenditures.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements described herein can be used in any and all combinations with each other.

What is claimed is:

1. A non-transitory computer-readable medium comprising instructions that, when executed, cause one or more processors, in a computer system communicatively coupled to an optical line system, to perform steps of:
   receiving measured optical performance parameters of a plurality of optical channels transmitted over an optical spectrum between two network elements in the optical line system, wherein the measured optical performance parameters are for one or more unassigned optical channels on the optical spectrum, with the measured optical performance parameters being made on one or more optical modems at either of the two network elements;
   determining a performance profile of the optical spectrum based on the measured optical performance parameters;
   translating the performance profile into configuration information for the two network elements in the optical line system; and
   causing provisioning of the two network elements in the optical line system based on the configuration information.

2. The non-transitory computer-readable medium of claim 1, wherein the one or more optical modems are configured to send test signals for the measured optical performance parameters and to sweep across all of the optical spectrum.

3. The non-transitory computer-readable medium of claim 1, wherein the one or more optical modems are configured to send test signals for the measured optical performance parameters at a plurality of baud rates at different locations of the optical spectrum.

4. The non-transitory computer-readable medium of claim 1, wherein the performance profile includes one or more of deadbands, guardbands, passbands, and filtering, all for the optical spectrum.

5. The non-transitory computer-readable medium of claim 1, wherein the translating includes adapting the performance profile into the configuration information based on one or more of margin, operational lifetime, and capacity, all of the optical line system.

6. The non-transitory computer-readable medium of claim 1, wherein the configuration information is based on available degrees of freedom in modems at the two network elements, wherein the available degrees of freedom include one or more of baud rates, power, line optimization modes, and dispersion settings.

7. The non-transitory computer-readable medium of claim 1, wherein the performance profile is based on one of capacity over the optical spectrum and cost of the two network elements.

8. The non-transitory computer-readable medium of claim 1, wherein the provisioning is performed as Zero Touch Provisioning to the two network elements.

9. The non-transitory computer-readable medium of claim 1, wherein the configuration information include pre-populated settings for the two network elements such that new circuit packs added thereto are configured without requiring human intervention.

10. A method, implemented by a computer system communicatively coupled to an optical line system, the method comprising steps of:
   receiving measured optical performance parameters of a plurality of optical channels transmitted over an optical spectrum between two network elements in the optical line system, wherein the measured optical performance parameters are for one or more unassigned optical channels on the optical spectrum, with the measured optical performance parameters being made on one or more optical modems at either of the two network elements;
   determining a performance profile of the optical spectrum based on the measured optical performance parameters;
   translating the performance profile into configuration information for the two network elements in the optical line system; and
   causing provisioning of the two network elements in the optical line system based on the configuration information.

11. The method of claim 10, wherein the one or more optical modems are configured to send test signals for the measured optical performance parameters and to sweep across all of the optical spectrum.

12. The method of claim 10, wherein the one or more optical modems are configured to send test signals for the measured optical performance parameters at a plurality of baud rates at different locations of the optical spectrum.

13. The method of claim 10, wherein the performance profile includes one or more of deadbands, guardbands, passbands, and filtering, all for the optical spectrum.

14. The method of claim 10, wherein the translating includes adapting the performance profile into the configuration information based on one or more of margin, operational lifetime, and capacity, all of the optical line system.

15. The method of claim 10, wherein the configuration information is based on available degrees of freedom in modems at the two network elements, wherein the available degrees of freedom include one or more of baud rates, power, line optimization modes, and dispersion settings.

16. The method of claim 10, wherein the performance profile is based on one of capacity over the optical spectrum and cost of the two network elements.

17. The method of claim 10, wherein the provisioning is performed as Zero Touch Provisioning to the two network elements.

18. The method of claim 10, wherein the configuration information include pre-populated settings for the two network elements such that new circuit packs added thereto are configured without requiring human intervention.

* * * * *